United States Patent
Whitten et al.

(10) Patent No.: US 11,658,925 B2
(45) Date of Patent: *May 23, 2023

(54) CONFIGURING A CHATBOT WITH REMOTE LANGUAGE PROCESSING

(71) Applicant: Microsoft Technology Licensing, LLC, Redmond, WA (US)

(72) Inventors: Christopher Whitten, Seattle, WA (US); Sangwoo Han, Seattle, WA (US); Benjamin Abraham Russell Brown, Austin, TX (US); Vishwac Sena Kannan, Redmond, WA (US); Andrew Stephen Brown, Redmond, WA (US); Marieke Watson Iwema, Seattle, WA (US); Yochay Kiriaty, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/515,793

(22) Filed: Nov. 1, 2021

(65) Prior Publication Data
US 2022/0060435 A1 Feb. 24, 2022

Related U.S. Application Data

(60) Continuation of application No. 16/697,994, filed on Nov. 27, 2019, now Pat. No. 11,190,466, which is a
(Continued)

(51) Int. Cl.
*G06F 9/44* (2018.01)
*H04L 51/02* (2022.01)
(Continued)

(52) U.S. Cl.
CPC ............ *H04L 51/02* (2013.01); *G06F 3/0482* (2013.01); *G06F 8/30* (2013.01); *G06F 8/33* (2013.01);
(Continued)

(58) Field of Classification Search
CPC . G06F 3/0482; G06F 8/30; G06F 8/33; G06F 8/34; G06F 8/35; G06F 9/44505;
(Continued)

(56) References Cited

U.S. PATENT DOCUMENTS 9,318,108 B2 * 4/2016 Gruber ..................... G10L 13/02
9,477,643 B2 * 10/2016 Barve .................... G06F 40/295
(Continued)

OTHER PUBLICATIONS

Galitsky et al., "Chatbot with a Discourse Structure-Driven Dialogue Management", 2017, Proceedings of the EACL 2017 Software Demonstrations, Valencia, Spain, pp. 87-90. (Year: 2017).*
(Continued)

*Primary Examiner* — Ted T. Vo
(74) *Attorney, Agent, or Firm* — Christopher J. Volkmann; Kelly, Holt & Christenson, PLLC

(57) ABSTRACT

A chatbot designer user interface (UI) has a visual authoring canvas that shows visual elements indicative of a logical flow of processing in a chatbot application. The designer UI receives an authoring input identifying a language processing system that is to be used during runtime. The chatbot application is configured to use the identified language processing system.

20 Claims, 48 Drawing Sheets

Related U.S. Application Data division of application No. 16/696,181, filed on Nov. 26, 2019, now Pat. No. 11,329,932.

(60) Provisional application No. 62/929,566, filed on Nov. 1, 2019.

(51) Int. Cl.
| | |
|---|---|
| *G06F 9/445* | (2018.01) |
| *G06F 8/34* | (2018.01) |
| *G06F 8/33* | (2018.01) |
| *G06F 16/332* | (2019.01) |
| *G06F 3/0482* | (2013.01) |
| *G06F 8/35* | (2018.01) |
| *G06F 8/30* | (2018.01) |

(52) U.S. Cl.
CPC ............... *G06F 8/34* (2013.01); *G06F 8/35* (2013.01); *G06F 9/44505* (2013.01); *G06F 16/3329* (2019.01); *G06F 2203/04803* (2013.01)

(58) Field of Classification Search
CPC ....... G06F 16/3329; G06F 2203/04803; H04L 51/02
USPC ................................. 717/104–123
See application file for complete search history.

(56) References Cited

U.S. PATENT DOCUMENTS

| | | | |
|---|---|---|---|
| 10,666,583 B2* | 5/2020 | Yao | G06F 40/56 |
| 11,190,466 B2* | 11/2021 | Whitten | G06F 8/30 |
| 11,329,932 B2* | 5/2022 | Whitten | G06F 8/35 |
| 2017/0329466 A1* | 11/2017 | Krenkler | G06F 9/453 |
| 2019/0103111 A1 | 4/2019 | Tiwari et al. | |

OTHER PUBLICATIONS

Deloitte Digital, "Chatbots Point of View", 2018, Deloitte Artificial Intelligence, 26 pages. (Year: 2018).*
"Notice of Allowance Issued in U.S. Appl. No. 16/697,991", dated May 9, 2022, 8 Pages.
"Final Office Action Issued in U.S. Appl. No. 16/697,991", dated Mar. 4, 2022, 14 Pages.
"Non Final Office Action issued in U.S. Appl. No. 17/712,825", dated Dec. 22, 2022, 6 Pages.
"Notice of Allowance Issued in U.S. Appl. No. 17/712,825", dated Mar. 29, 2023, 8 Pages.

* cited by examiner

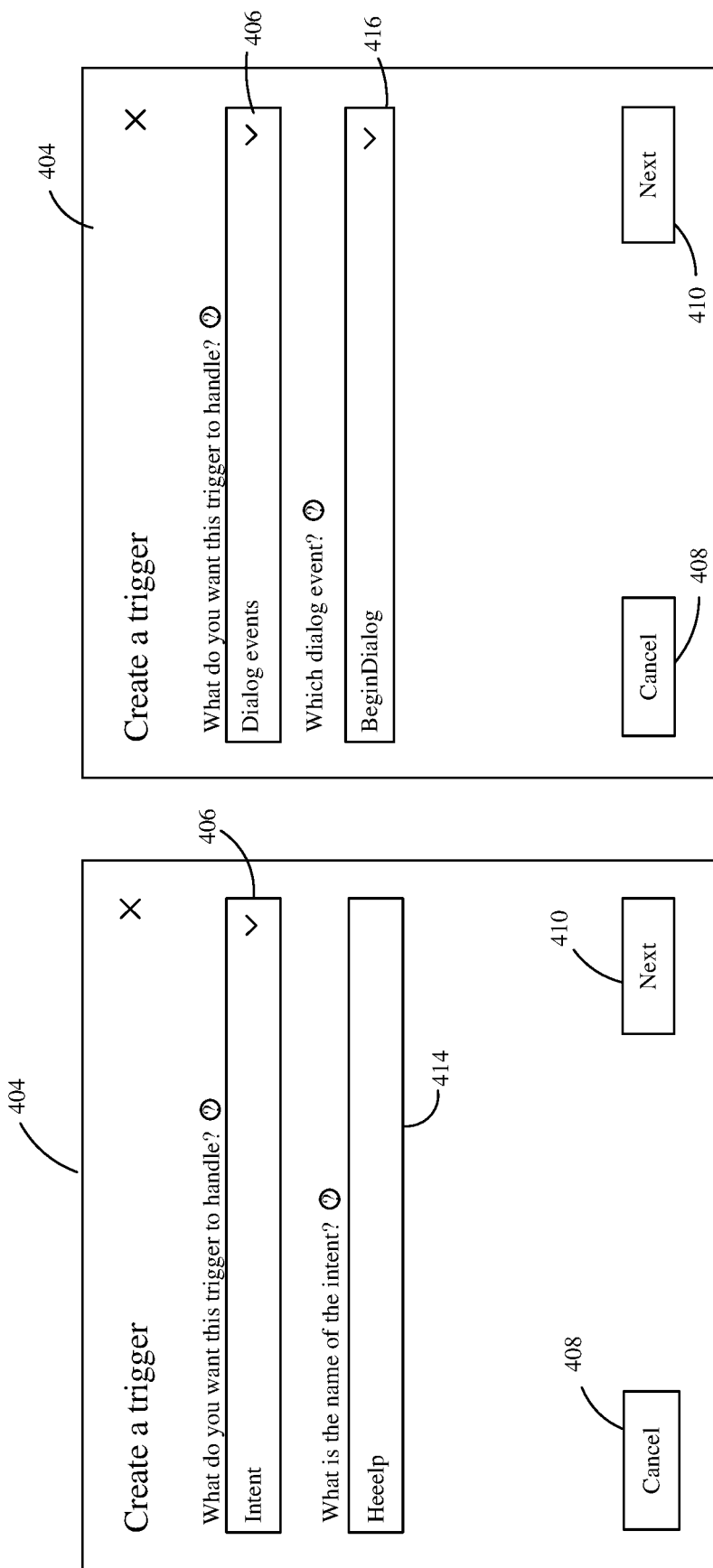

Send an Activity

This is action which sends an activity to the user      434

Language Generation

What your bot says to the user. This is a template used to create the outgoing message. It can include language generation rules, properties from memory, and other features. Visit the Language Generation reference for more info.

For example, to define variations that will be chosen at random, write:
- hello
- hi

436

ID number 799730      Last Edited N/A

FIG. 9A

Prompt for text
This represents a dialog which gathers a text from the user

Initial Prompt ⊙
```
ex What is your birth date?
```
— 440

Property ⊙
```
ex. birthday
```
— 442

Output Format ⊙
```
none ▼
```
— 444

Validation Expressions
Expressions of validate an input.

[ Add ] — 446

Unrecognized Prompt ⊙
```
ex. Let's try again. What is your birth date?
```
— 448

Invalid Prompt ⊙
```
ex. No date was recognized
```
— 450

Max. Turn Count ⊙
```
2147483647
```
— 452

Value ⊙
```
```
— 454

Default Value ⊙
```
```
— 456

Default Value Response ⊙
```
ex I didn't understand your responses, so I will just use the default of 10.
```
— 458

☐ Always Prompt ⊙  — 460

Allow interruptions ⊙
```
notRecognized ▼
```
— 462

ID number 965347     Last Edited 9/30/19 1:10:58 PM

Event handlers

| Name | Description | Base Dialog event | prebuilt-condition |
|---|---|---|---|
| [ ] OnCondition | Generic handler for a condition | N/A | |
| [ ] OnIntent | Intent event handler | RecognizedIntent | turn.recognized.intent == 'IntentName' |
| [ ] OnUnknownIntent | Unknown intent event handler | UnknownIntent | |
| [ ] OnBeginDialog | Begin dialog handler | BeginDialog | N/A |
| [ ] OnDialogEvent | Handler for specific dialog events | N/A | N/A |
| [ ] OnCustomEvent | Handle for custom event raised by user code | N/A | N/A |
| [ ] OnActivity  \/ | Generic activity handler | ActivityReceived | N/A |
| [ ] OnConversationUpdateActivity | Conversation update activity handler | ActivityReceived | ActivityTypes.ConversationUpdate |
| [ ] OnEndOfCoversationActivity | End of conversation activity handler | ActivityReceived | ActivityTypes.EndOfConversation |
| [ ] OnEventActivity | Event activity handler | ActivityReceived | ActivityTypes.Event |
| [ ] OnHandoffActivity | Hand off activity handler | ActivityReceived | ActivityTypes.Handoff |
| [ ] OnInvokeActivity | Invoke activity handler | ActivityReceived | ActivityTypes.Invoke |
| [ ] OnMessageActivity | Message activity handler | ActivityReceived | ActivityTypes.Message |
| [ ] OnMessageDeletionActivity | Message deletion activity handler | ActivityReceived | ActivityTypes.MessageDeletion |
| [ ] OnMessageReactionActivity | Message reaction activity handler | ActivityReceived | ActivityTypes.MessageReaction |
| [ ] OnMessageUpdateActivity | Message update activity handler | ActivityReceived | ActivityTypes.MessageUpdate |
| [ ] OnTypingActivity | Typing activity handler | ActivityReceived | ActivityTypes.Typing |

Notes:
- OnDialogEvent can only pick from one or more DialogEvents listed below.
- OnCustomEvent can only be used to handle a custom event by name raised in user code via EmitEvent action.

Dialog events

- BeginDialog
- ConsolDialog
- CancelDialog
- ActivityReceived
- RecognizedIntent
- UnknowIntent
- ActionsStarted
- ActionsSaved
- ActionsEnded
- ActionsResumed

FIG. 10

```
1  {
2    "$type": "Microsoft.AdaptiveDialog",
3    "$designer": {
4      "id": "808722"
5    },
6    "autoEndDialog": true,
7    "$schema": "../../app.schema",
8    "trigger":[
9      {
10       "$type": "Microsoft.OneBeginDialog",
11       "$designer": {
12         "id": "335456"
13       },
14       "actions": [
15         {
16           "$type": "Microsoft.SetProperty",
17           "$designer": {
18             "id": "201694"
19           },
20           "property": "dialog.todo",
21           "value: "@title"
22         },
23         {
24           "$type": "Microsoft.TextInput",
25           "$designer": {
26             "id": "298897"
27           },
28           "property": "dialog.todo",
29           "prompt": "OK, please enter the title of your todo.",
30           "maxTurnCount": 3,
31           "alwaysPrompt": false,
32           "allowInterruptions": "true",
33           "outputFormat": "none"
34         },
35         {
36           "$type": "Microsoft.IfCondition",
37           "$designer": {
38             "id": "015420"
39           },
40           "condition": "user.todos == null",
41           "actions": [
42             {
43               "$type": "Microsoft.InitProperty",
44               "$designer": {
45                 "id": "015420"
46               },
47               "property": "user.todos",
48               "type": "array"
49             }
50           ]
51         },
52         {
53           "$type": "Microsoft.EditArray",
54           "$designer": {
55             "id": "567087"
56           },
57           "changeType": "Push",
58           "itemsProperty": "user.todos",
59           "valve": "dialog.todo"
```

FIG. 12A

```
60          },
61          {
62              "$type": "Microsoft.SendActivity",
63              "$designer": {
64                  "id": "116673"
65              },
66              "activity": " [bfdactivity-116673]"
67          }
68      ]
69     }
70   ],
71   "$schema": "../../app.schema"
72 }
```

FIG. 12B

```
01 #Hello
02 -
03
04 #Welcome(time)
05 -If :{Time == "morning'}
06   - Good morning
07 -ELSEIF: (time == 'evening')
08   - Good evening
09 -ELSE:
10   - How are you doing,
11
12 # Exit
13 -Thanks for using todo hot.
14
15 # Greeting
16 -What's up bro
17
18 #ShowTodo
19 -IF: (count(user.todos) > 0)
20 -""
21 {HelperFunction()}
22 @{join(foreach(user.todos, x,showSingleTodo(x)), '\n')}
23 ""
24 -ELSE.
25 -You don't have any todos.
26
27 #showSingleTodo(x)
28 -*{x}
29
30 #HelperFunction
31 -IF:{count(user.todos) == 1}
32 -Your most recent @{count(userr.todos)} task is
33 -ELSE
34 -Your most recent @{count(user.todos)} tasks are
35
36 #help
37 -I can add a todo, show todos, remote a todo, and clear all todos
38 -I can help you yes I can
39 -Help, we don't need no stinkin' help!
40
41 #bfdactivity-376720
42 -Hi! I'm a ToDo bot. Say "do a todo named first" to get started.
43
44 #bfdactivity-116673
45 -Successfully added a todo named {dialog.todo}
46
47 #bfdactivity-832307
48 -Successfully cleared items in the ToDo List.
49
50 #bfdactivity-983761
51 -You don't have any items in the Todo List.
52
```

FIG. 13

CONFIGURING A CHATBOT WITH REMOTE LANGUAGE PROCESSING

CROSS-REFERENCE TO RELATED APPLICATIONS

The present application is a continuation of and claims priority of U.S. patent application Ser. No. 16/697,994, filed Nov. 27, 2019, which is a divisional of and claims priority of U.S. patent application Ser. No. 16/696,181, filed Nov. 26, 2019, and which is based on and claims the benefit of U.S. provisional patent application Ser. No. 62/929,566, filed Nov. 1, 2019, the contents of which are hereby incorporated by reference in their entirety.

BACKGROUND

There are a wide variety of different types of computing systems. Some computing systems run applications configured to interact with user. Some applications are local to a user device, while others are hosted by a service on a remote server architecture (such as on the cloud).

Bots are software applications that perform tasks over a wide area network (such as the Internet. Bots are often deployed to implement interfaces that users interact with in a repetitive way. Conversational bots, or chat bots, for instance, often receive natural language queries from users, and respond to those natural language queries by taking actions or by responding to the user in natural language. Designing and authoring dynamic experiences can be difficult. When one designs and develops a bot, the process can be cumbersome, time consuming and error prone.

The discussion above is merely provided for general background information and is not intended to be used as an aid in determining the scope of the claimed subject matter.

SUMMARY

A chatbot designer user interface (UI) has a visual authoring canvas that shows visual elements indicative of a logical flow of processing in a chatbot application. The designer UI receives an authoring input identifying a language processing system that is to be used during runtime. The chatbot application is configured to use the identified language processing system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 8A-8G show examples of user interfaces that can be generated in the property pane of the user interfaces to generate and configure a trigger.

FIG. 10 is a screen shot showing one example of a list of things that triggers can handle, in a bot.

FIGS. 12A and 12B show one example of a JSON serialization of a visual representation on the visual authoring canvas, and displayed in a JSON file pane.

FIG. 13 shows one example of a language generation template that can be generated from the JSON serialization, and which can be processed by a computing system to perform bot operations.

DETAILED DESCRIPTION

As discussed above, designing and authoring conversation bots, or chat bots, can be difficult, time consuming and error prone. Moreover, conversations, by nature, are dynamic. For a developer to design a system that anticipates and deals with unexpected responses, or interruptions, is difficult and complex. This type of system can be difficult to envision, communicate, and debug/improve. The present discussion thus proceeds with respect to a visual bot designer that has a visual authoring canvas that an author can interact with to design the logic flow for a bot. Code is automatically generated and can be displayed. This provides an intuitive, visual interface for bot design. Thus, people with varying degrees of coding expertise can author a bot. This technique for bot design increases efficiency in bot generation. It also facilitates re-use of bot components, which increases processing efficiency and can reduce storage requirements. Because the bot designer is highly intuitive, it also increases design accuracy.

Figure 1:
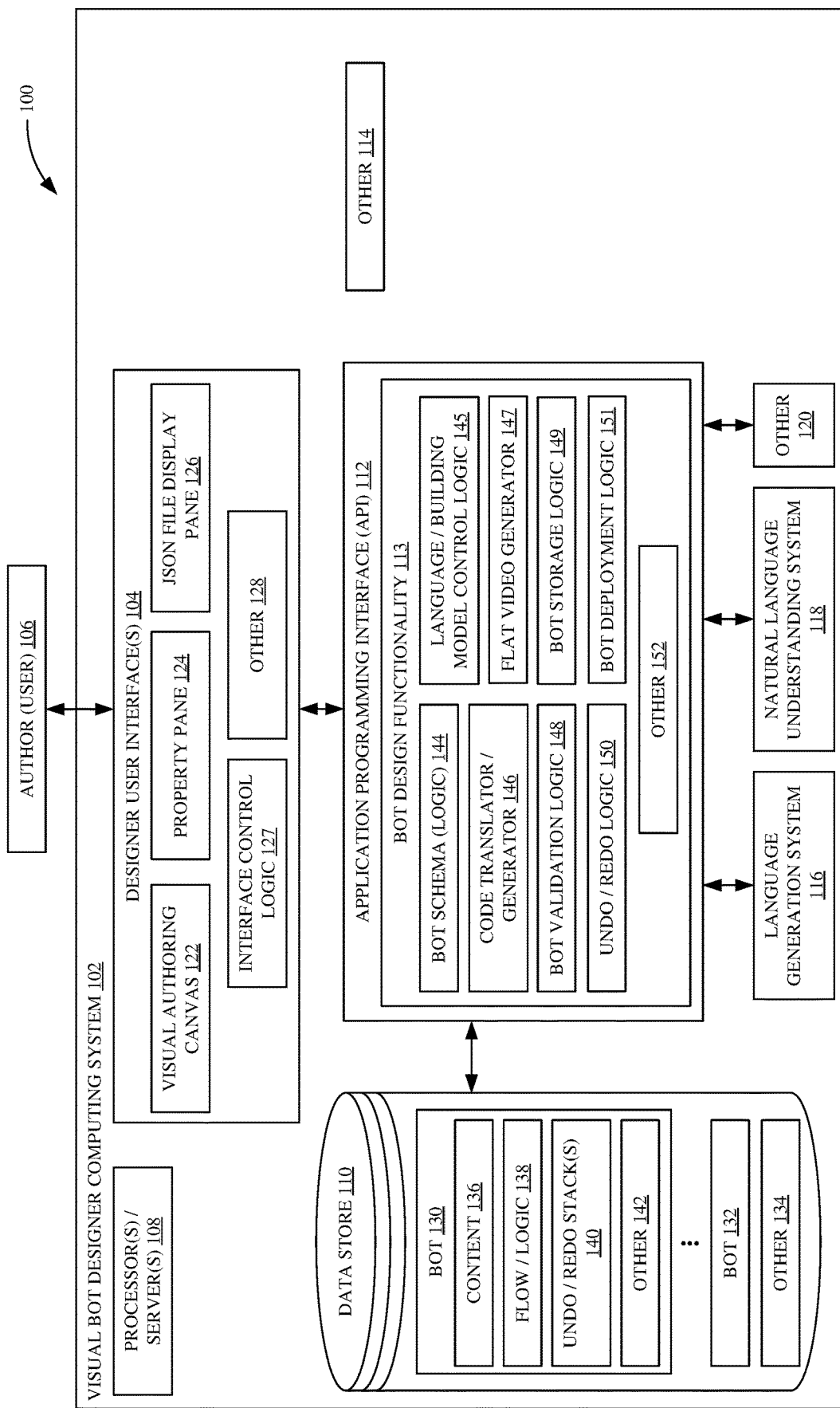
FIG. 1 is a block diagram of one example of a visual bot designer.

FIG. 1 is a block diagram of one example of a computing system architecture 100. Architecture 100 shows visual bot designer computing system 102 that generates an interface 104 for interaction by an author (or user) 106. Visual bot designer computing system 102 also includes one or more processors or servers 108, data stores 110, application programming interfaces (APIs) 112 and it can include other items 114. In one example, system 102 also includes a language generation system 116, a natural language understanding system 118, and it can include other items 120, all of which are coupled to API 112. It will be noted that the language generation system 116, natural language understanding system 118 and other items 120 can be separate from visual bot designer computing system 102, and accessed by API 112 in a wide variety of ways (such as over a large area network, a local area network, near field communication network, a cellular communication network, or any of a wide variety of other networks or combinations of networks). In addition, author (or user) 106 can interact directly with user interfaces 104, or can otherwise interact with visual bot designer computing system 102, over a network, where visual bot designer computing system 102 is hosted in a remote server environment. These and other architectures are contemplated herein.

In the example illustrated in FIG. 1, designer user interfaces 104 illustratively include visual authoring canvas 122, property pane 124, serialized (e.g., JSON) file display pane 126, user interface control logic 127, and can include other items 128. Each of the designer user interfaces 104 illustratively includes functionality that allows author 106 to interact with the user interface in order to generate, delete and modify information thereon. For instance, visual authoring canvas 122 can have drag and drop functionality that allows author 106 to drag and drop elements onto, and remove visual elements from, the authoring canvas 122. Property pane 124 may have text boxes or other editable elements with which author 106 can interact to configure properties. Serialized file display pane 126 can display a serialized version of the elements on visual authoring canvas 122 and the corresponding properties on pane 124. The serialization pane 126 may be referred to herein as JSON file display pane 126, but this is by way of example only. Pane 126 can be editable or otherwise allow author 106 interactions. Interface control logic 147 detects interactions by author 106 with interfaces 104 and provides an indication of the interactions to API 112.

Data store 110 illustratively includes a set of bots 130-132 in various stages of design. It can also include other items 134. Each bot (e.g., bot 130) includes content 136 which is indicative of the linguistic elements that will be used by bot 130. It can also include flow/logic 138 which defines how bot 130 will run. Each bot 130 can also include undo/redo stacks 140 (or they can be stored elsewhere) so that author 106 can switch between different functional versions of bot 130 as it is being designed. Each bot 130 can include a wide variety of other items 142 as well.

Application programming interface 112 illustratively facilitates communication among various items in computing system 102 and it can implement bot design functionality 113 as well. Bot design functionality 113 is shown in API 112, as one example, but it (or parts of it) can reside elsewhere as well. Bot design functionality 113 can include a bot schema (or logic) 144. The inputs by author 106, through designer user interfaces 104, allow author 106 to generate a bot in accordance with bot schema 144. Bot design functionality 113 also illustratively includes code translator/generator 146, flat view generator 147, bot validation logic 148, bot storage logic 149, undo/redo logic 150, deployment logic 151, and it can include other items 152.

Code translator/generator 146 illustratively receives inputs on different portions of the designer user interfaces 104 and generates updates that are then displayed on the other portions of designer user interfaces 104. Some examples of this are described below. For instance, if author 106 adds a node (or other visual element) to visual authoring canvas 122, then logic 127 detects the element and provides an indication of the element to API 112. Code translator/generator 146 generates code, or translates that visual element, into a serialized representation that can be displayed on JSON file display pane 126. Similarly, if author 106 edits the JSON serialization on display pane 126, for example, to add an action to the bot, then code translator/generator 146 illustratively generates a visual element corresponding to the action and places it on visual authoring canvas 122, in a way that corresponds to the edited serialization displayed on JSON file display pane 126. The same is true for modifications made by author 106 in property pane 104. If author 106 modifies properties in property pane 124, then code translator/generator 146 generates information to update visual authoring canvas 122 and JSON file display pane 126, based upon the modifications to the properties. Similarly, if either the visual representations or the JSON file is modified, modifications are also propagated to property pane 124.

Undo/redo logic 150 illustratively detects user interaction with an undo/redo actuator (described in greater detail below) and allows the user to switch between different functional states of the bot application being designed. It thus controls the content of undo/redo stacks 140 in data store 110 to allow the user to switch back and forth in this way.

Bot validation logic 148 illustratively performs validations on the bot, as it is being designed by author 106. It can surface the result of those validations so the bot application can be corrected by the author 106 as necessary.

Also, as is described in greater detail below, when designing or authoring a bot, author 106 may provide an example of a textual input that is to be recognized in response to a prompt when it is input by a bot end user, later, at runtime. In another example, the author 106 may provide a textual example of responses that may be output by the bot when specified conditions are met. In such cases, language model building control logic 145 can provide the text to language generation system 116 and/or natural language understanding system 118. Language generation system 116 (alone or in combination with natural language understanding system 118) can be any form of language generation system (such as one based on artificial intelligence, or other models) and can generate additional example inputs and/or outputs, or a model therefor, based upon the textual examples provided by the author 106. In this way, the bot being designed will have much greater flexibility in recognizing and responding naturally to end users, without the author 106 needing to write out all possible expected dialog inputs or outputs.

Natural language understanding system 118 can be any of a wide variety of different types of natural language understanding systems. It can be a rules-based system or one based on models generated using artificial intelligence and/or machine learning. In one example, author 106 can simply select which type of natural language understanding system (or which particular system) is desired to process natural language in the bot being designed, and API 112 illustratively connects the bot functionality to that particular natural language understanding system 118. When the bot is deployed, it uses the selected natural language understanding system.

Flat view generator 147 generates a view of the linguistic elements (words, numbers, other alphanumeric characters or elements, etc.) used in the bot that is easily readable, in context, by author 106, and that can be easily searched, translated, etc. This is described in greater detail below. Bot storage logic 149 interacts with data store 110 to store the bot, and deployment logic 151 can be used to deploy the bot to a desired channel.

Figure 2:
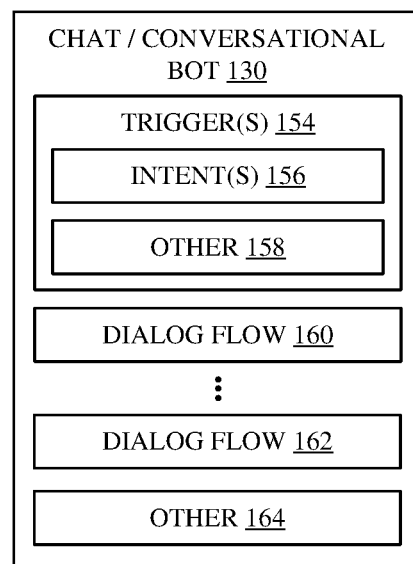
FIG. 2 is a block diagram showing one example of a chat bot or conversational bot.

FIG. 2 is a simplified block diagram illustrating one example of a bot, in more detail. FIG. 2 shows an example of chat/conversational bot 130, after it has been designed. In the example, the bot 130 has one or more triggers 154. A trigger is configured to respond to a triggering event such as an input from an end user, an event in a running dialog, or other things, some of which are described below with respect to FIGS. 8A-8G and FIG. 10. When a triggering event, corresponding to a trigger, occurs, the trigger causes some operation to occur. For instance, the trigger can be configured to (upon the occurrence of its triggering event), launch a dialog flow, or cause the bot to perform other operations in response to the triggering event it is configured for. Triggers 154 can be configured to respond to intents 156, or any of a wide variety of other events 158. When the bot 130 is prompted by one of the triggers 154, it illustratively launches one or more dialog flows 160-162. One example of a dialog flow is described in greater detail below with respect to FIG. 3. The dialog flows are illustratively interruptible so that they may dynamically respond to changes in end user interactions (or other triggering conditions). That is, the bot 130 can launch a different dialog flow in response to detected changes. Bot 130 can have other items 164 as well.

Figure 3:
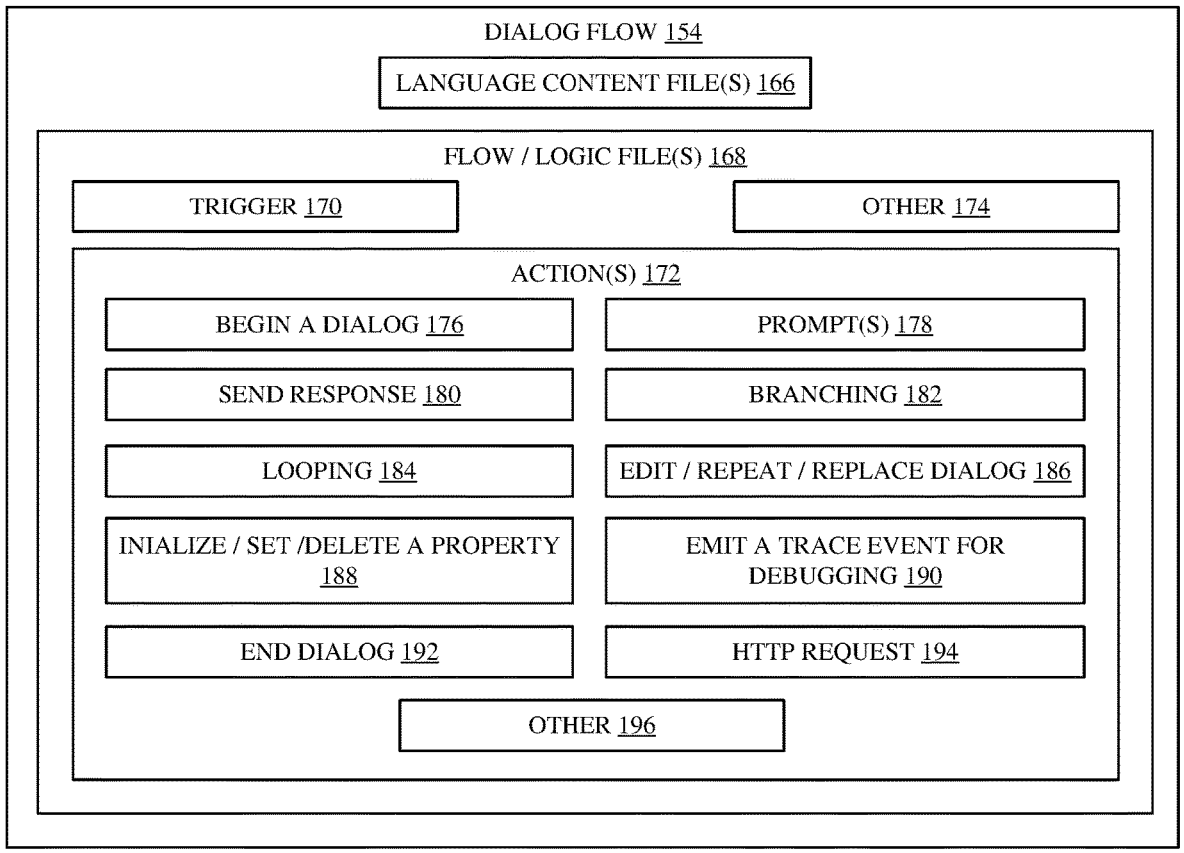
FIG. 3 is a block diagram showing one example of components of a dialog flow.

FIG. 3 is a block diagram showing one example of dialog flow 154, in more detail. It can be seen in FIG. 3 that dialog flow 154 illustratively includes linguistic element content files 166 which include a textual representation of the inputs and outputs used in the dialog. Files 166 can include other alphanumeric content, or other symbols as well. Dialog flow 154 also illustratively includes flow/logic files 168 that define the flow or logic of the bot and how it uses the language content files 166.

The flow/logic files 168 can include triggers 170. They can include any of a wide variety of actions 172, and they can include other items 174. An action is a step of bot execution. Some examples of the actions 172 that can be included in the flow/logic files of a dialog flow 154 include a begin a dialog action 176, prompts 178, a send response action 180, a branching action 182, a looping action 184, edit/repeat/replace dialog actions 186, initialize/set/delete a property actions 188, an emit a trace event for debugging action 190, an end dialog action 192, an HTTP request action 194, and any of a wide variety of other actions 196. Many of the actions 172 are described in greater detail below.

Briefly, however, the begin a dialog action 176 illustratively begins a particular dialog in bot 130. A prompt action 178 prompts the user of the bot for an input. The send response action 180 sends a response, in response to a user input or otherwise. A branching action 182 defines conditions under which different branches are to be taken in the flow or logic of the bot. A looping action 184 controls the bot to loop over various actions or items based on looping criteria. The edit/repeat/replace dialog action 186 causes a dialog to be edited, repeated, or replaced with a different dialog. An initialize/set/delete a property action 188 causes a property of an action or other element to be initialized, set to a particular value, or deleted. An emit a trace event for debugging action 190 illustratively emits trace events that allow a developer to track where processing is occurring through the bot flow/logic 168.

An end dialog action 192 illustratively ends the dialog. An HTTP request action 194 allows the bot to make an HTTP request to an external service, or to another external computing system.

Each of the triggers 170 and actions 172 may have a set of properties that can be configured by author 106. Therefore, when a trigger or action is selected on visual authoring canvas 122, its corresponding property values are displayed in property pane 124, where they can be edited. Also, the JSON serialization of that trigger 170 or action 172, when it is selected on visual authoring canvas 122, is displayed on JSON file display pane 126.

Figure 4:
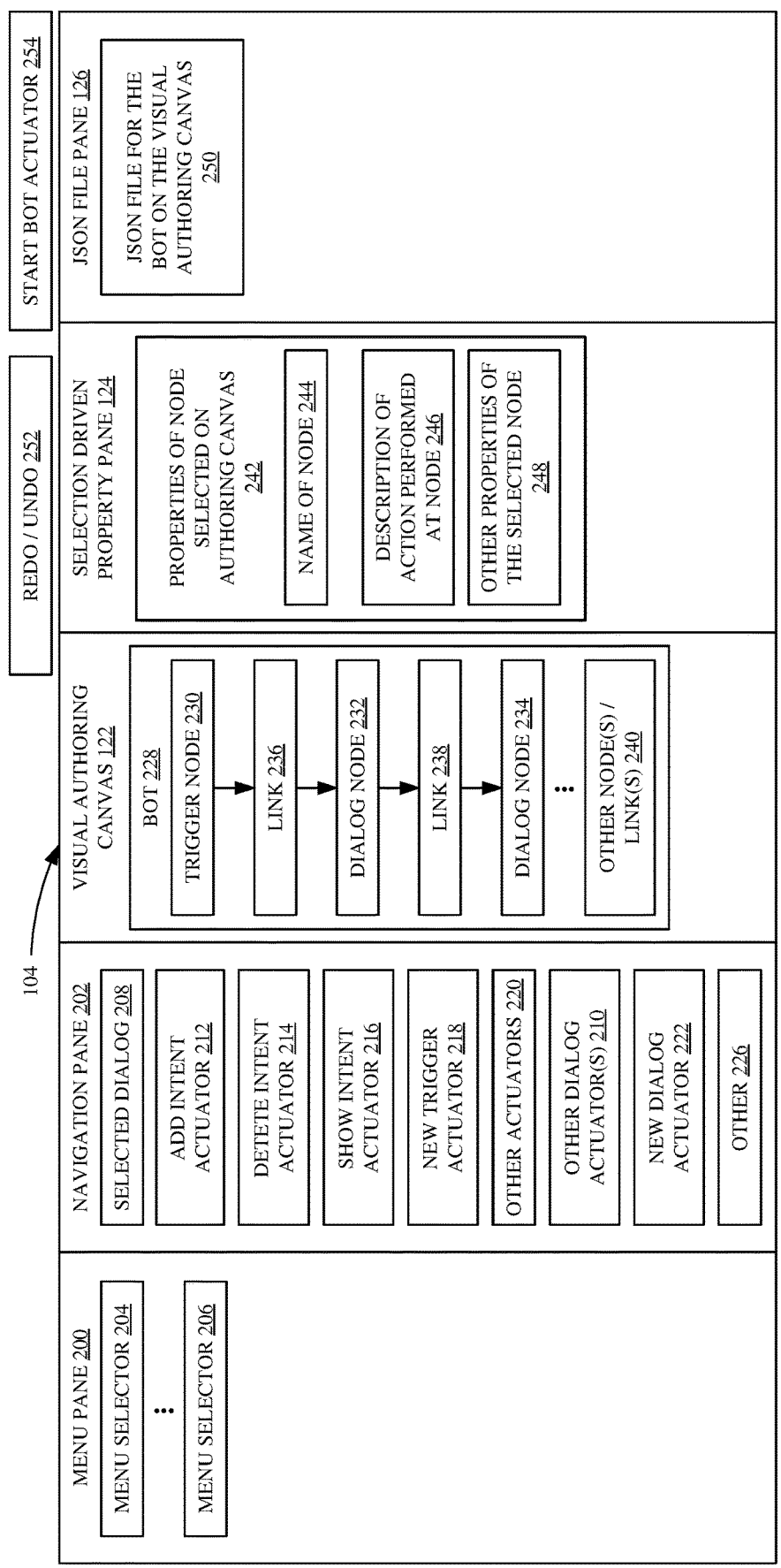
FIG. 4 is a block diagram showing one example of designer user interfaces generated by the visual bot designer computing system.

FIG. 4 is a block diagram showing one example of a set of design user interfaces 104, in more detail. In the example shown in FIG. 4, design user interfaces 104 illustratively include menu pane 200, navigation pane 202, visual authoring canvas 122, selection-driven property pane 124 and JSON file display pane 126. Menu pane 200 can include a plurality of different menu selectors 204-206. Navigation pane 202 can include a plurality of dialog selectors 208-210. When author 106 actuates one of the selected dialog selectors 208-210, the author is navigated to the corresponding dialog, which is displayed on visual authoring canvas 122, property pane 124 and JSON file pane 126. The author 106 can then actuate any of a variety of different actuators 212-220 to take actions to perform design operations on the selected dialog. In the example shown in FIG. 4, those actuators include an add intent actuator 212, a delete intent actuator 214, a show intent actuator 216, a new trigger actuator 218, and it can include other actuators 220. Navigation pane 202 can also illustratively include a new dialog actuator 222. When author 106 actuates new dialog actuator 222, the author is provided with an interface that allows author 106 to begin designing a new dialog using visual authoring canvas 122, selection-driven property pane 124, and/or JSON file pane 126. Navigation pane 202 can include any of a wide variety of other actuators 226 as well.

In the example shown in FIG. 4, visual authoring canvas 122 displays visual elements corresponding to a bot 228. Bot 228 illustratively includes a trigger node 230 corresponding to a trigger that begins a dialog in bot 228. Bot 228 includes a plurality of different dialog nodes 230-232, which can be action nodes in different dialogs, different action nodes in the same dialog, etc. Nodes 230, 232 and 234 are illustratively linked to one another by links 236-238.

In one example, actuators in links 236 and 238 can be actuated in order to insert or add nodes between the two linked nodes. For instance, if the user wishes to add a dialog node between dialog nodes 232 and 234, the user can illustratively actuate link 238 and a menu is displayed which allows the user to add a node. In one example, the menu is defined by the bot schema 144 in API 112. Therefore, interface control logic 147 accesses the bot schema 144 to display different possible actions that the user can generate for insertion between nodes 232 and 234. Bot 228 can include a wide variety of other nodes and/or links 240, as well.

Selection-driven property pane 124 illustratively displays the properties of the node that is selected on the visual authoring canvas 122. These properties are indicated by block 242 in FIG. 4. The properties can include such things as the name of the node 244, the description 246 of an action performed at the node, and a wide variety of other properties 248 of the selected node. In one example, some or all of the properties 242 are editable by author 106. For example, they can be authored using a point and click device to select a property, and then by typing or otherwise editing the property.

JSON file pane 126 illustratively includes a display of the JSON file for the bot displayed on the visual authoring canvas 122. This is indicated by block 250 in the block diagram of FIG. 4. The JSON file is just one example; in other aspects, the displayed file may be another serialization or other representation of the bot being displayed on visual authoring canvas 122. In addition, in one example, when the user selects one of the nodes (or other visual elements) displayed on visual authoring canvas 122, then the selection-driven property pane 124 and the JSON file pane 126 are updated to show the information corresponding to that selected visual element. The reverse is also true. For example, where author 106 selects a portion of the JSON file displayed in pane 126, then the corresponding visual element is selected, highlighted or otherwise visually perceptible on visual authoring canvas 122, and the corresponding properties are displayed on property pane 124.

FIG. 4 also shows that, in one example, user interfaces 104 include a redo/undo actuator 252 (which can alternatively be separate actuators), and a start bot actuator 254. As is described in greater detail below, when author 106 actuates redo/undo actuator 252, the user can navigate between different functional states of the bot being designed. By functional it is meant that the bot will operate, although it may not operate as intended by author 106. Similarly, when author 106 actuates start bot actuator 254, the bot being designed is launched so that it the author 106 may interact with the bot as it will be deployed (such as to test the bot, etc.).

Figure 5:
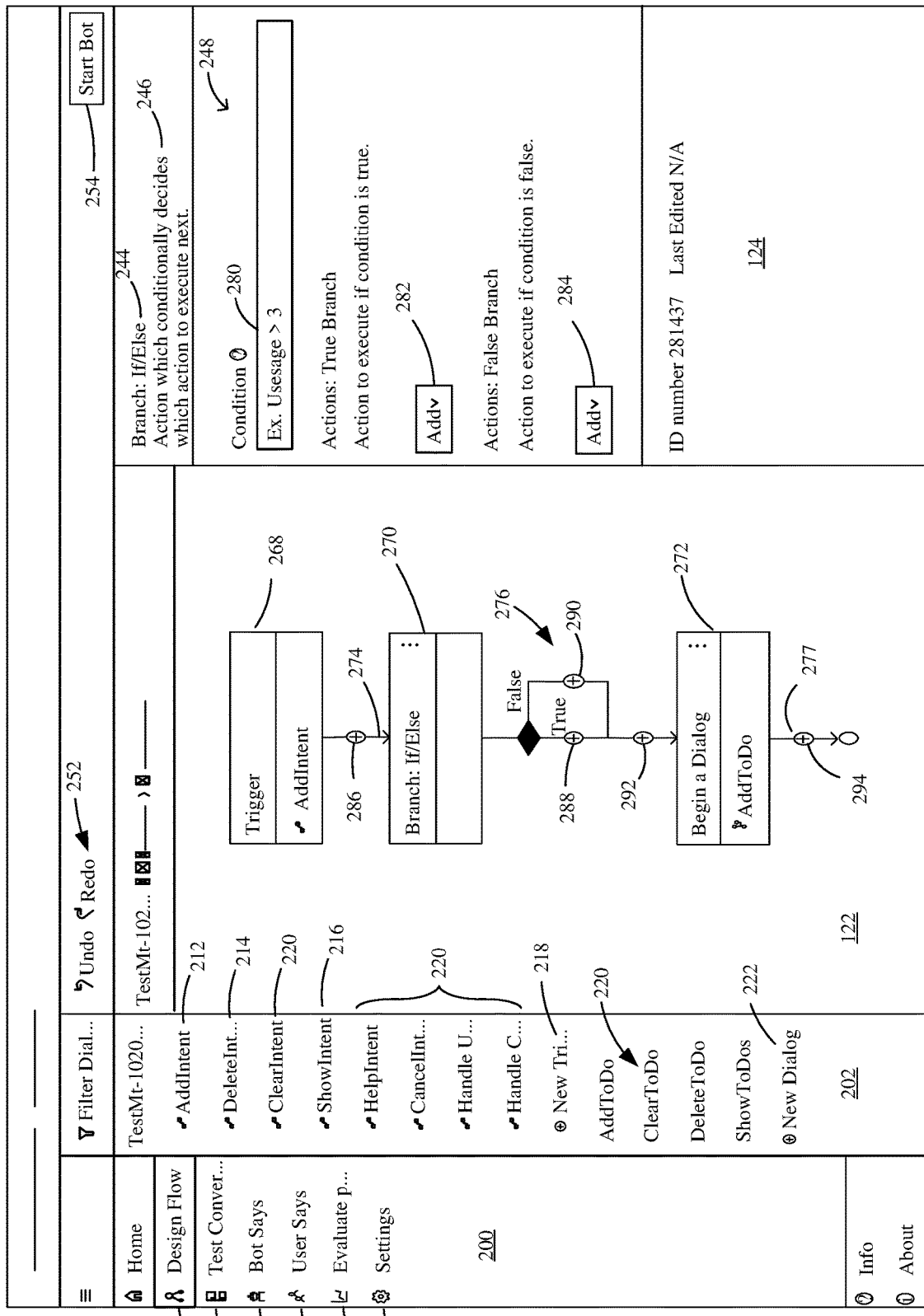
FIG. 5 is a screen shot showing a particular example of one user interface.

FIG. 5 is an illustration of a user interface display representing an example designer user interface 104. The example shown in FIG. 5 shows menu pane 200, navigation pane 202, visual authoring canvas 122, and selection-driven property pane 124. Some of the items shown in FIG. 5 are similar to those shown in FIG. 4, and they are similarly numbered.

In the example shown in FIG. 5, menu pane 200 includes menu selectors that allow different information corresponding to a bot to be displayed on interface 104. For example, design flow actuator 256 can be selected by author 106 to display information such as that shown in FIG. 5. Visual authoring canvas 122 shows visual elements corresponding to the design flow of the selected bot. Menu pane 200 can include a "test conversation" actuator 258 that can be actuated to test the conversation portion of the bot being designed. Menu pane 200 includes a "bot says" actuator 260 and a "user says" actuator 262. These actuators can be selected by the author to display, in pane 122, the dialog that is output by the bot, and the dialog that is expected from the user of the bot, respectively. An "evaluate performance" actuator 264 can be actuated to evaluate the performance of the bot against test data, and a settings actuator 266 can be actuated to display and modify settings.

Navigation pane 202 illustratively has a plurality of different actuators, some of which are discussed above with respect to FIG. 4.

Visual authoring canvas 122 shows visual elements corresponding to a bot that is being designed. The illustrated visual elements include a trigger node 268, a branching node 270, and a begin dialog node 272. Nodes 268 and 270 are connected by link 274, and nodes 270 and 272 are connected by branching link 276. FIG. 5 also shows that trigger node 268 represents a trigger that is activated by particular end user input that reflects an intent of the user (what the user wishes to do). An intent can be used as a triggering event to activate a trigger. An intent can be mapped to an utterance (spoken, typed or otherwise) input by a bot end user, in the natural language understanding system 118. For instance, the user may speak or type a phrase or utterance such as "display my to-do list". The end user input is provided to natural language understanding system 118 (shown in FIG. 1) which will return a recognized intent. That intent is illustratively mapped to one or more different triggers, which may include trigger 268. When the bot is deployed, trigger 268 will cause a dialog in the corresponding node to run.

Branching node 270 represents a branch if/else action. This allows the author 106 to introduce a branch into the bot logic flow, such that the logic flow will follow one branch if a certain condition is met, and a different branch if the condition is not met.

Begin a dialog node 272 corresponds to an action which begins a dialog in the bot being designed. In the illustrated example, when the bot is deployed and processing reaches node 272, a dialog corresponding to an "add to-do" action will commence. This will illustratively navigate the bot end user through an experience which allows the bot end user to add an item to the user's to-do list.

It can be seen in FIG. 5 that the author 106 has selected the branching node 270. The properties for the branching node 270 are thus displayed in the selection-driven property pane 124. Thus, pane 124 includes a name 244 of the branching node, in this case "branch: if/else". It also illustratively includes a description of the action performed at the node 246. In this case, the description reads: "action which conditionally decides which action to execute next". It also includes additional properties 248. The additional properties 248 include a description of the condition as indicated by block 280. In one example, author 106 can type into a text box to define the condition. In another example, author 106 can select a condition from a drop-down menu, etc.

Properties 248 also define the actions that are to be taken if the condition 280 is true or false. Thus, pane 124 includes a "true branch" actuator 282 and a "false branch" actuator 284. If the condition is true, author 106 can select actuator 282 to define the actions that are to be performed. Author 106 can select actuator 284 to define the actions that are performed if the condition 280 is false. In one example, author 106 can select actuators 282 and 284 to add multiple actions into the true branch, and/or the false branch.

When the author 106 defines actions in the true branch or the false branch, visual elements corresponding to those actions are added into the corresponding branch in the link 276 on visual authoring canvas 122.

FIG. 5 also illustrates other manners of adding conditions and nodes to the bot. Each of the links 274, 276 and 277 has a corresponding "add" actuator that can be actuated to add actions (or nodes). Link 274 includes add actuator 286. When it is actuated by author 106, author 106 is provided with functionality (such as a drop-down menu or other functionality) to identify another action (or node) to be added to the design flow. Link 276 has add actuator 288 in the true branch, add actuator 290 in the false branch, and add actuator 292 after the branches. Therefore, if actuator 288 is selected by author 106, author 106 can add nodes in the true branch. This is another way to add functionality to the true branch, in addition or alternatively to selecting actuator 282 in the property pane 124. Similarly, when the author 106 selects add actuator 290, the author can add actions into the design flow in the false branch. When the author selects actuator 292, the author 106 can add actions into the design flow below the true and false branches.

Also, when the author selects add actuator 294 in link 277, the author can add actions (or nodes) to the design flow following node 272.

Figure 6A:
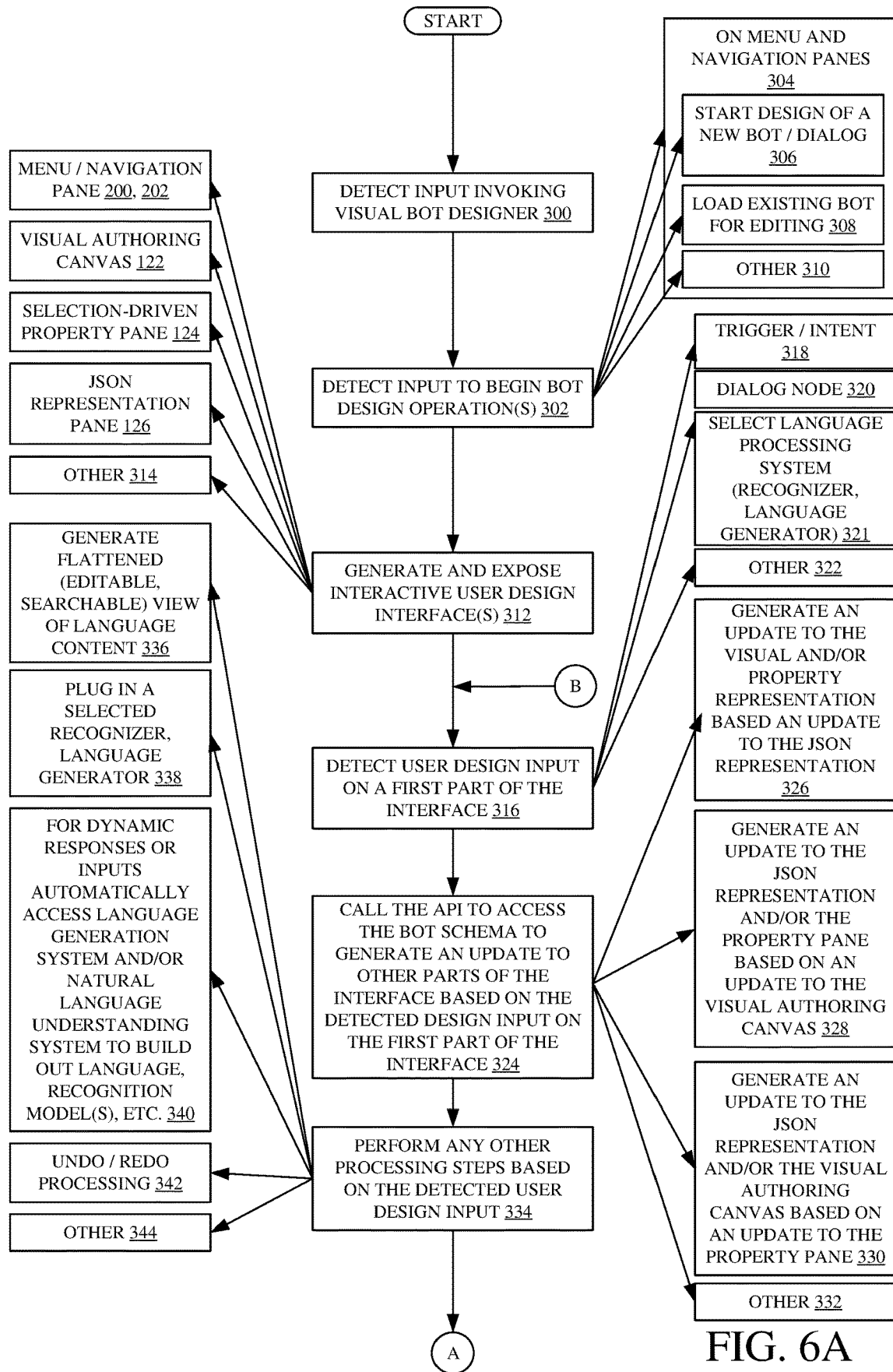
FIGS. 6A and 6B (collectively referred to herein as FIG. 6) show a flow diagram illustrating one example of a design operation performed using the visual bot designer computing system illustrated in FIG. 1.
Figure 6B:
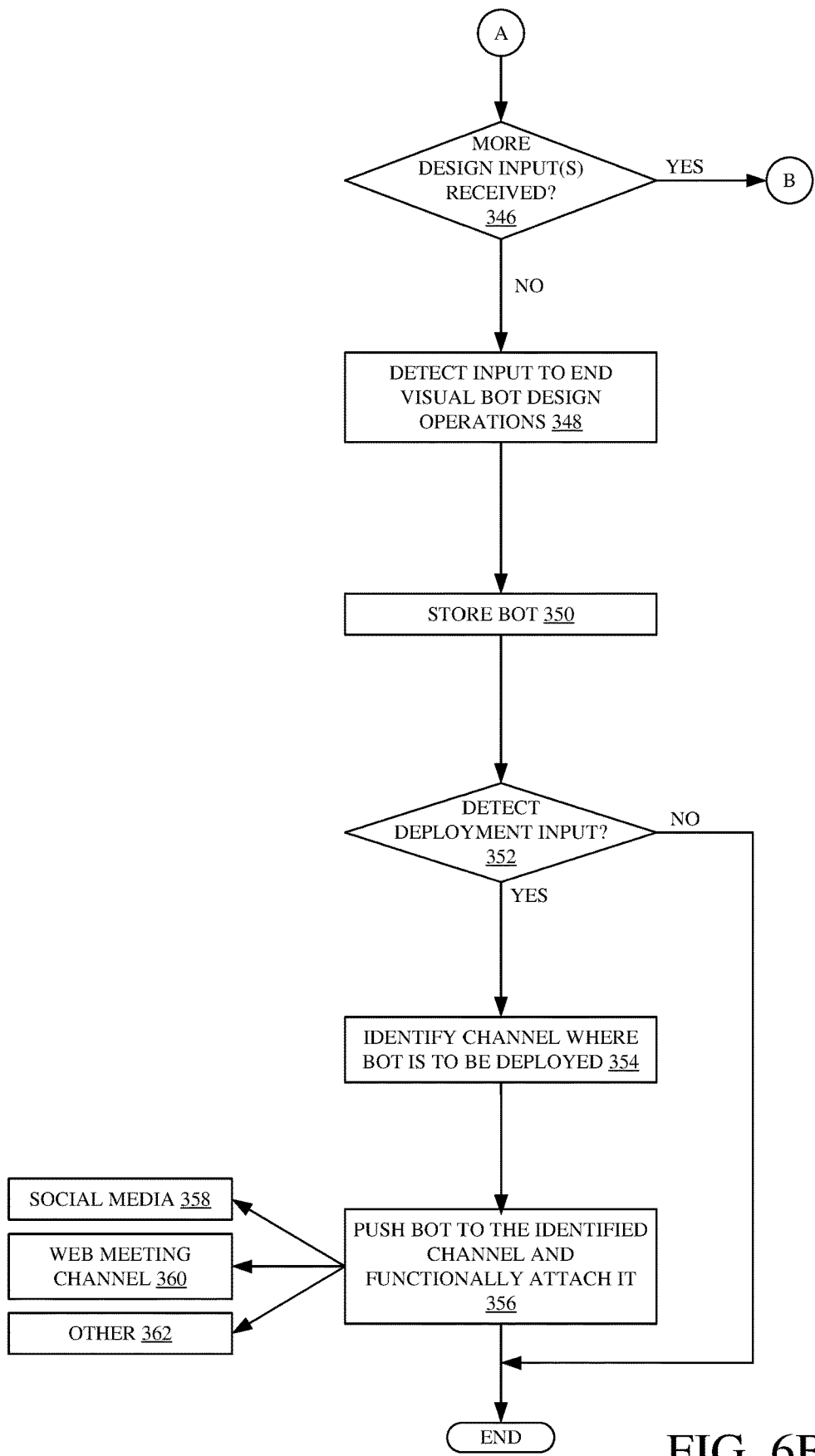

FIGS. 6A and 6B (collectively referred to herein as FIG. 6) show a flow diagram illustrating one example of the overall operation of a design experience using visual bot designer computing system 102. It is first assumed that author 106 provides an input invoking, or launching, visual bot designer computing system 102 in order to design, author, or modify a bot. Detecting the input invoking the visual bot designer is indicated by block 300 in the flow diagram of FIG. 6. Visual bot designer computing system 102 then detects author inputs indicating that author 106 wishes to begin performing bot design operations. This is indicated by block 302. For instance, author 106 can provide an input on menu pane 200 actuating design flow actuator 256 (shown in FIG. 5). Author 106 can also provide an input on navigation pane 202 selecting a particular bot to modify, or selecting an actuator to generate a new bot, etc. Detecting inputs on the menu and navigation panes is indicated by block 304 in the flow diagram of FIG. 6. The inputs can indicate that author 106 wishes to start design of a new bot/dialog 306. This can be done by the author selecting an actuator to begin design of a new bot or a new dialog. Alternatively, the inputs may indicate that author 106 wishes to load an existing bot or dialog for editing 308. The detected inputs can indicate a wide variety of other items as well, as indicated by block 310.

In response, visual bot designer computing system 102 accesses the schema 144 to obtain a representation of the interfaces to be generated and illustratively generates and exposes the designer user interfaces 104. This is indicated by block 312. As discussed above, the designer user interfaces 104 can include the menu and navigation panes 200, 202, the visual authoring canvas 122, selection-driven property pane 124, JSON representation pane 126, and a wide variety of other interface elements as well, as indicated by block 314.

Designer user interface 104 then detects an author input on a first part of the interface. This is indicated by block 316 in the flow diagram of FIG. 6. For instance, the author can provide an input on visual authoring canvas 122, on selection-driven property pane 124, on JSON file pane 126, or on another part of the user interface. The author can provide an input to generate or modify a trigger and/or intent, as indicated by block 318, to modify another dialog node, as indicated by block 320. The author 106 can provide an input configuring the bot to use a particular, external or remote, language processing system (such as language generation system 116 and/or natural language understanding system 118). This is the language processing system the bot will use during runtime. This authoring input is indicated by block 321. By way of example, author 106 may be configuring an action, represented by a node on canvas 122, that uses natural language understanding. Author 106 can thus select a system that is to be used during execution of that action. Author 106 can also provide another design input, as indicated by block 322.

When the user provides an input on one part of the designer user interface 104, that part of the user interface (or interface control logic 127) calls API 112 indicating the input. API 112 then uses schema 144 to determine how the updates should be reflected on the other designer user interfaces 104 and generates the update on the other portions of the designer user interface 104. Generating an update on the other parts of the interface based on the detected design input of the first part of the interface is indicated by block 324 in the flow diagram of FIG. 6 and is described in greater detail below with respect to FIG. 6C.

Briefly, by way of example, author 106 may edit the JSON string displayed on JSON file display pane 126. In response, API 112 uses code translator/generator 146 which accesses schema 144 to identify how that edited JSON string should be represented in the other interfaces 104. It uses the information in the schema 144 to generate updates to the visual authoring canvas 122 and property pane 124. This is indicated by block 326 in the flow diagram of FIG. 6. When author 106 makes a change to visual authoring canvas 122, then API 112 uses code translator/generator 146 to access schema 144 and update the property pane 124 and JSON file display pane 126 to reflect that update. This is indicated by block 328. When author 106 makes changes to the properties displayed in property pane 124, then API 112 uses code translator/generator 146 to access schema 144 and generate updates to the visual authoring canvas 122 and the JSON file display pane 126. This is indicated by block 330 in the flow diagram of FIG. 6. API 112 can detect changes to one part of design user interfaces 104 and update the other parts in other ways as well, and this is indicated by block 332 in the flow diagram of FIG. 6.

Designer user interfaces 104 and/or API 112 then perform any other processing steps based on the detected user design input. This is indicated by block 334 in the flow diagram of FIG. 6. For instance, when the author 106 inputs language that is expected by the bot, from an end user of the bot, or inputs language that is to be output by the bot, during use, then flat view generator 147 illustratively generates a "flat view" of the language content. In one example, this is a file that stores bot responses and expected user inputs, in context relative to one another so that they can be viewed. This can be used for search and replace of various terms, for localization (e.g., translation into different languages, or localization with respect to a single language), or for other reasons. Generating the flattened view of the language content is indicated by block 336 in the flow diagram of FIG. 6.

The author 106 may also select a particular language generation system 116 or natural language understanding system 118 that is to be used by the bot. In response, a reference to the particular recognizer or language generator is added to the bot logic so it can be accessed during runtime, once the bot is deployed. This is indicated by block 338 in the flow diagram of FIG. 6.

Also, where author 106 provides an expected input or an output to be generated by the bot, dynamic responses or inputs can be generated. For instance, the author may provide a relatively small number of examples of responses that are expected from a bot end user. In response, language/ model building control logic 145 in API 112 can provide that information to language generation system 116 which will generate additional expected responses, or a model that can be used to identify expected responses, during use. Similarly, when the author provides an example bot response to the end user, then logic 145 in API 112 illustratively provides that information to language generation system 116 which generates additional examples of dialog that the bot can use. This may be useful so that the bot does not simply repeat the same phrase every time a particular point is reached in the logic flow of the bot. Instead, the bot may choose from a plurality of different outputs, so that the output doesn't become repetitive. This can be done, for instance, by introducing a looping action that loops over a set of different alternative linguistic expressions. Similarly, conditions can be inserted so that, in response to a particular condition (for example, a particular day such as a holiday) different responses can be used. Language generation system 116 can further utilize natural language understanding system 118 in generating the additional examples or models for the expected inputs or outputs that are generated by the bot. Processing dynamic responses by using different expressions to avoid redundancy or based on other conditions or criteria, is indicated by block 340 in the flow diagram of FIG. 6. The variations in responses can be stored and referred to in a language generation template which is described in greater detail below.

Language/model building control logic 148 can interact with language generation system 116 and/or natural language understanding system 118 in other ways as well. Where the author 106 has actuated one of the undo/redo actuators 252, then undo/redo logic 150 performs undo/redo processing to allow author 106 to switch between operational versions of the bot application. This is indicated by block 342 in the flow diagram of FIG. 6, and it is described in greater detail below with respect to FIGS. 15A and 15B.

As long as user 106 continues to provide design inputs to designer user interfaces 104, processing reverts to block 316. This is indicated by block 346 in the flow diagram of FIG. 6.

When author 106 wishes to end the visual bot design operations, the author will provide an input to that effect, such as clicking a close actuator. This is indicated by block 348. In that case, bot storage logic 149 illustratively stores the bot in data store 110 for further designing and/or deployment. This is indicated by block 350. When a deployment input is detected, as indicated by block 352, then bot deployment logic 151 identifies a channel where the bot is to be deployed. This is indicated by block 354. This can be provided, for instance, by author 106, or in other ways. Logic 151 then pushes the bot to the identified channel and functionally attaches it to that channel, as desired. This is indicated by block 356. For instance, the bot may be deployed in a social media channel 358, a web meeting channel 360, or any of a wide variety of other channels 362.

It will also be noted that, during the bot designer experience, bot validation logic 148 can perform validation operations, as author 106 stores changes, revisions, or other design inputs. Thus, bot validation logic 148 can identify invalid expressions, missing logic elements, or other validation issues, and surface them for author 106 during the design experience, when the author attempts to store or run the bot, or in other ways.

Figure 6C:
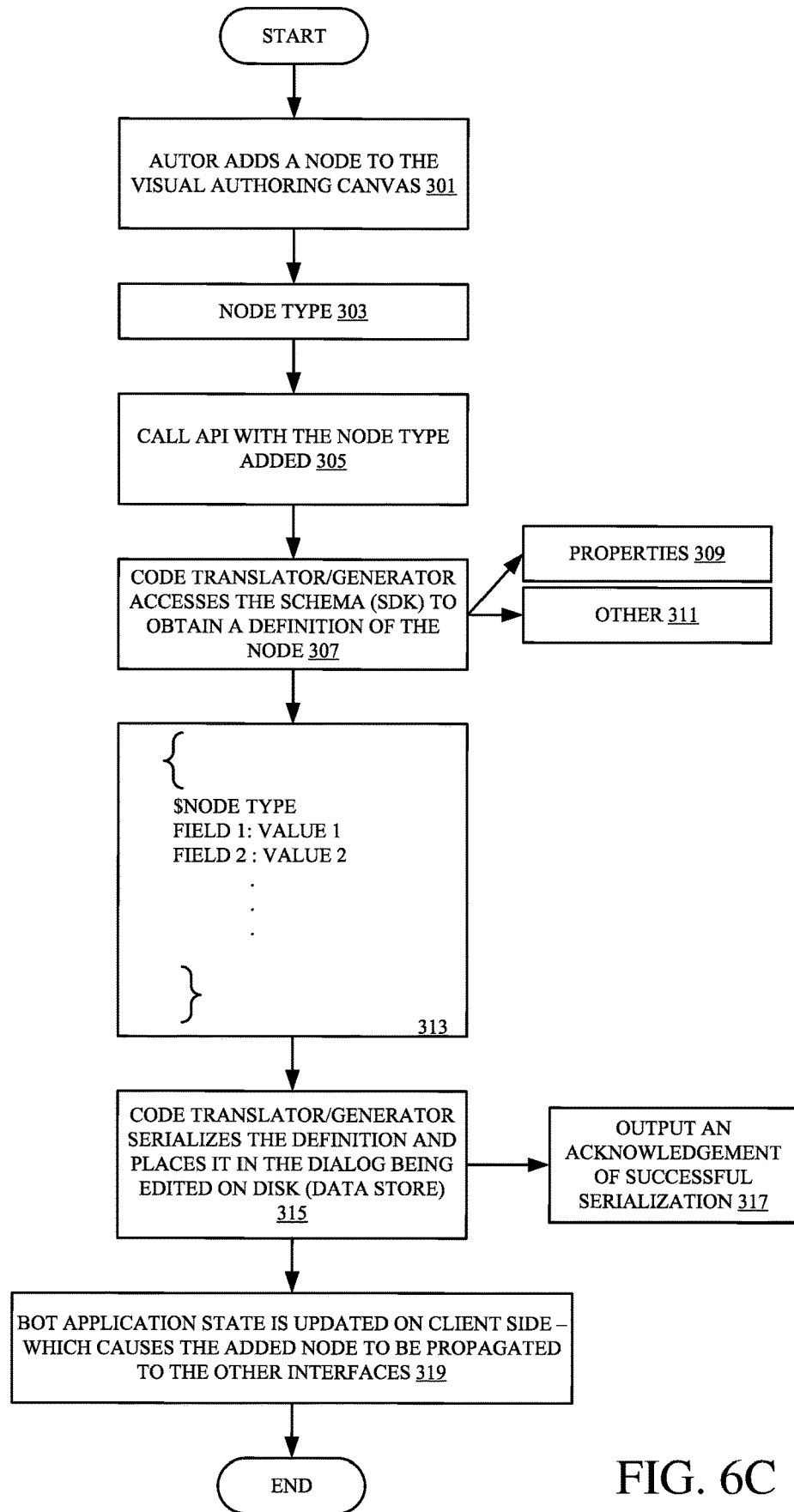
FIG. 6C shows one example of propagating a change on one interface to another interface.

FIG. 6C shows one example of how changes to one of the interfaces 104 can be propagated to the other interfaces 104. Propagation is described as detecting an author change to the visual authoring canvas 122 and propagating the change to the other interfaces. However, the same type of propagation occurs regardless of where the author change is detected.

It is first assumed that author 106 makes a change to visual authoring canvas 122 by adding a node, of a given node type. This is indicated by block 301 and the node type is indicated by block 303 in FIG. 6C. Interface control logic 127 makes an API call to communicate this to code generator/translator 146. This is indicated by block 305.

Code generator/translator 146 then accesses bot schema 144 which can be an SDK, to obtain the schema definition for node that has been added by author 106. This is indicated by block 307. The schema definition can include properties 309 of the node and other items 311. A partial example of a schema definition is shown at block 313. The schema definition 313 is provided to code translator/generator 146, which serializes the definition and places the serialized definition in the dialog being edited, in data store 110. This is indicated by block 315 Code translator/generator 146 can output an acknowledgment indicating that the serialization has been successful as well. This is indicated by block 317.

Code translator/generator 146 then provides an update of the bot application state to the designer user interfaces 104, or to a client system that may be implementing the designer user interfaces 104. The interface control logic 127 then propagates the changes to panes 124 and 126, based on the updated bot application state received from the code translator/generator 146 in API 112.

Figure 7A:
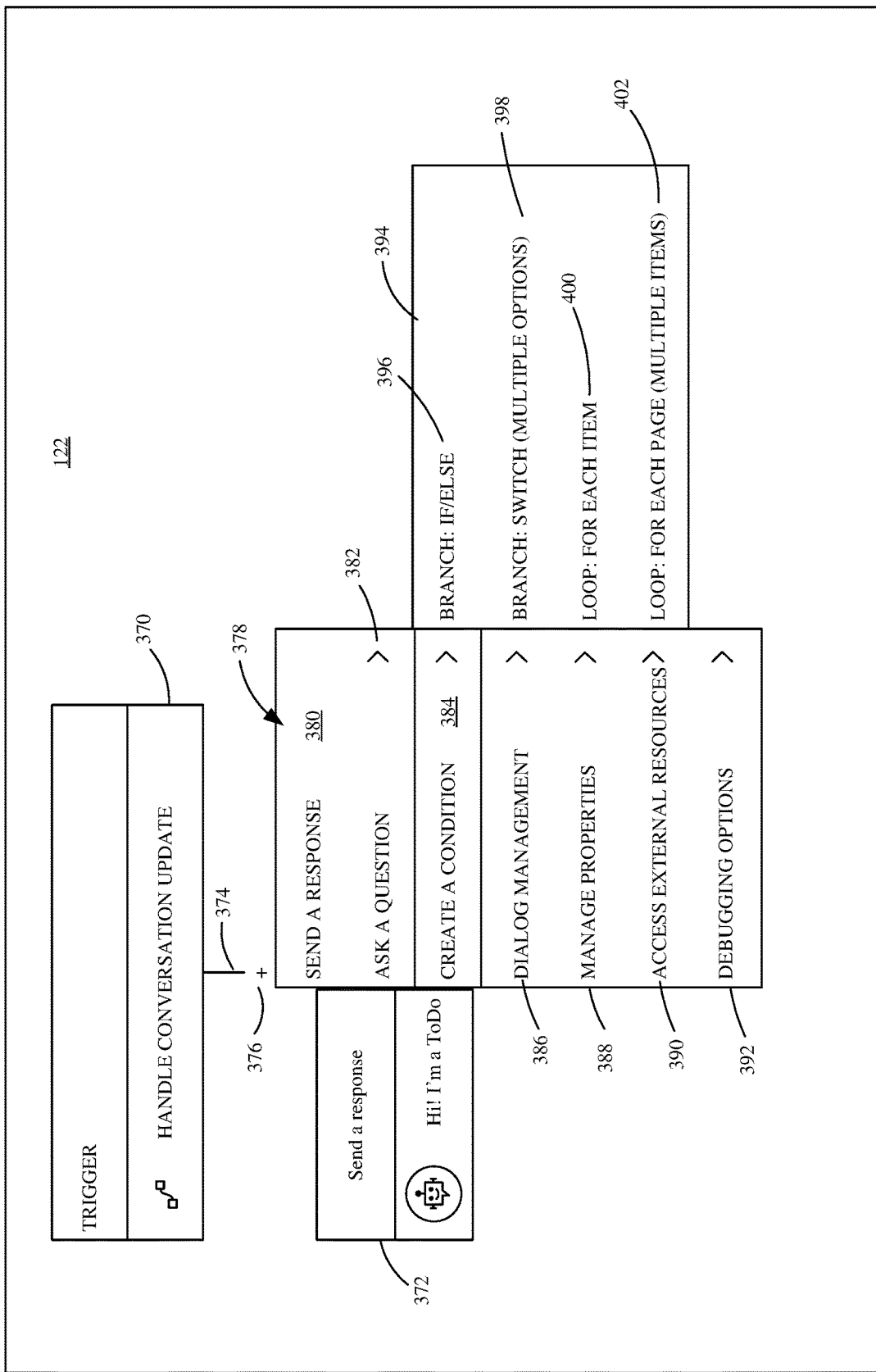
FIG. 7A is a screen shot illustrating one mechanism for adding visual elements to the visual authoring canvas.

FIG. 7A shows one example of how visual elements (e.g., nodes) can be added to visual authoring canvas 122 (and thus how triggers and actions can be added to the bot being designed). It can be seen in FIG. 7A that a trigger node 370 has been added to canvas 122. The trigger node has been configured to be activated when a conversation update is detected that is made to the conversation being executed by the bot. A "send a response" node 372 has also been added. A link 374 between nodes 370 and 372 includes an "add" actuator 376 that can be actuated by author 106 in order to add nodes or other visual elements to canvas 122 between nodes 372 and 374. It can also be seen in FIG. 7A that author 106 has selected add actuator 376. Interface control logic 127 detects this actuation and provides an indication of the actuation to bot schema (or logic) 144 in API 112. Logic 144 identifies what actions can be taken when actuator 376 is selected. It provides identified actions to interface control logic 127 which generates a drop-down menu 378 that has a plurality of actuators that can be selected to add items between nodes 370 and 372.

In the example shown in FIG. 7A, the actuators, when selected, allow author 106 to insert actions between nodes 370 and 372. Actuator 380 allows author 106 to insert a send response action 180 (shown in FIG. 3). Actuator 382 allows author 106 to insert functionality (an action) for asking a question. Actuator 384 allows author 106 to insert a branching action 182 or looping action 184. Actuator 386 allows author 106 to insert a dialog management action. Actuator 388 enables property management actions. Actuator 390 allows author 106 to insert functionality (or an action) to make an HTTP request 194 or perform other actions accessing external resources, and actuator 392 allows author 106 to insert emit a trace event functionality (or action) 190 or other debugging options.

FIG. 7A shows that author 106 has selected the "create a condition" actuator 384. In response, interface control logic 127 detects the actuation and provides an indication of the actuation to logic 144 in API 112. Logic 144 provides information to interface control logic 127 indicating the types of actions that can be taken, and interface control logic 127 displays panel 394 with a plurality of actions, including inserting branching or looping logic. Actuator 396 allows author 106 to insert a branch: if/else action. Actuator 398 allows author 106 to insert a branch switch (multiple options) action. Actuator 400 allows author 106 to insert a loop: for each item action, and actuator 402 allows author 106 to insert a loop: for each page (multiple items) action. If the author 106 selects one of actuators 396-402, then the corresponding display element is displayed between nodes 370 and 372 on canvas 122. At the same time, the property pane 124 and JSON file display pane 126 are updated as well, as discussed above. In one example, author 106 can collapse or hide different panes to see only the ones he or she wishes to see.

Figure 7B:
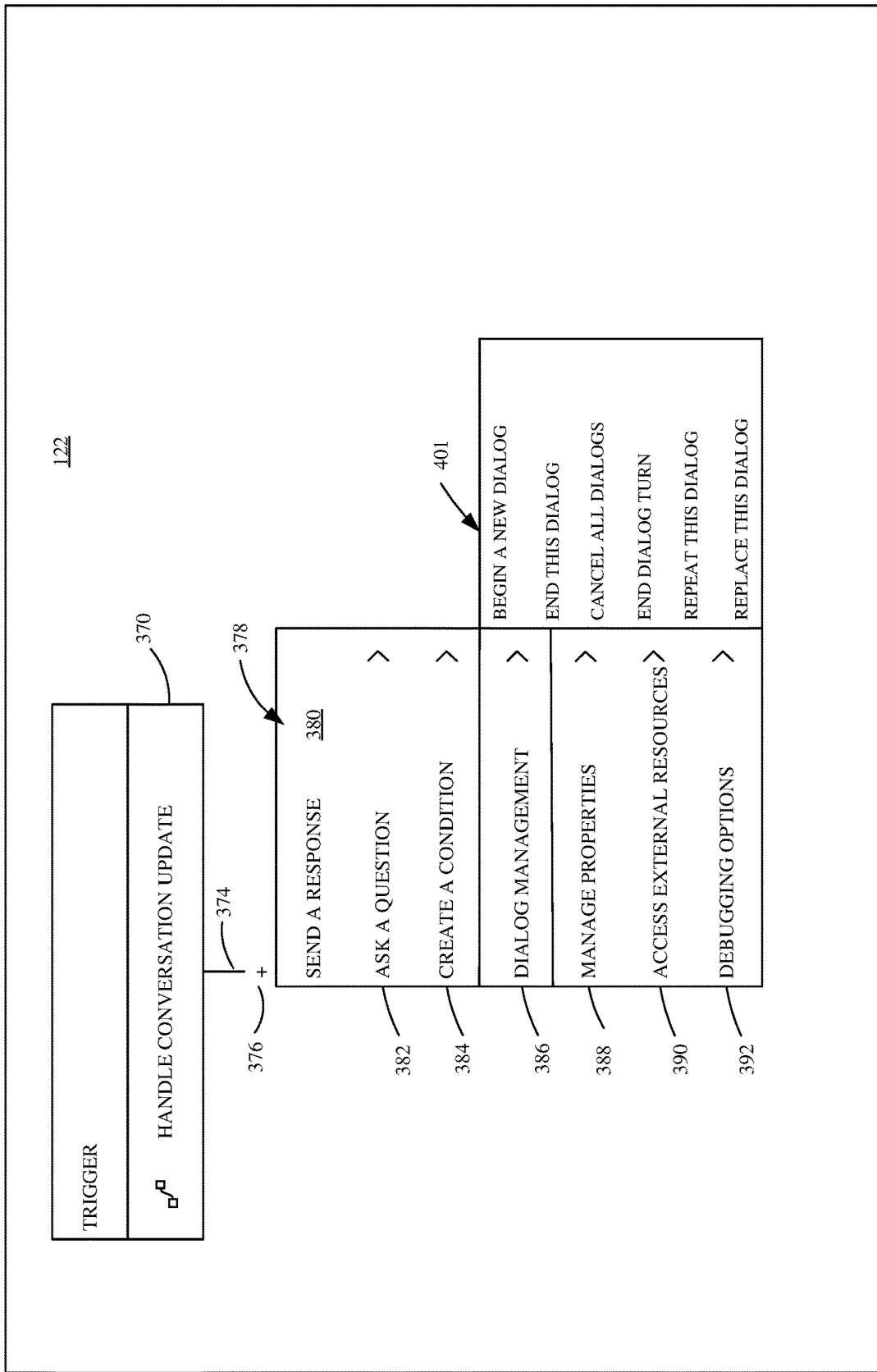
FIG. 7B is an example of a user interface that is similar to FIG. 7, but it shows a set of dialog management actuators.

FIG. 7B is similar to FIG. 7A, except that the dialog management actuator 386 is actuated to show a plurality of different actuators 401 that author 106 can use to manipulate the flow of conversation. Those actuators can include starting a new dialog, ending the current dialog, canceling all dialogs, ending a dialog turn, repeating the current dialog, and replacing the current dialog. Some of these are described in more detail below.

FIGS. 8A-8G show user interface displays that can be displayed on property pane 124, and that allow author 106 to configure different types of triggers in the logic or dialog flow for the bot being designed.

Figures 8A, 8B:
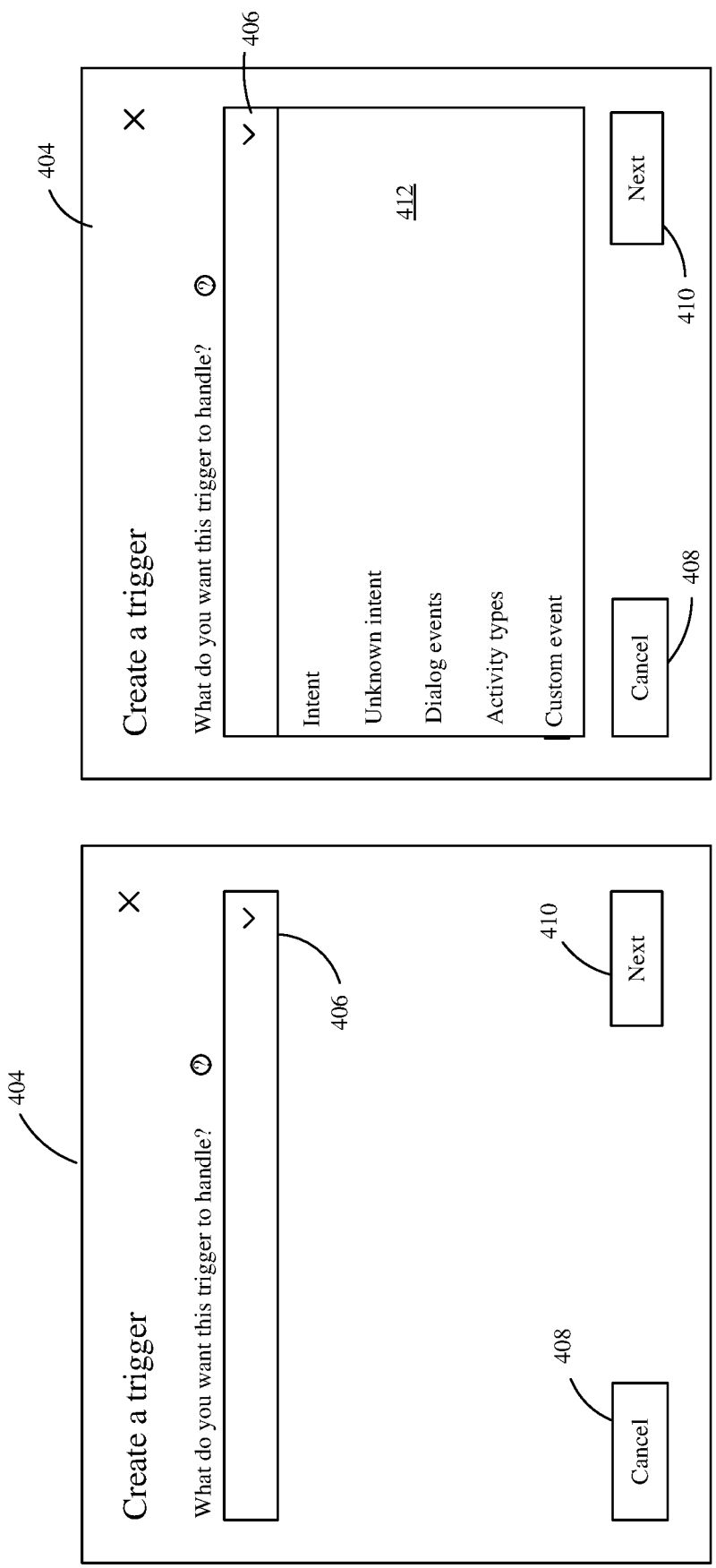

In one example, when a trigger is inserted in the bot, it can handle various items. Author 106 can configure it by defining the particular item that the trigger will handle. FIG. 8A thus shows a user interface display 404 that can be displayed in property pane 124 when a trigger is to be added to the bot. Display 404 indicates that it is a "create a trigger" display and asks author 106 what this trigger is to handle. It then provides an actuator 406 that can be actuated by author 106 to select a particular item that the trigger is to handle. User interface display 404 also includes a cancel actuator 408 and a next actuator 410 that can be used to cancel the trigger creation or to navigate to a next step, respectively.

FIG. 8B is similar to FIG. 8A, except that it shows that the user has now selected actuator 406 such that a drop-down menu 412 is displayed. Drop-down menu 412 indicates a number of items that can be selected by author 106 to configure the trigger being created. The drop-down menu 412 indicates the different items, defined by schema 144, that a trigger can respond to. Items may include an intent (known or unknown), dialog events, activity types, and custom events, among other items.

An intent can be identified when a bot end user provides a natural language input. The natural language input may be provided to a natural language understanding system 118 which may map that natural language input to an intent, indicating what the user wishes to accomplish with the bot. An unknown intent is encountered when the natural language understanding system does not have a particular intent matched to the natural language input provided by the user. A dialog event may be raised by a dialog in the bot, or in a different bot. An event is can be any processing step that generates an output that can be deleted. An activity type indicates an action that is performed by the user or the bot, and a custom event is an event that may be customized by author 106. These are just examples of the types of items that a trigger can handle.

FIG. 10 is one example of a list of items that triggers can handle (or triggering events that can activate a trigger), as defined by schema 144. FIG. 10 shows that each item has a name, a description, a base dialog event that serves as the triggering event, and any conditions that are pre-built into logic 144. A pre-built condition is added when creating certain dialog components. One example is upon receiving a conversation update event. This event can be used, for instance, to welcome users once they join the conversation. However, the trigger needs to be configured in a certain way to achieve this. Since this is a common use case of the "HandleConversationUpdate" trigger, when the trigger is created, the necessary condition to evaluate when a user joins the conversation is also automatically created. An example condition can be:

Condition: toLower(turn.Activity.membersAdded[0].name)!='bot'

FIG. 10 also shows an example list of particular dialog events that a dialog event trigger may be configured to respond to, or handle.

FIG. 8C is similar to FIG. 8B, except that it shows that the user has selected the "intent" item from drop-down menu 412. Thus, it is displayed in actuator box 406. Once an intent has been selected, the author 106 is prompted to enter the name of the intent that is to be handled. This can be provided in text box 414.

FIG. 8D is similar to FIG. 8C, except that it can be seen that the user has instead selected the "dialog events" item from drop-down menu 412 as the item that the trigger is to handle. In response, the author 106 is prompted to select a dialog event. Thus, author 106 can select actuator 416 to be provided with another drop-down menu of the various dialog events that can be selected. They are determined by schema 144, and one example of a set of dialog events is shown in FIG. 10.

Figures 8E, 8F, 8G:
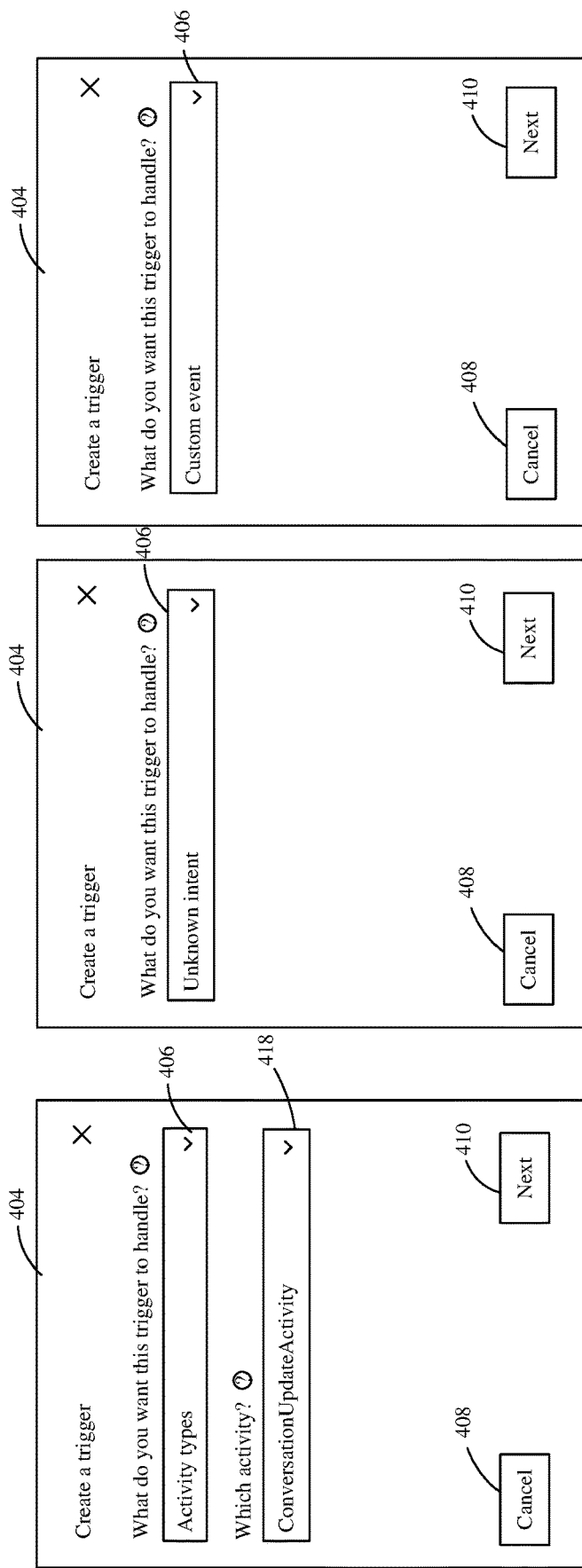

FIG. 8E is similar to FIG. 8D except that, instead of selecting a dialog event, author 106 has selected an activity type. In response, author 106 is provided with actuator 418 for specifying the particular activity that the trigger is to handle. Some examples of activity types are shown in FIG. 10.

FIG. 8F is similar to FIG. 8E, except that the author 106 has selected an unknown intent as the item that the trigger is to handle. FIG. 8G is similar to FIG. 8F, except that the user has selected a custom event as the item that the trigger is to handle.

Figure 8H:
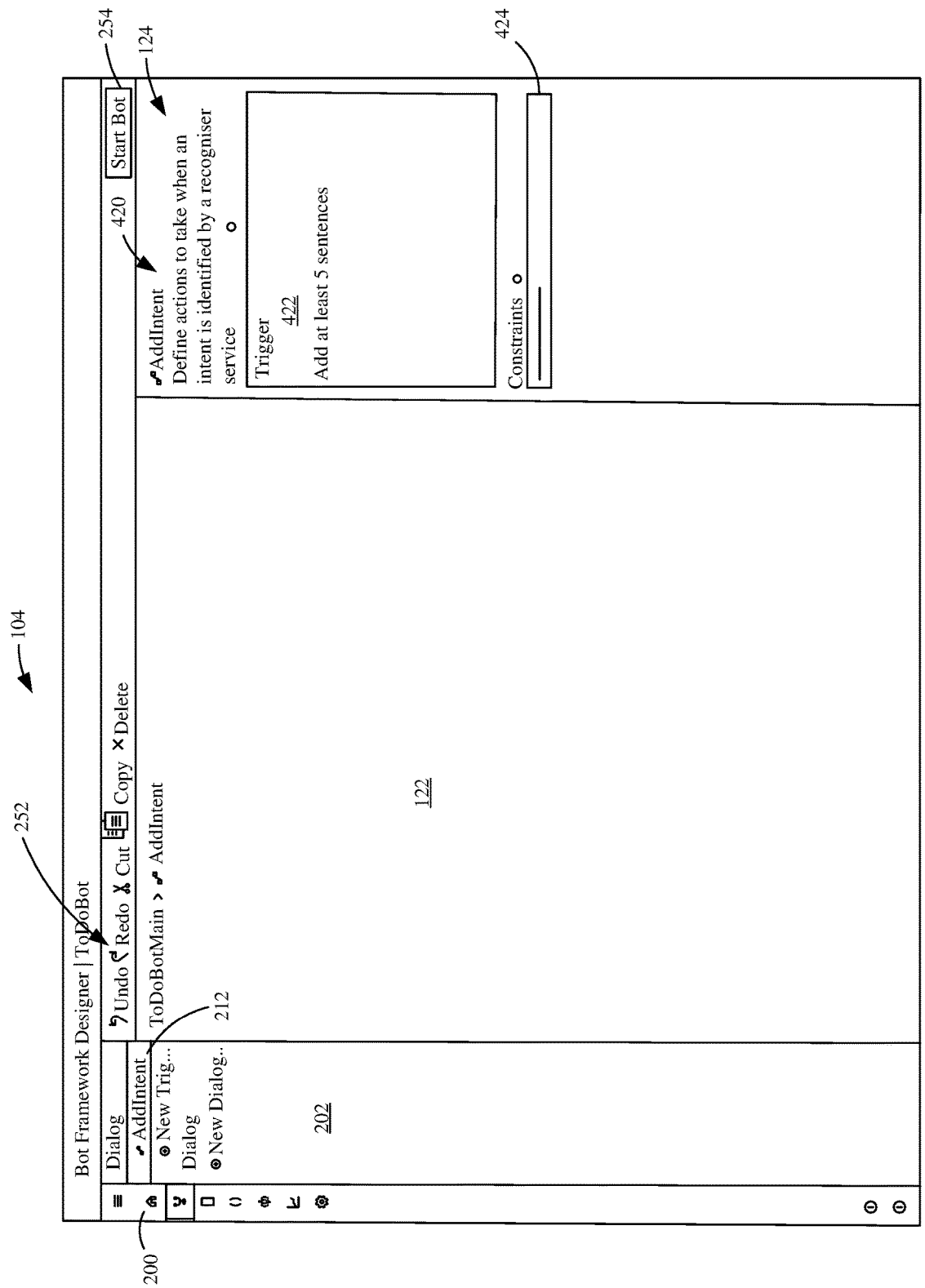
FIGS. 8H, 8I, and 8J show examples of a user interface in which a user can author events that triggers handle, in the bot being designed.
Figure 8I:
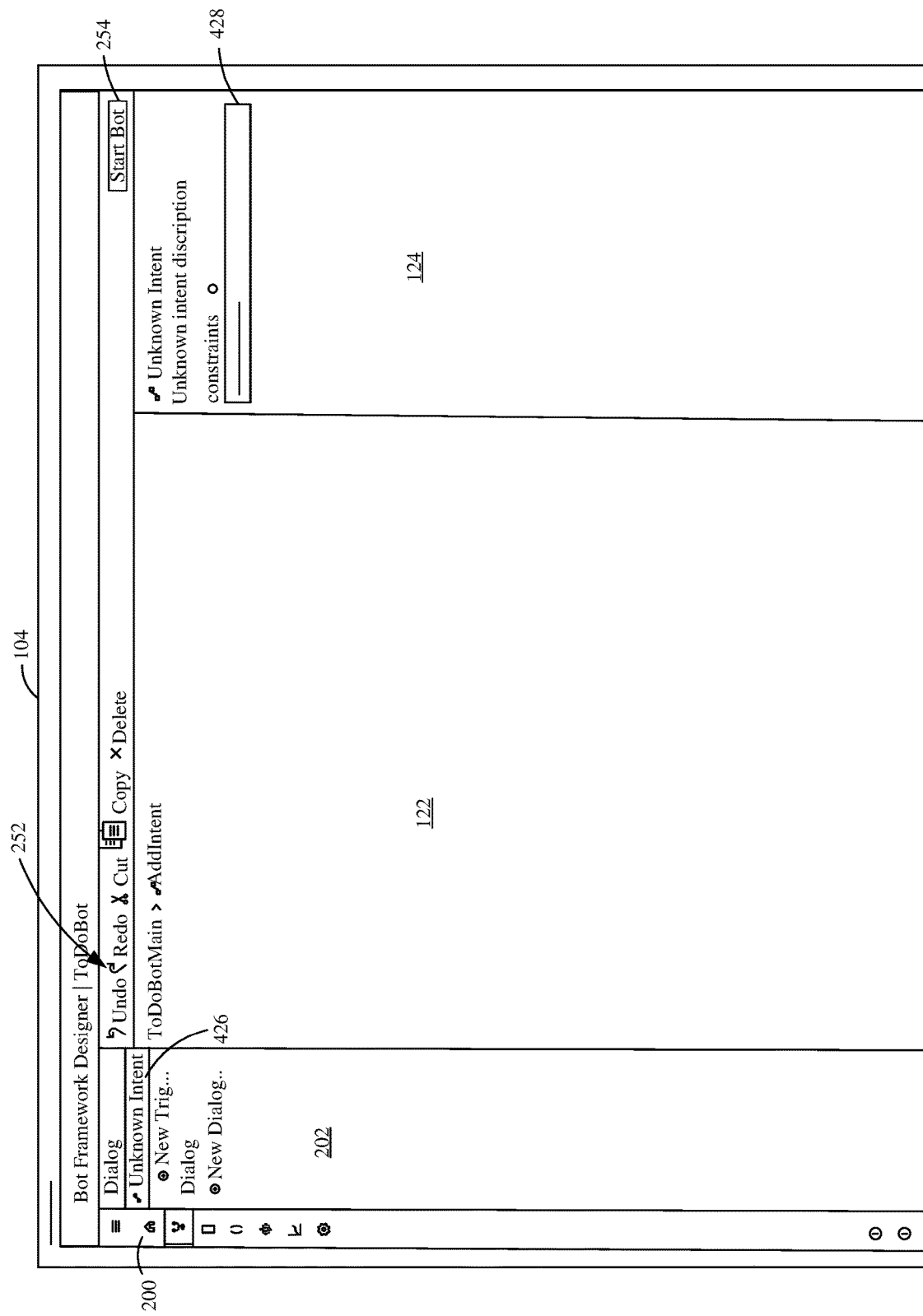
Figure 8J:
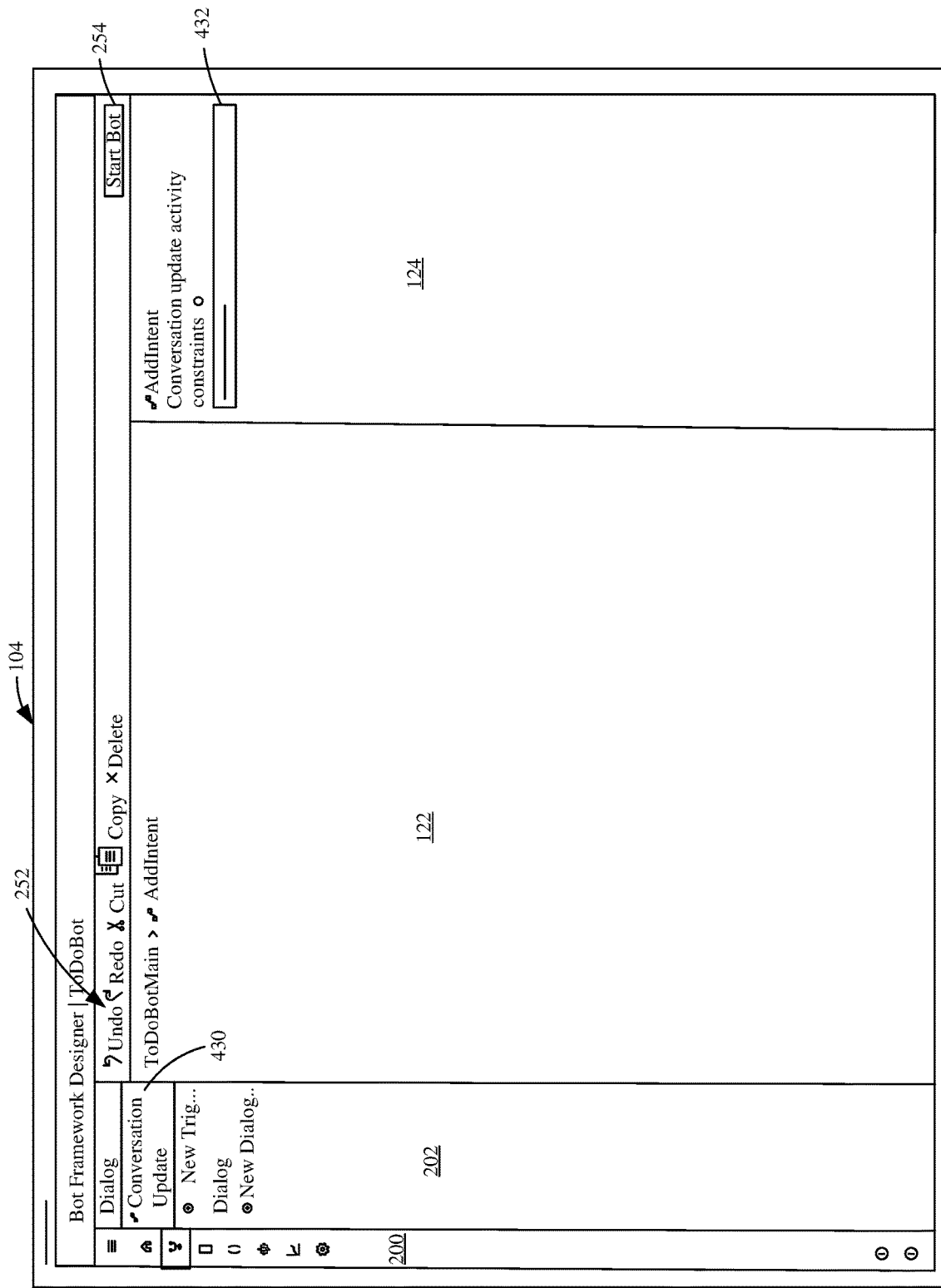

FIGS. 8H-8J show user interfaces 104 that can be generated to allow author 106 to add intents to the bot. As mentioned above, an intent is an item that may be identified based on a natural language input provided by a bot end user. The natural language input may then be provided to natural language understanding system 118 which identifies an intent corresponding to (or that is mapped to) that natural language input. The intent may identify an action that the user wishes to perform, using the bot, such as booking a flight, making a reservation, sending an email, adding an item to the user's to-do list, or any other of a wide variety of actions that the bot can be used to accomplish. These are examples only and the intents can indicate other things as well. In one example, author 106 can author intents while also authoring triggers. In another example, triggers and intents can be authored separately and linked later. Other authoring sequences are also contemplated herein.

FIG. 8H shows one example of a user interface 104 that includes menu pane 200, navigation pane 202, visual authoring canvas 122, and property pane 124. It can be seen in navigation pane 202 that the user has selected an add intent actuator 212. In response, an add intent property display 420, shown in selection-driven property pane 124, prompts author 106 to configure the intent by inserting a set of target phrases in text box 422. The target phrases are examples of phrases that a bot end user may speak or type in order to invoke the intent. Interface 420 also includes actuator 424 (that may be a text box) that allows author 106 to define various constraints that may be placed on the intent.

As described above, in one example, author 106 may type a relatively small set of example trigger phrases in text box 422. Interface control logic 127 can then provide those examples to language/model building control logic 145. Logic 145 can provide those items to language generation system 116 and/or natural language understanding system 118 which automatically builds a model or generates additional phrases that are similar to those typed by author 106, which will be used by the bot to map to the intent being configured. For instance, if the bot end user utters one of the automatically generated phrases, those phrases will also trigger the intent being configured.

FIG. 8I is similar to FIG. 8H, except that in navigation pane 202 the author 106 has selected the "unknown intent" actuator 426. In response, the property pane 124 surfaces a user interface that allows author 106 to define constraints in describing the unknown intent. Thus, actuator 428 is surfaced for author 106.

FIG. 8J is similar to FIG. 8I, except that the user has actuated the conversation update activity actuator 430 in navigation pane 202. It will be noted that other activity actuators can be used as well and the conversation update activity actuator is one example. In that case, API 112 surfaces a constraints actuator 432 that can be used by author 106 to define or configure the conversation update activity that will correspond to the item being configured.

Figure 8K:
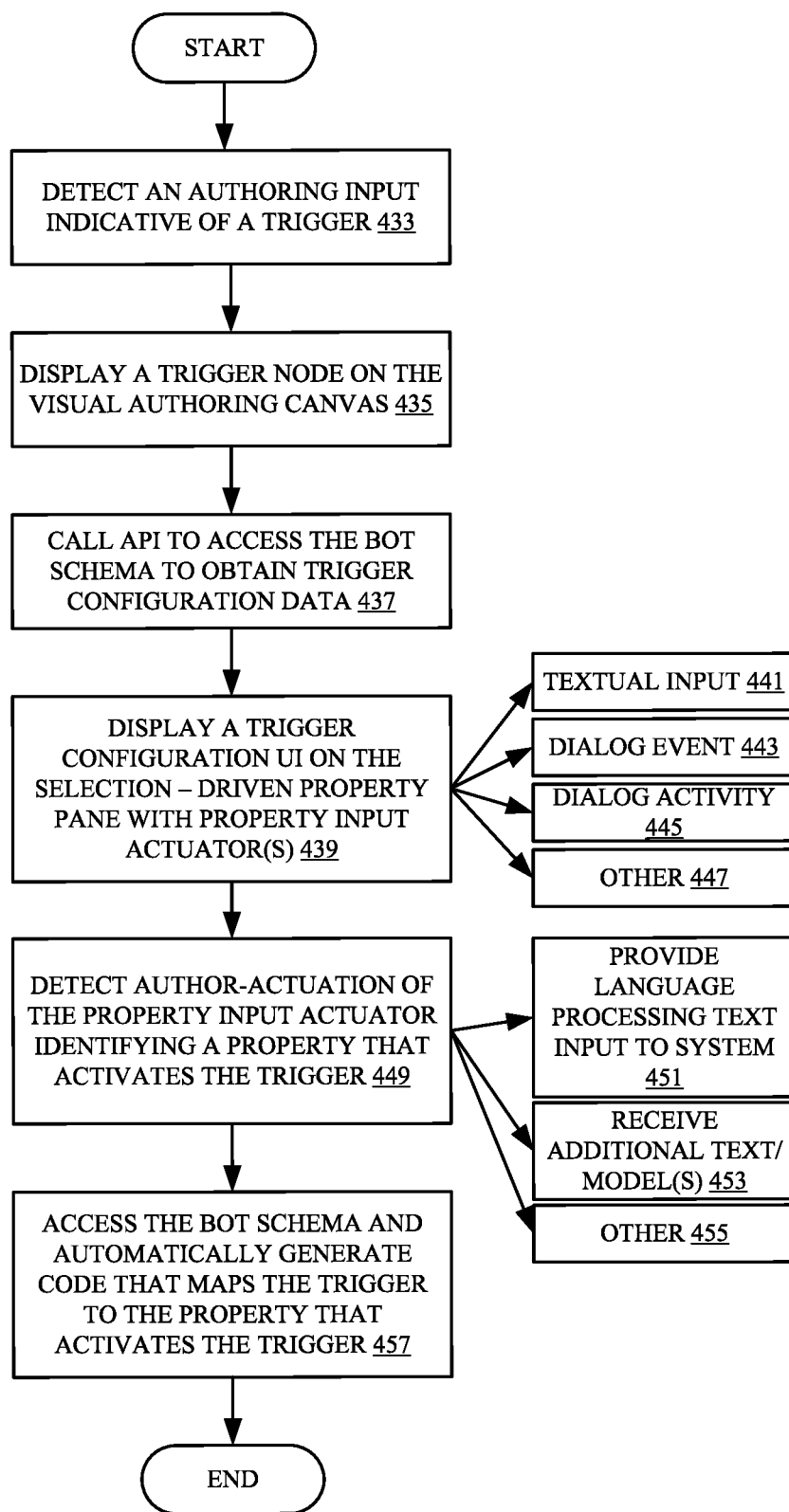
FIG. 8K is a flow diagram showing one example of how triggers are configured.

FIG. 8K is a flow diagram illustrating one example of how system 102 can be used to generate triggers that trigger a bot and/or run a dialog. Some of the examples discussed with respect to FIG. 8K were discussed in more detail above with respect to FIGS. 8A-8J.

Interface control logic 127 first detects an authoring input from author 106 indicative of author 106 identifying a trigger to be configured in the bot being designed. This is indicated by block 433 in FIG. 8K. The input can be received on any of the interfaces 104.

Interface control logic 127 then accesses the bot schema 144 and identifies which visual node is to be displayed on the visual authoring canvas 122 and displays that node. This is indicated by block 435 in FIG. 8K.

Interface control logic 127 then again accesses bot schema 144 to obtain trigger configuration data indicative of the configurable properties corresponding to the trigger node and the trigger being added to the bot being designed. Obtaining the trigger configuration data is indicated by block 437 in the flow diagram of FIG. 8K.

Logic 127 then controls property pane 124 to display a trigger configuration UI. The trigger configuration UI illustratively has one or more property input actuators that can be actuated by author 106 to input or configure a property of the trigger being added to the bot. This is indicated by block 439. The property input actuators can include a textual input mechanism 441 that can be used to input text. The text may be input by author 106 as a phrase that can activate the trigger. For instance, when the phrase is uttered by a bot end user, that phrase may be recognized as a triggering phrase that activates the trigger. The property input actuator may be an actuator that can be used to identify a dialog event that activates the trigger. This is indicated by block 443. The actuator may be one used to identify a dialog activity that activates the trigger. This is indicated by block 445. It can be a wide variety of other actuators that are actuated to identify a variety of other trigger activations as well. This is indicated by block 447.

Interface control logic 127 then detects author actuation of the property input actuator, identifying a property that activates the trigger. This is indicated by block 449 in FIG. 8K. Other property processing can be performed based on the identified property. For instance, when the property input is a textual input, then that textual input can be provided to language generation system 116 and/or natural language understanding system 118 to obtain additional, similar texts (variations) that may be similar in meaning to the text input by author 106 and that can also be used as trigger activating phrases. This is indicated by block 451. The additional texts can be received, or a model can be received that recognizes more textual inputs than the one that is input by author 106. This is indicated by block 453. As an example, the variations can be used and managed in language generation templates, as described in more detail above. Other property processing can be performed as well, and this is indicated by block 455.

Code translator/generator 146 then accesses bot schema 144 to obtain a code representation for mapping the trigger to the property that activates the trigger and configures the trigger so that it is activated by the configured property. This is indicated by block 457.

Figure 9C:
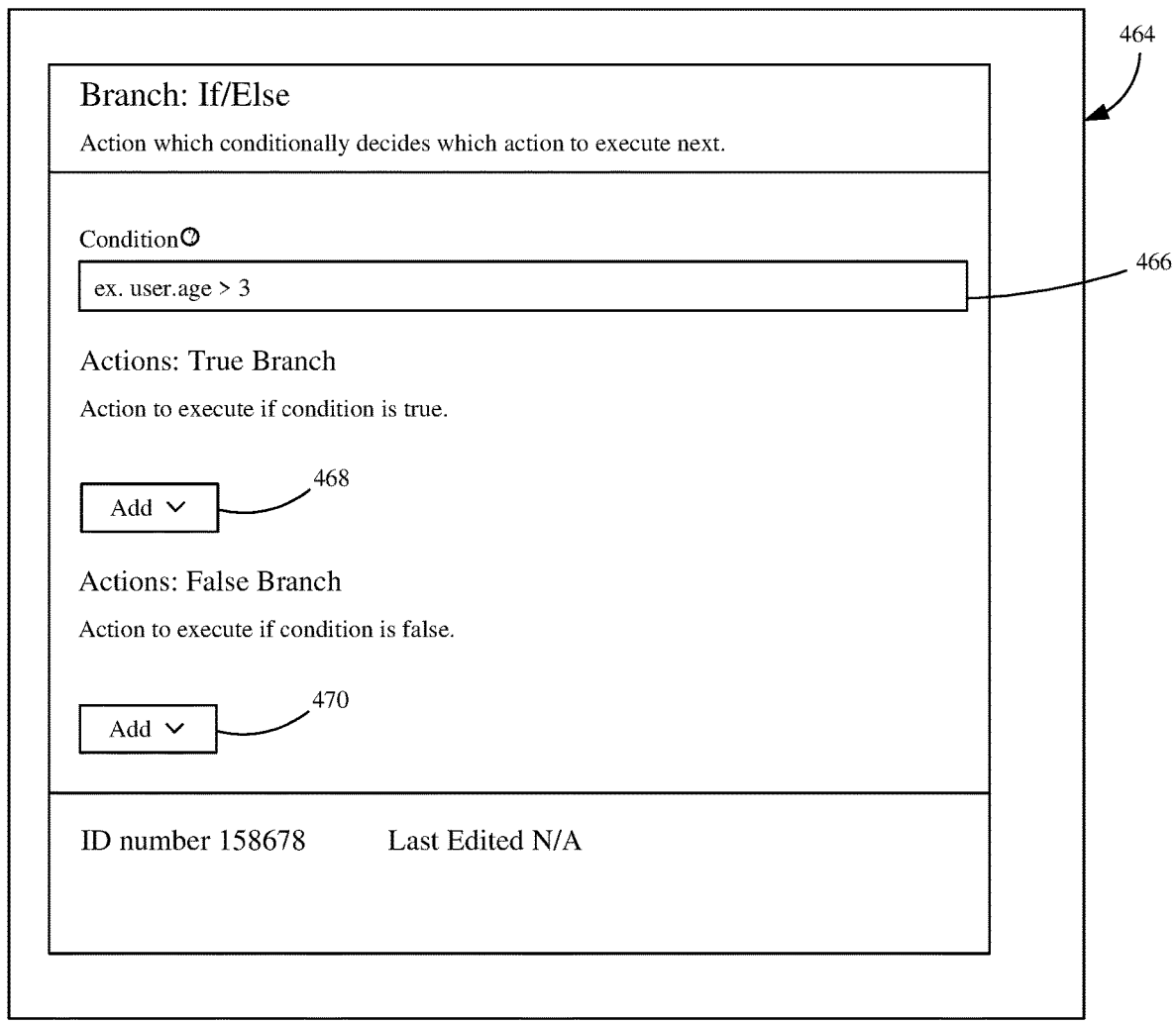
FIGS. 9A-9U show examples of property configuration interfaces for action nodes representing actions that can be added to a dialog flow.
Figure 9D:
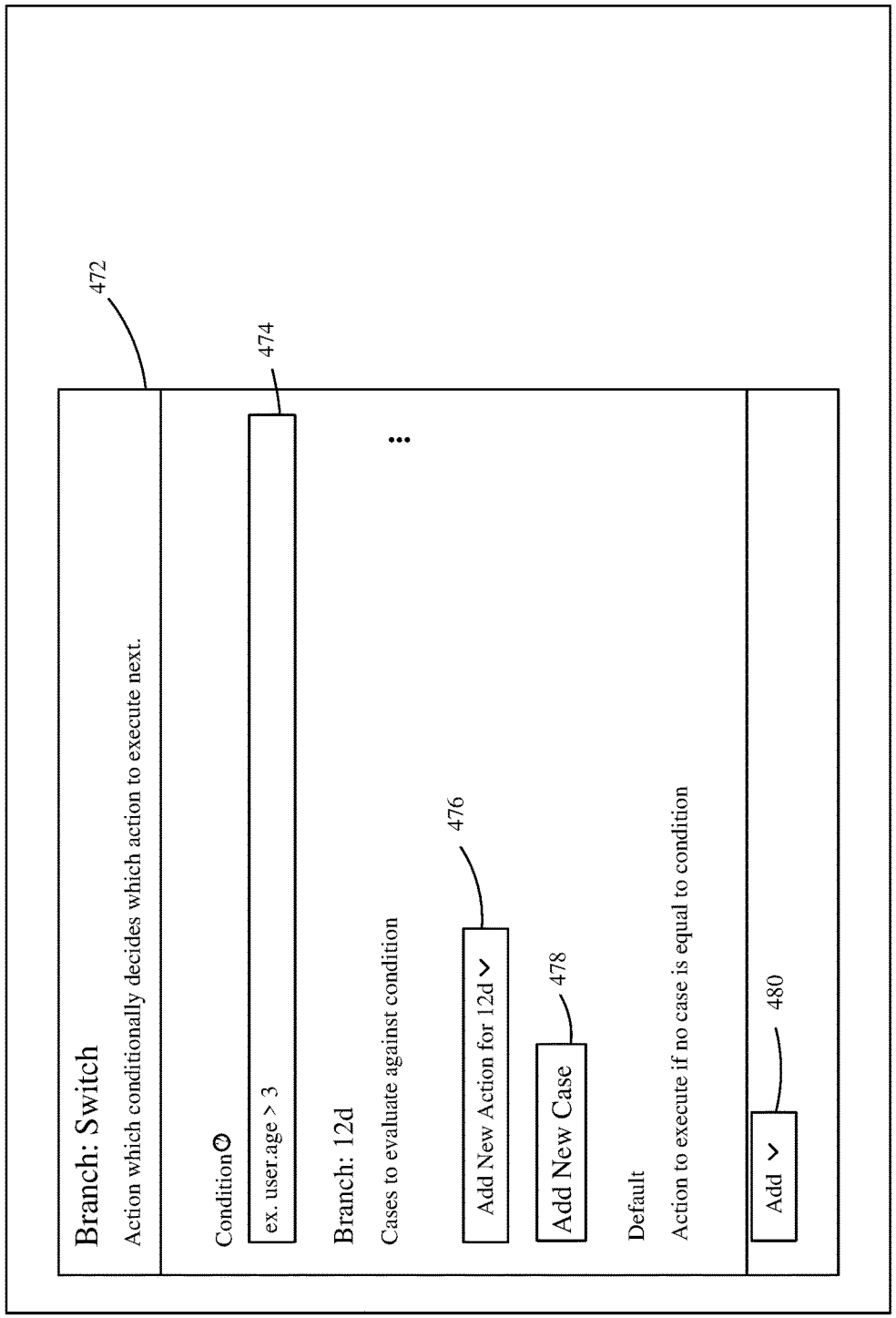
Figure 9E:
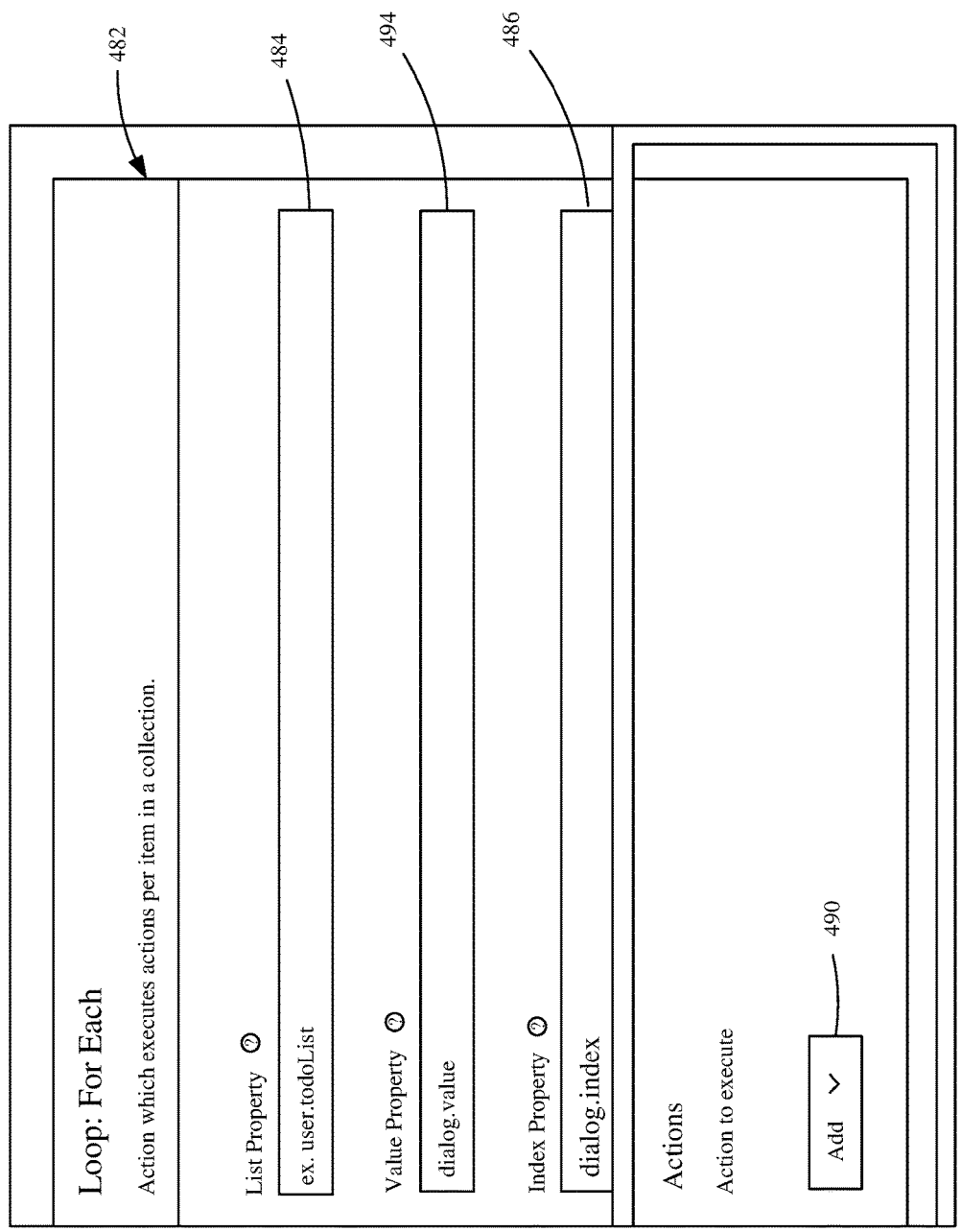
Figure 9F:
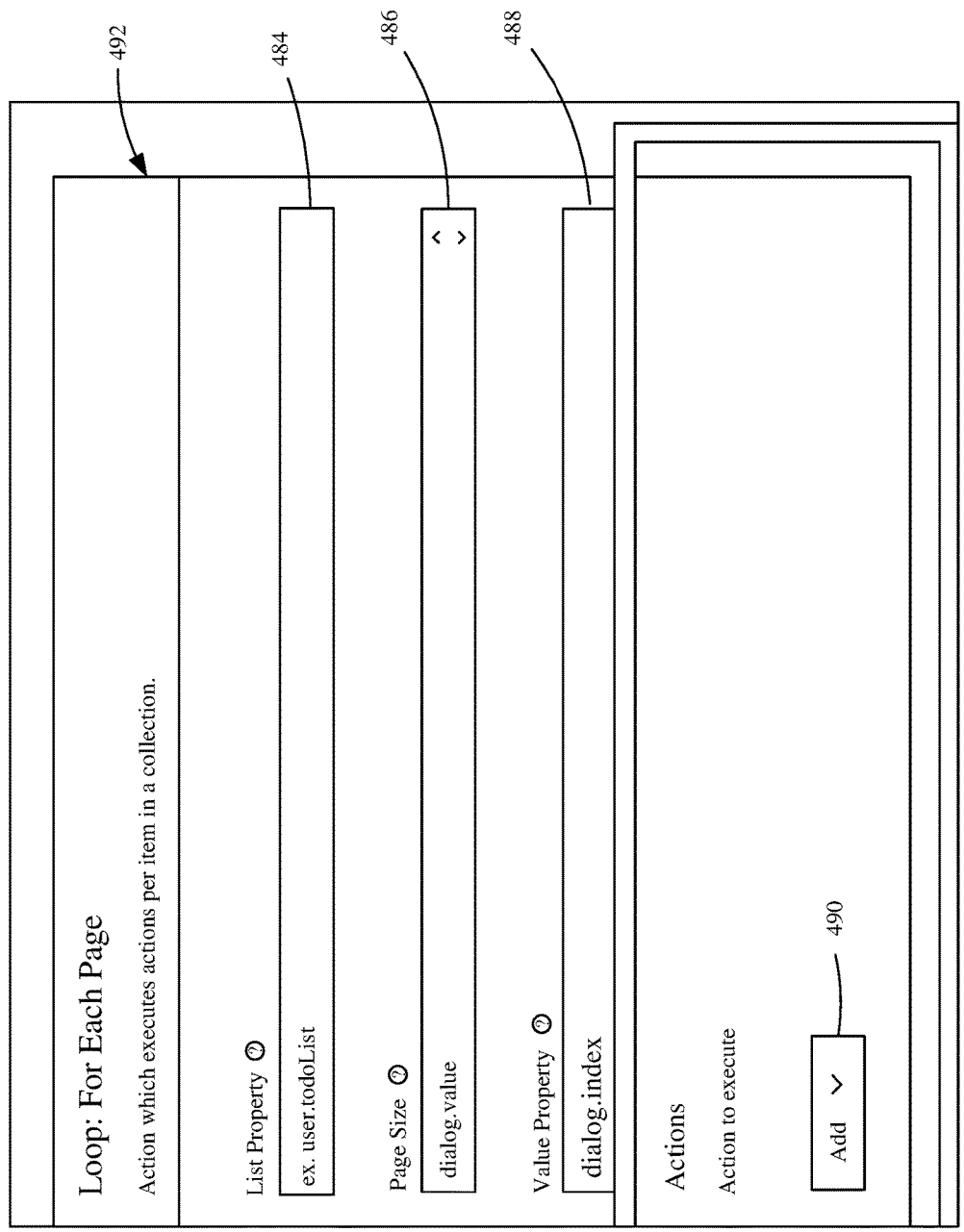
Figure 9G:
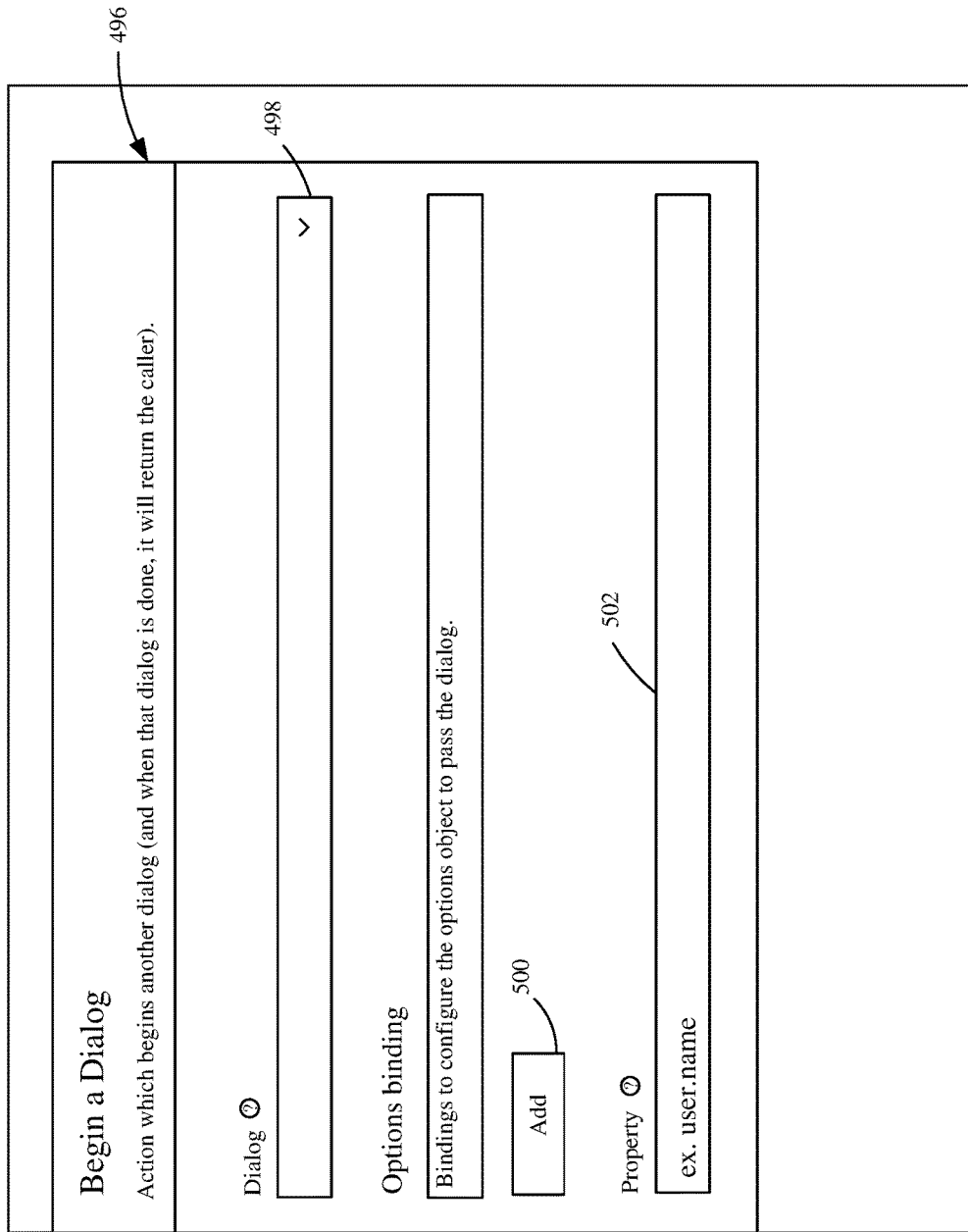
Figure 9H:
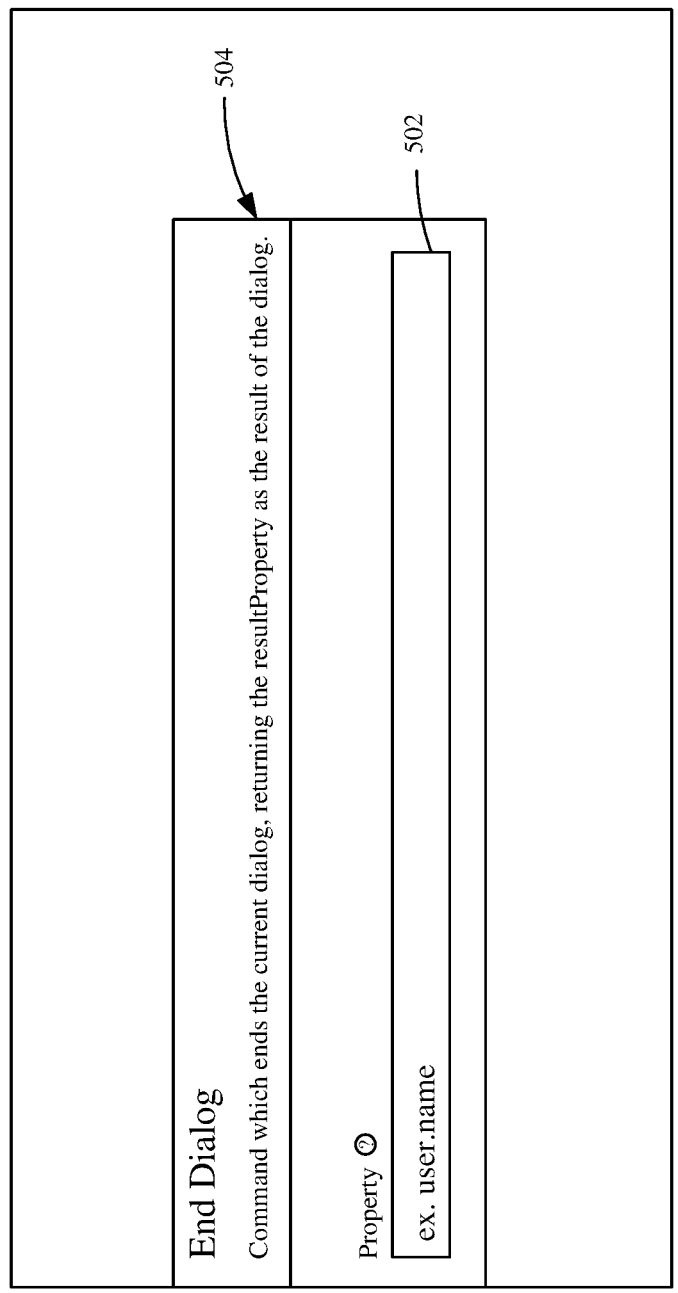
Figure 9I:
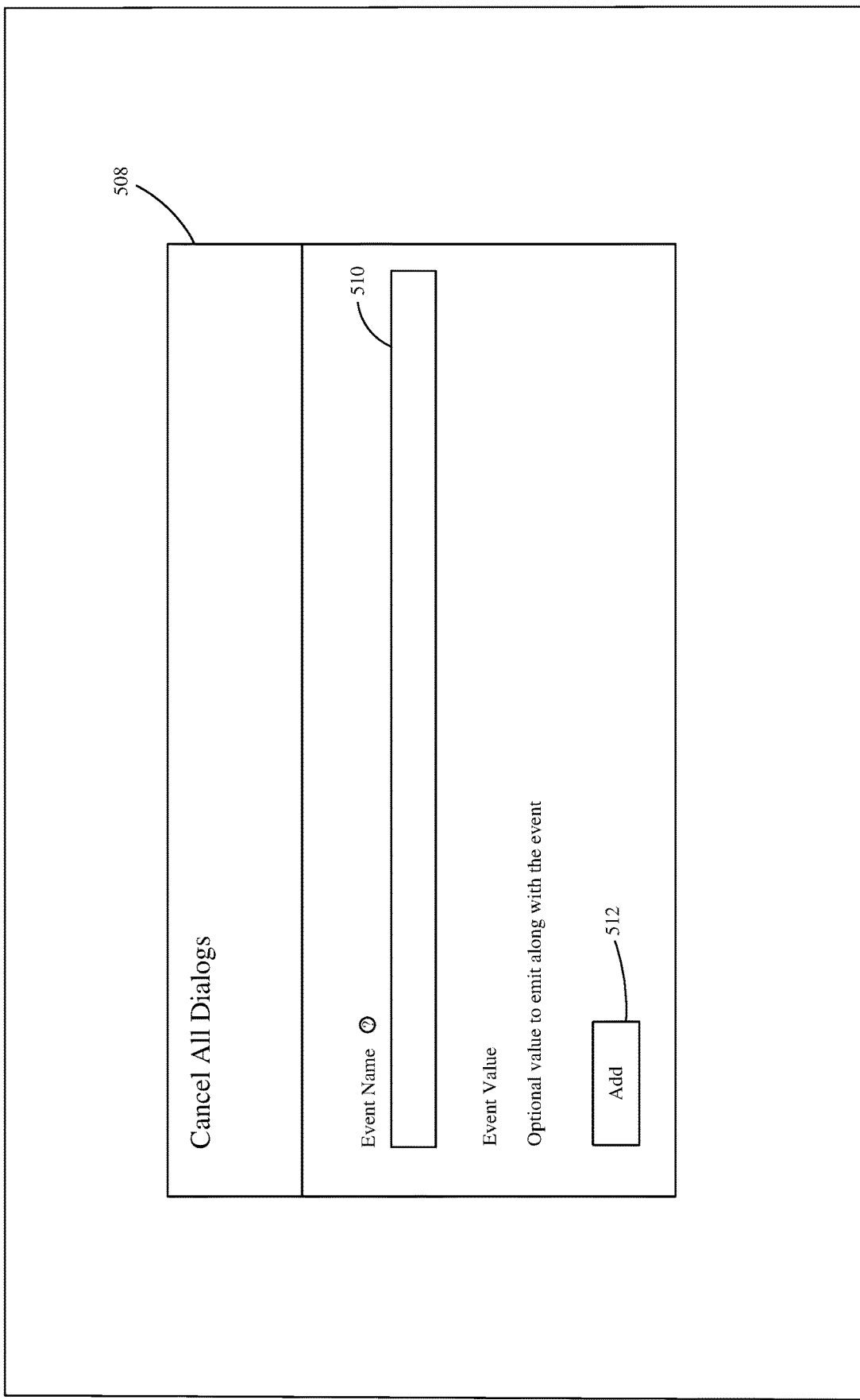
Figure 9J:
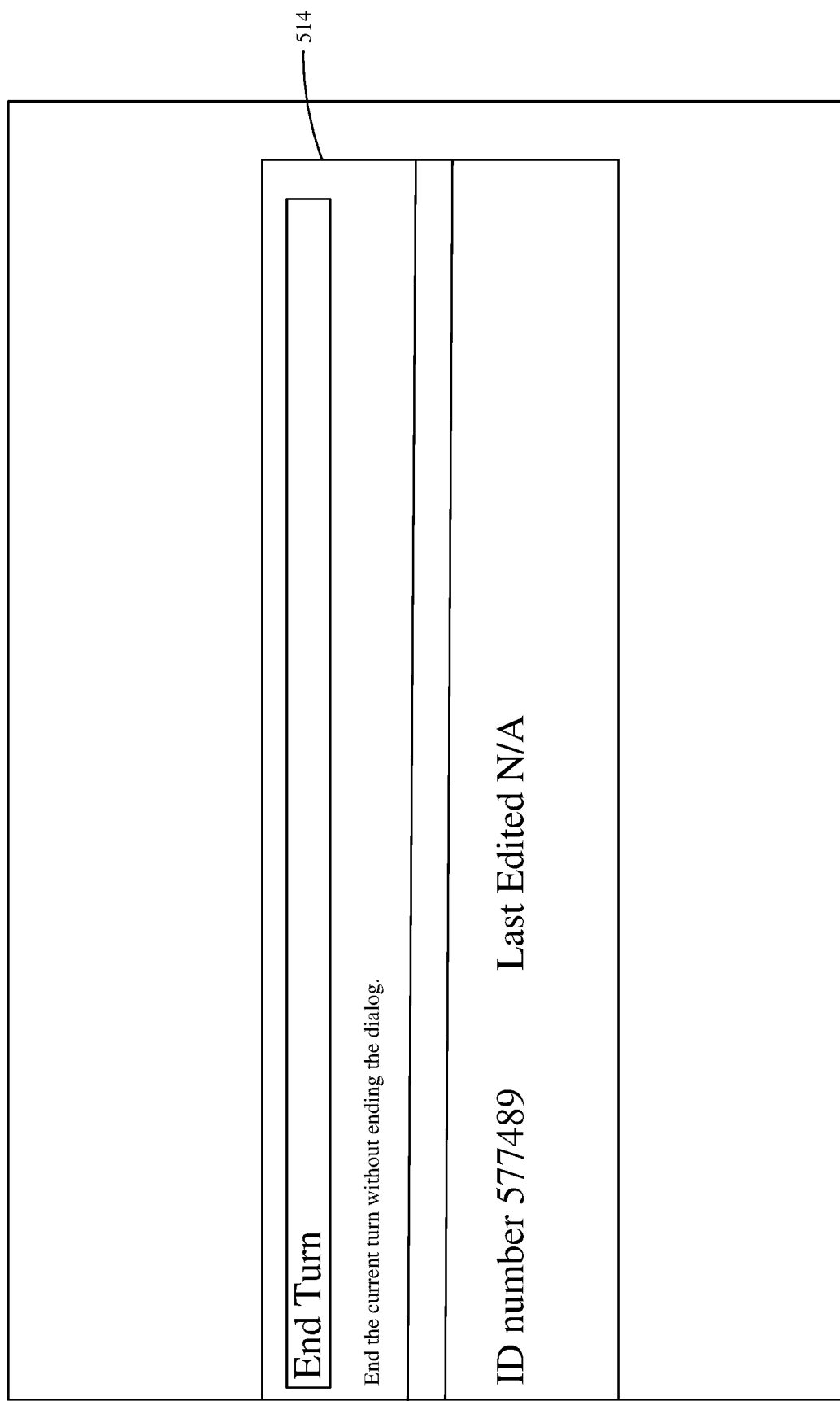
Figure 9K:
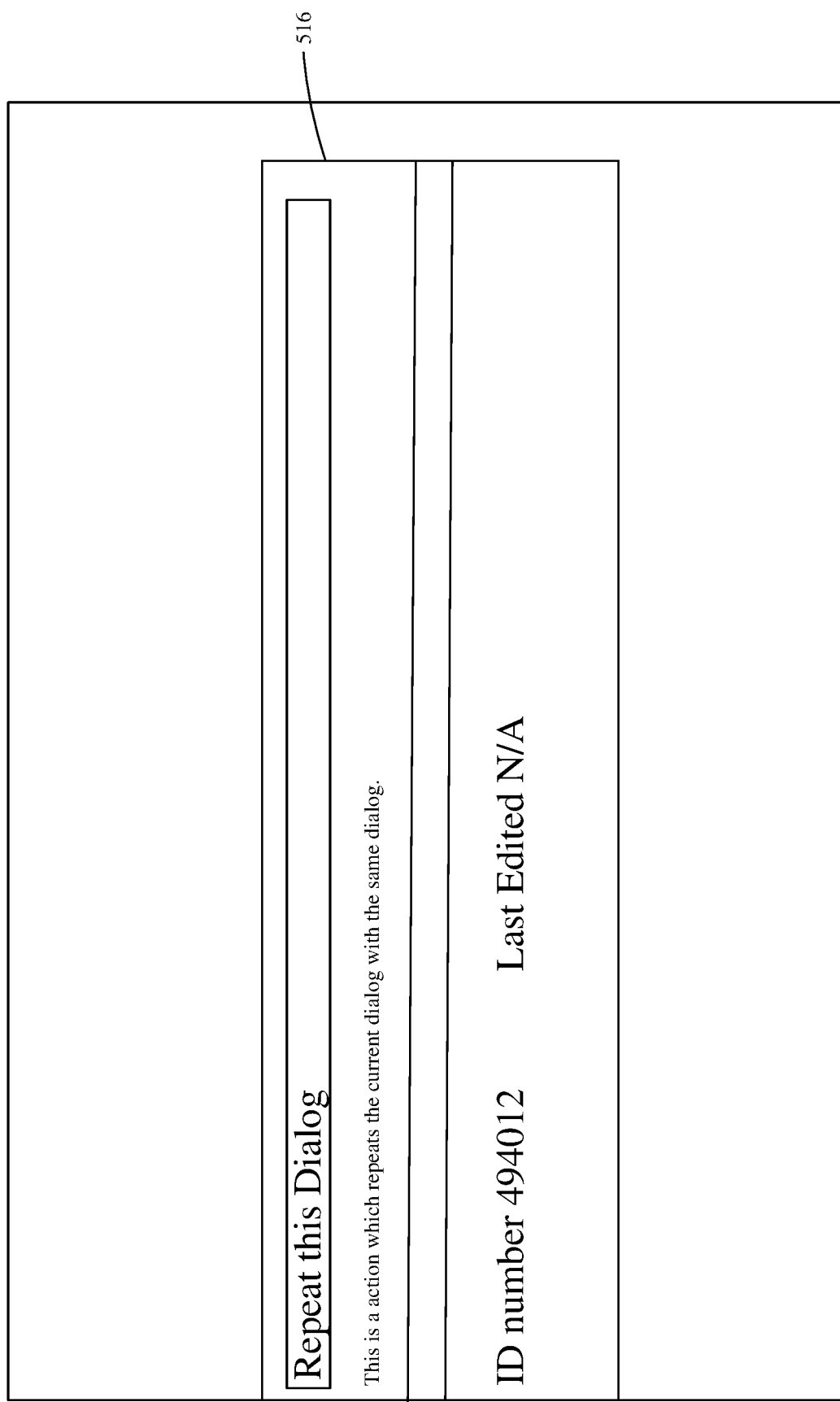
Figure 9L:
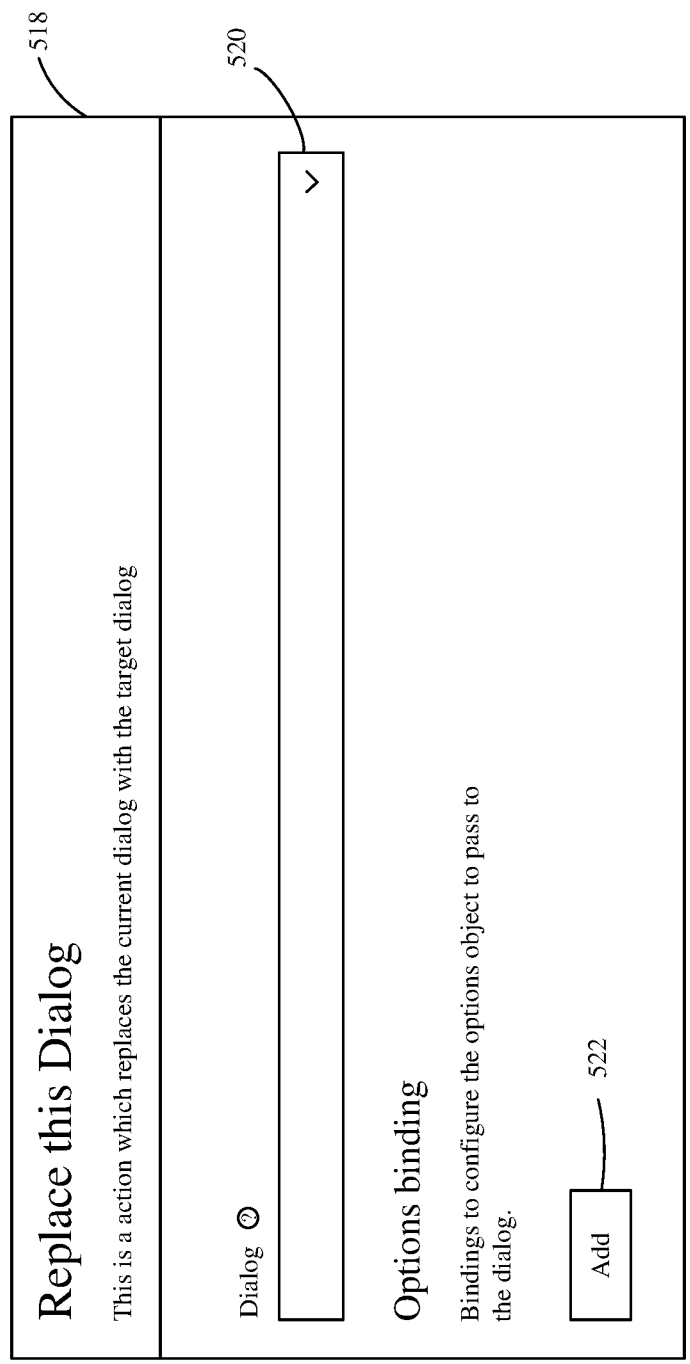
Figure 9M:
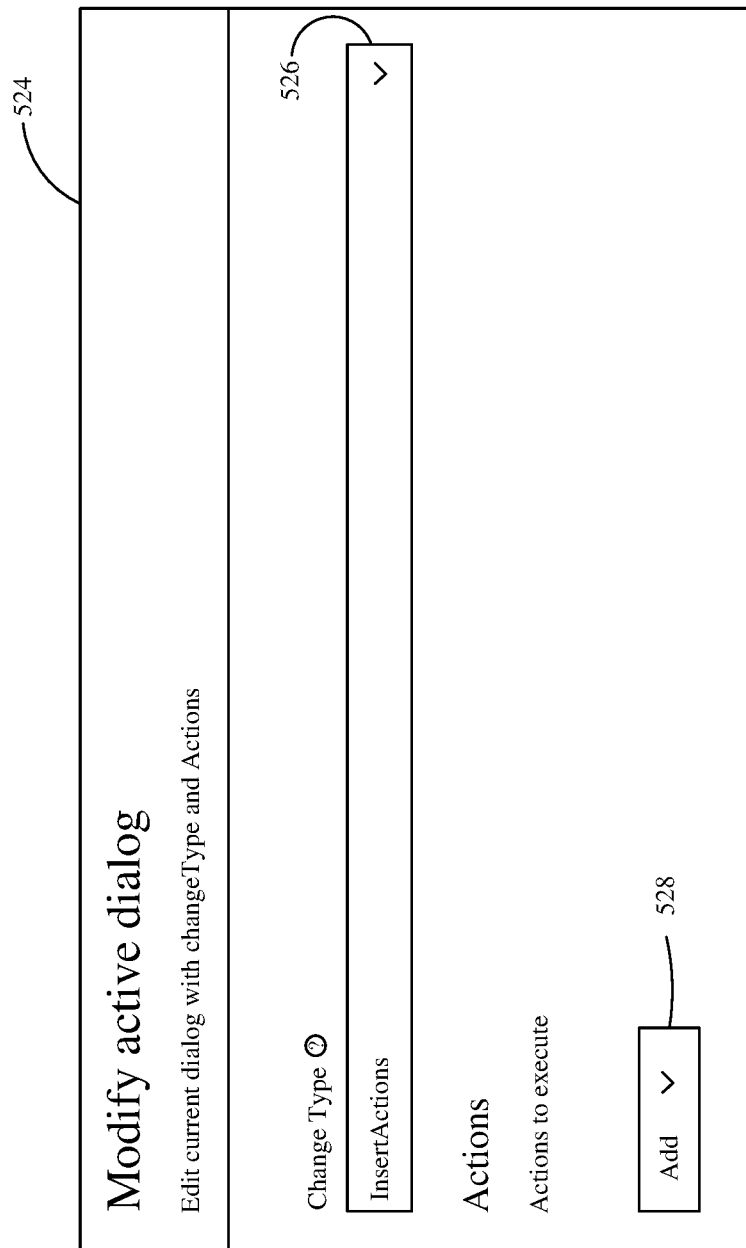
Figure 9N:
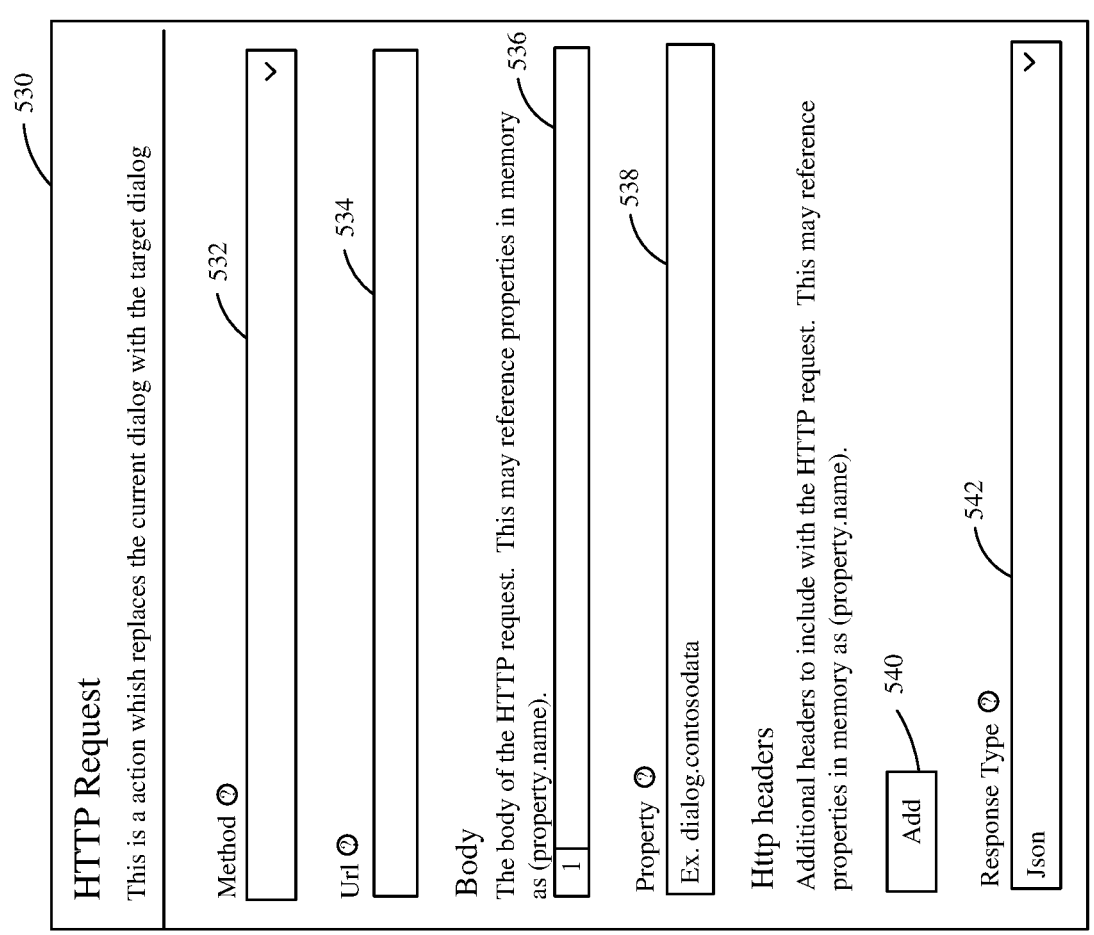
Figure 9O:
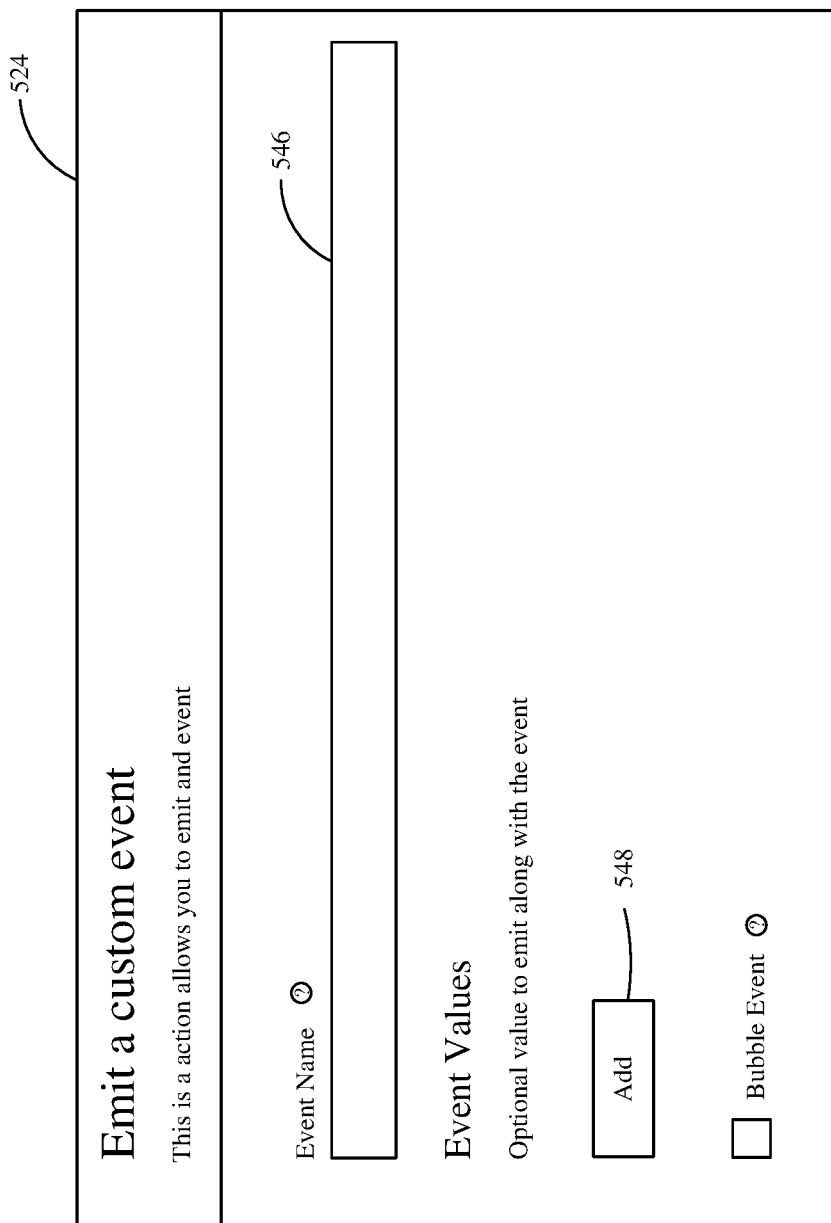
Figure 9P:
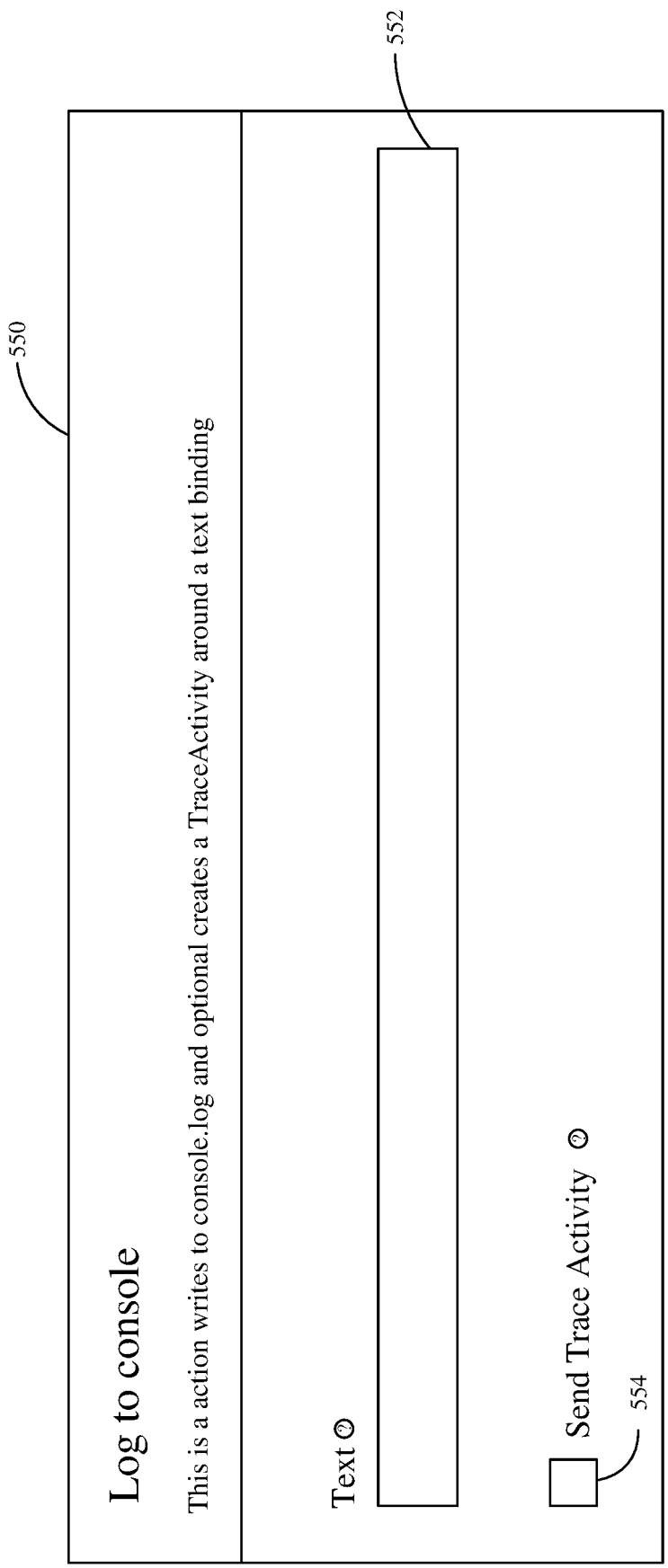
Figure 9Q:
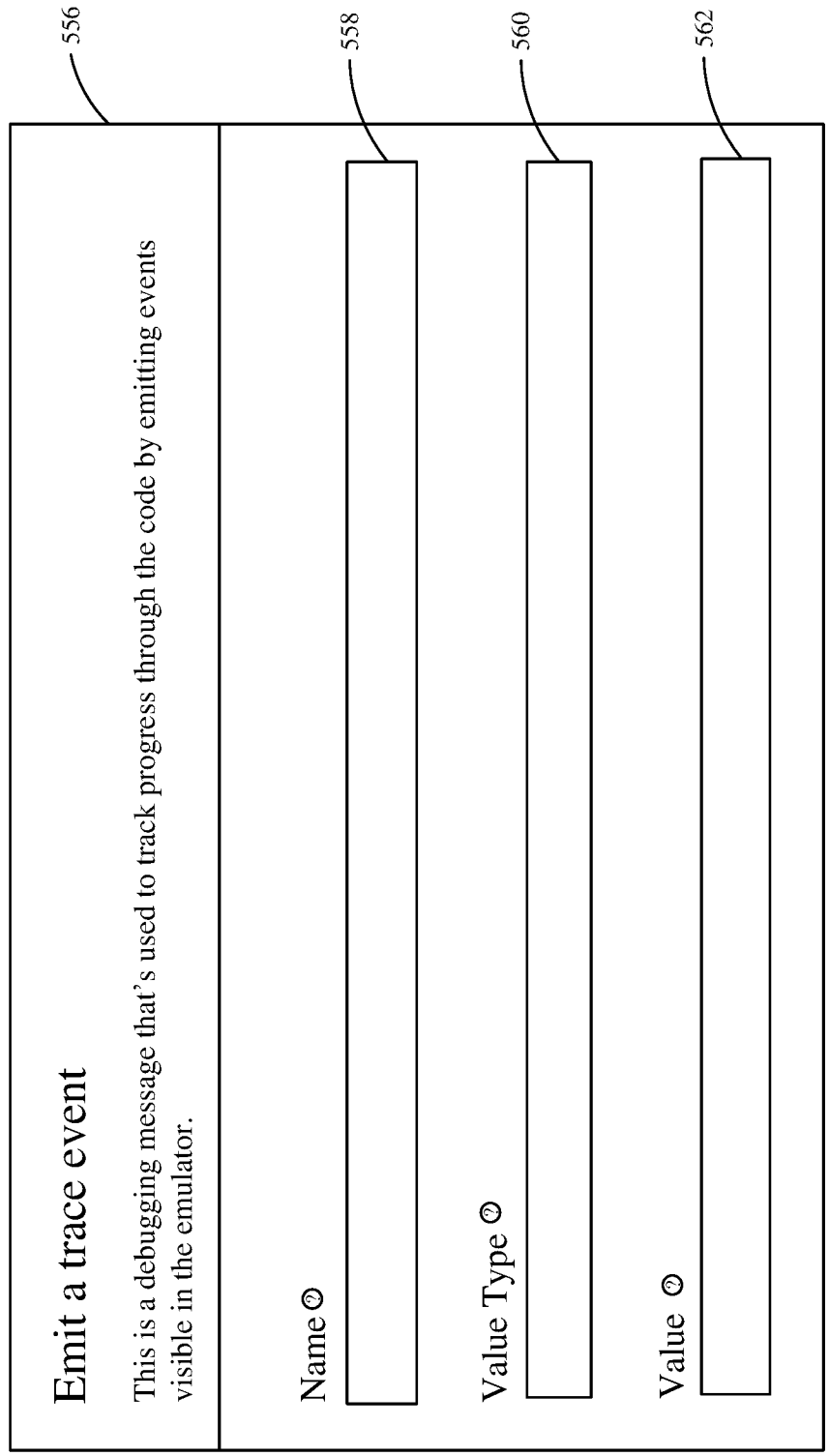
Figure 9R:
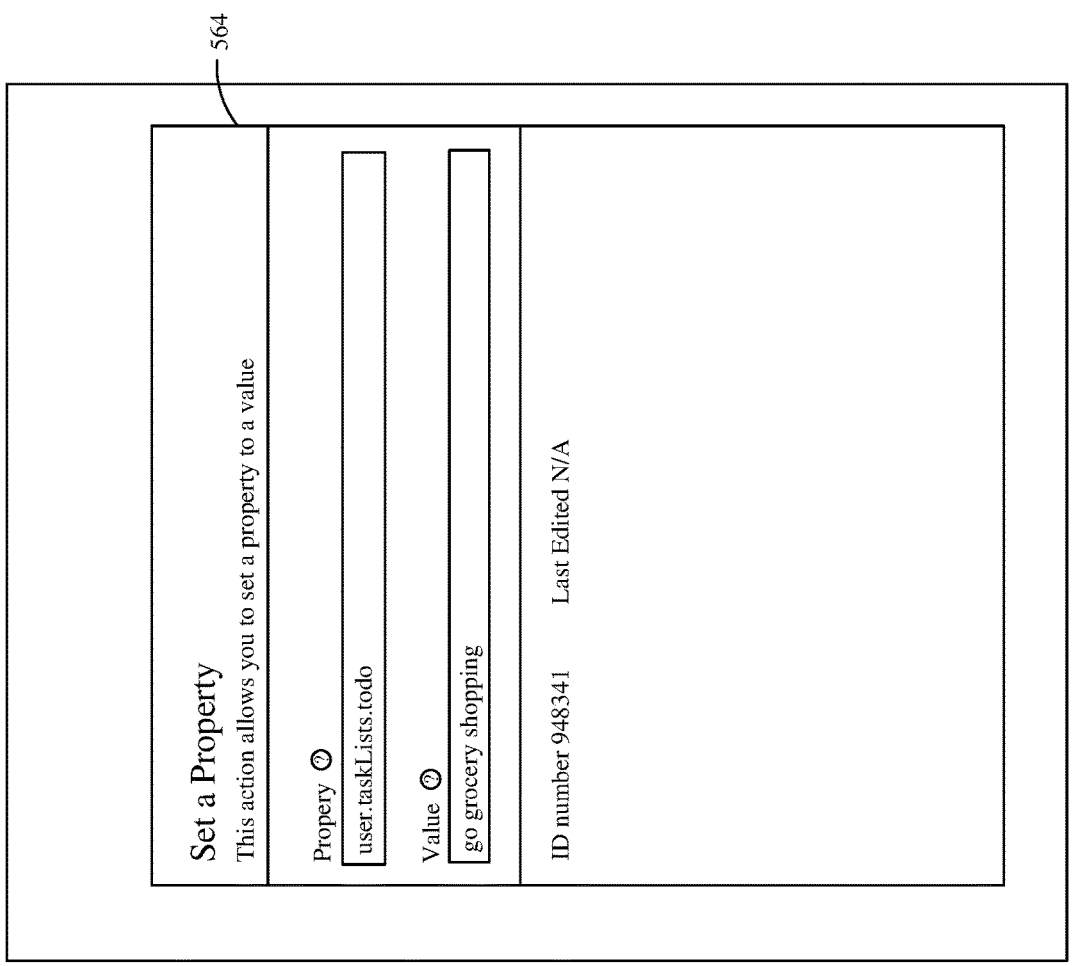
Figure 9S:
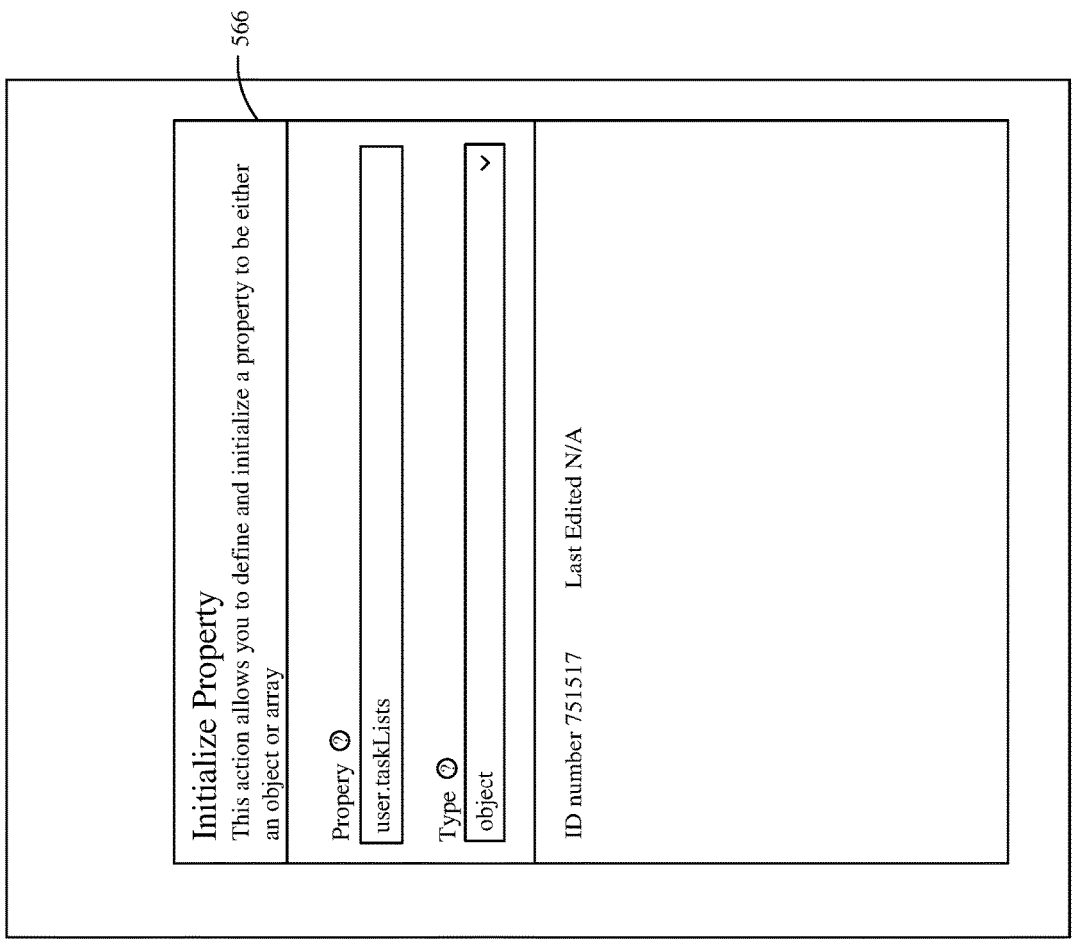
Figure 9T:
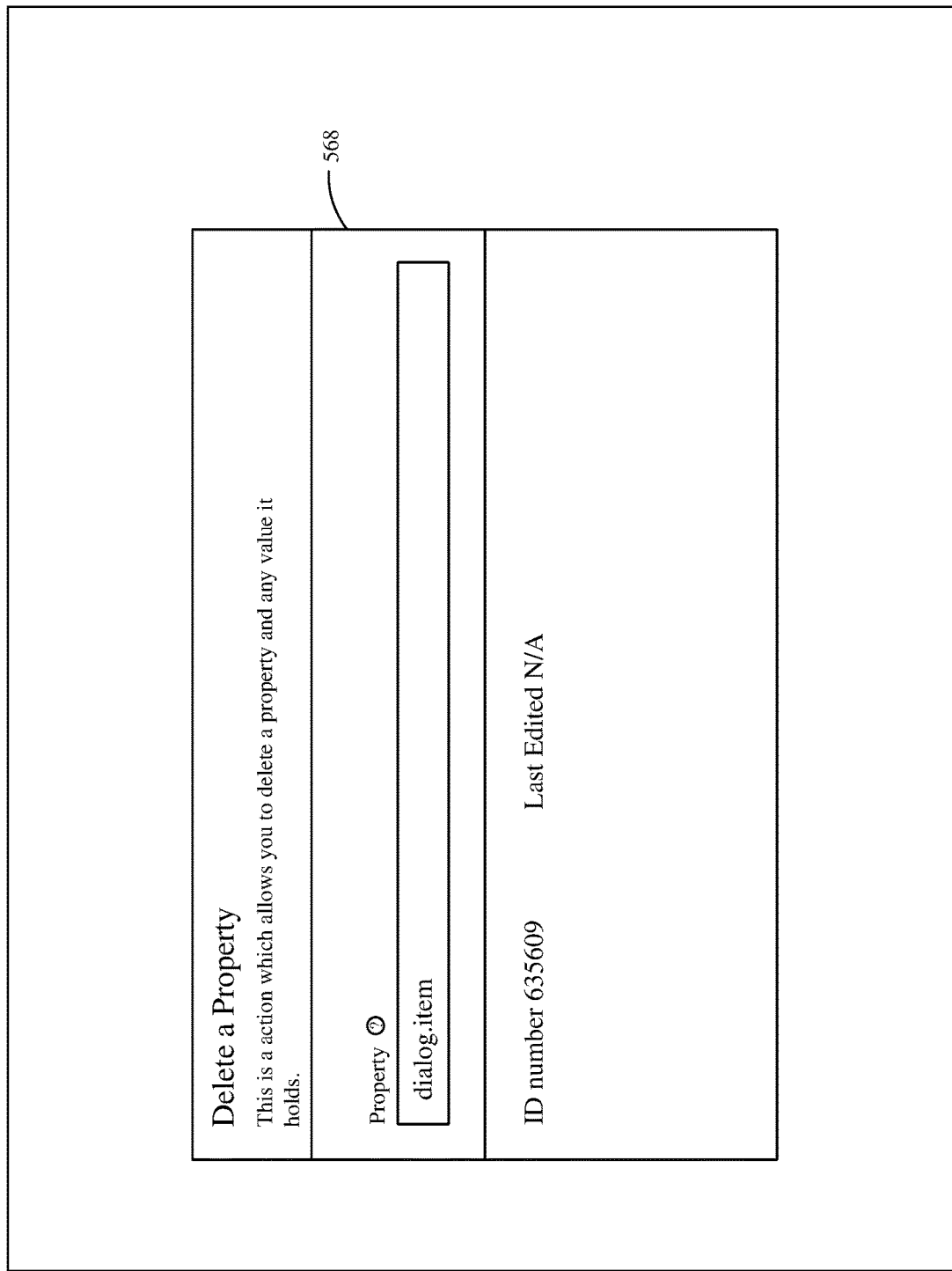
Figure 9U:
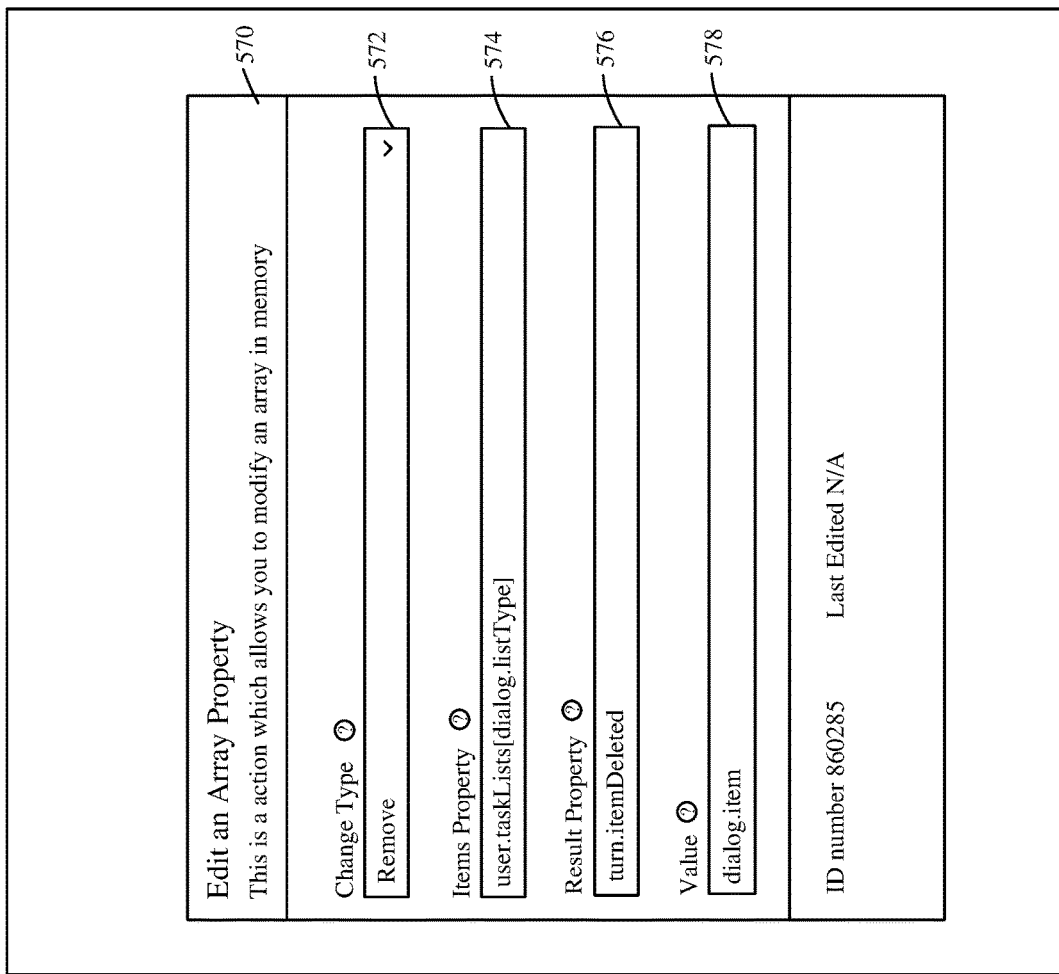

FIGS. 9A-9U show examples of property configuration interfaces that can be used by author 106 to configure actions corresponding to bot action nodes. Action nodes can be placed in the bot by author 106 by dragging and dropping them onto visual authoring canvas 122, by configuring them using property pane 124, or by defining them on JSON file pane 126. As discussed above, when any of these inputs is received, the action is also displayed on the other portions of the designer user interface 104. The user interface displays in FIGS. 9A-9U each show an example of an interface that can be displayed in property pane 124 to allow author 106 to configure a particular action 172 (shown in FIG. 3).

FIG. 9A shows a user interface display 434 that can be used to configure properties for a "send an activity" action, an output response that is sent to the bot end user. Author 106 can type variations of the message to be sent in text box 436. These message variations can be used by language generation system 116 and/or natural language understanding system 118 to build additional models or examples.

FIG. 9B shows a user interface display 438 that allows author 106 to define properties for an action that prompts the bot end user for a textual input. Author 106 can thus type an initial prompt in text box 440, define properties in text box 442, define an output format using actuator 444, add validation expressions that can be used to validate the input with actuator 446, and define how the bot should respond when an unrecognized value is received in response to the prompt. This latter item can be defined using text box 448. The author 106 can define a message that will be generated by the bot when an invalid response to the prompt is received. This can be done using text box 450. The author 106 can define a maximum turn count 452 to receive a valid response to the prompt (e.g., the maximum number of times the bot will prompt the user for an input). Author 106 can use text boxes 454 and 456 to define values that may be received in response to the prompt. Author 106 can use text box 458 to indicate how the bot is to respond by default. Actuator 460 allows author 106 to configure when the prompt will be used, and actuator 462 allows author 106 to define different types of end user interruptions that will be recognized, so that processing can be diverted to another dialog, to another portion of the same dialog, etc.

Similar user interfaces can be used to configure actions that prompt the end user for a number, for confirmation of a recognized input, or that allow the user to select from multiple choices. Similar user interfaces can also be generated to allows author 106 to configure an action that prompts the user for an attachment, a particular date, an authorization token or login information, among other things.

FIGS. 9C and 9D show user interface displays that can be generated to allow author 106 to configure branching actions in the bot logic flow. FIG. 9C shows a user interface display 464 that allows author 106 to define a "branch: if/else" action. This type of action conditionally decides which logic flow to follow when the bot is being executed. Text box 466 allows author 106 to input the condition to be evaluated in determining which logic branch to follow. Actuator 468 allows author 106 to define an action that is to be executed if the condition defined by actuator 466 is true, and actuator 470 allows author 106 to define which action is to be executed if the condition defined by actuator 466 is false.

FIG. 9D shows a user interface display 472 that can be generated to allow author 106 to define a "branch: switch" action. This type of action controls the bot to switch to a different logic flow, based on a condition to be evaluated. Author 106 can add branching logic for any number of conditions, in contrast to binary branching logic (if/else). Again, text box 474 allows author 106 to define the condition to be evaluated. The branch actuator 476 allows author 106 to define which branch to take if a particular bot execution case satisfies the condition identified by actuator 474. Actuator 478 allows the author 106 to define new bot execution cases that are to be evaluated, and that correspond to different branches in the dialog logic flow. Actuator 480 allows author 106 to define a default action to be taken if none of the cases defined by the other actuators satisfy the condition defined by actuator 474. One example might be to ask the bot end user what his/her favorite color is and then branching the conversation based on that answer. An example condition and set of cases might be:

Condition: user.favoriteColor cases:
  Red
  Blue
  Green

FIGS. 9E and 9F are user interfaces that allow author 106 to define looping actions that are to be taken. FIG. 9E shows a user interface display 482 that allows author 106 to configure actions that are to be taken, looping over each item in a collection of items. The bot may execute such a loop to provide dynamic responses, as described above. Text box 484 allows author 106 to define the list which is to be traversed (e.g. a list of alternative responses), and text boxes 486 and 488 allow author 106 to define property values and index values identifying the dialog that is to be used. Actuator 490 can be selected by author 106 to select any of a plurality of different actions that are to be taken, for each item in the collection defined by properties 484, 486, and 488.

FIG. 9F shows a user interface display 492 that allows author 106 to configure an action that is to be executed for each page of items in a collection. So, for example, if the bot is to return a list of to do items, then author 106 can define the number to show, per page, and the action to take for each page of items (such as sort by urgency, alphabetically, etc.). Again, text boxes 484 and 486 allow author 106 to define the list to be processed, and actuator 494 allows author 106 to define the number of items in the list, per page, for which an action is to be executed. Actuator 490, as described above with respect to FIG. 9E, allows author 106 to define the particular action to be executed, per page of items in the list.

FIGS. 9G-9I show examples of user interfaces that can be generated to allow author 106 to define an action in the bot logic flow to begin a dialog, to end a dialog, and to cancel all running dialogs, respectively. In FIG. 9G, user interface display 496 allows author 106 to use actuator 498 to identify a dialog to start. Actuator 500 can be used to pass an object into the dialog being started, and text box 502 can be used to define properties that are passed into dialog being started.

In FIG. 9H, user interface display 504 allows author 106 to use actuator 506 to identify a property that will be returned when the current dialog ends. As an example, when the dialog ends, it may output the name of the dialog indicating that it has ended. This can be done when configuring the bot with a command that ends the dialog. In FIG. 9I, user interface display 508 allows author 106 to configure the bot with a command to cancel all of the current dialogs by emitting an event which must be caught in order to prevent cancelation from propagating. For instance, if a command is issued to cancel all running dialogs, the command may function by canceling one dialog and continue on to the next dialog, and cancel it, unless the event is absorbed by the first canceled dialog. If the event is not one that will be absorbed, then the cancellation command will propagate through all running dialogs. Author 106 can use text 510 to identify the event. Author 106 can use actuator 512 to identify a value that is to be emitted (returned or output) along with the event being identified using actuator 510.

FIG. 9J shows a user interface 514 that can be used by author 106 to insert an action that ends a turn in the dialog logic flow, without ending the dialog itself. FIG. 9K shows a user interface display 516 that can be used by author 106 to insert an action which repeats the current dialog. For instance, if the bot end user is adding items to a to do list, the source dialog may be repeated so long as the bot end user continues to add items to the list. FIG. 9L shows a user interface display 518 that can be used by author 106 to insert an action in the bot logic flow that replaces the current dialog with a target dialog. For example, if the bot end user begins one dialog, but then switches or further defines his or her intent, a dialog switch can be made. One example of this is making travel plans. The bot may first run a dialog that allows the end user to specify date, and then switch dialogs to allow the user to make hotel reservations. This is just one example. Actuator 520 can be used to identify the target dialog, and actuator 522 can be used to configure information that is passed into the target dialog.

FIG. 9M shows a user interface display 524 that can be used by author 106 to modify an active dialog. Actuator 526 allows author 106 to choose a particular type of change that is to be performed. In the example shown in FIG. 9M, the change is to insert actions into an active dialog. Author 106 can then use actuator 528 to select which particular actions to execute or insert in the active dialog. Those actions can include any of the actions 172 described in FIG. 3, or other actions.

FIG. 9N is a user interface display 530 that can be used by author 106 to insert an action which causes the bot logic flow to make an HTTP request. Actuator 532 allows author 106 to select a method of making the request. For instance, one method is to retrieve information from a given server using the URL. Another only retrieves the header section. Another method can send data to the server. These are just a few examples. Text box 534 allows author 106 to identify a URL where the request is to be made. Text box 536 allows author 106 to define properties or other items in the body of the HTTP request. Text box 538 allows author 106 to define the other properties. Actuator 540 allows author 106 to identify additional headers to include in the HTTP request. Actuator 542 allows author 106 to define a type of response.

FIG. 9O shows an example of a user interface display 544 that allows author 106 to insert an action which emits (or returns or outputs) a custom event. Text box 546 allows author 106 to name the event, and actuator 548 allows author 106 to define a value that can be emitted (returned or output) along with the event.

FIG. 9P shows a user interface display 550 that allows author 106 to insert an action which writes to a log. For instance, in development, logging may be used to debug the bot. Author 106 can thus configure the bot to output arbitrary data to be logged for debugging. The log may be a terminal window in which the visual bot designer application is running. User interface 550 allows author 106 to configure the action to create a trace activity and send that as well. Text box 552 allows author 106 to define the text and actuator 554 allows author 106 to indicate that a trace activity is to be sent.

FIG. 9Q shows a user interface display 556 that allows author 106 to insert an action that is used to emit a trace event for debugging purposes. Text box 558 allows author 106 to name the trace event. Text box 560 allows author 106 to define a value type of the trace event and text box 562 allows author 106 to define the value for the trace event.

FIGS. 9R, 9S and 9T show user interfaces 564, 566 and 568, that allow author 106 to insert an action that sets a property to the value, that defines and initializes a property to be either an object or an array, and that deletes a property and any value it holds, respectively. For instance, FIG. 9R shows that the property "user.taskList.todo" is set to "go grocery shopping." FIG. 9S shows that the property "user.taskLists" is defined and initialized as an object. FIG. 9T shows that the property "diolog.item" is deleted.

FIG. 9U shows a user interface display 570 that allows author 106 to insert an action which allows modification of an array in memory. Actuator 572 allows author 106 to select the type of change to be made (e.g., remove). Text box 574 allows author 106 to identify the array property (e.g., user taskLists [dialog.listType]. Text box 576 allows author 106 to define the result property (e.g., turn.itemDeleted), and text box 578 allows author 106 to define the value of the item that is to be changed (e.g., dialog.item).

Figure 11:
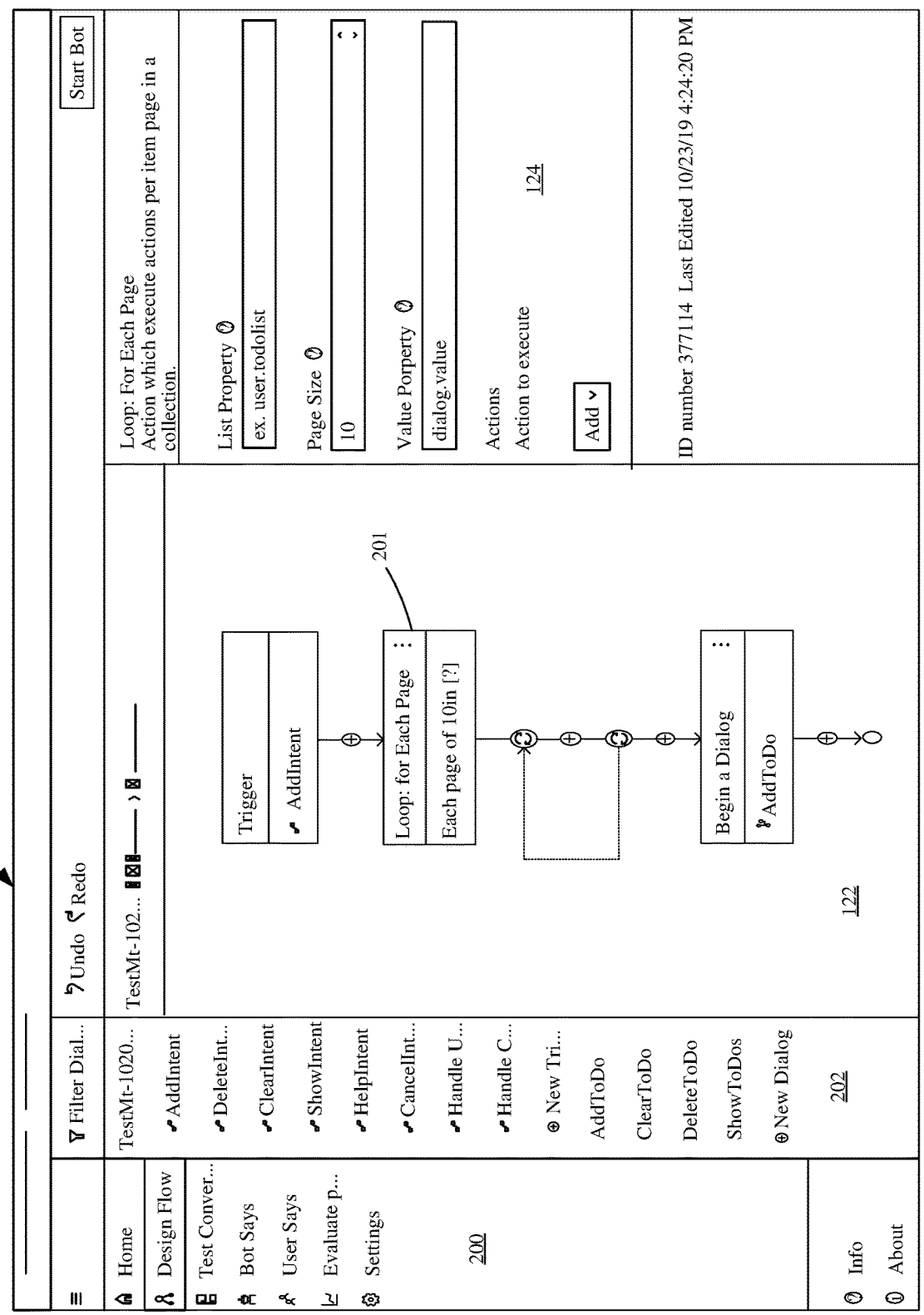
FIG. 11 shows one example of a user interface to the visual bot designer computing system in which a looping action is selected in the visual authoring canvas and displayed in the property pane.

FIG. 11 is another example of a set of user interfaces 104 that enable configuration of a loop: for each page action. It can be seen that the node 201 for the looping action is displayed and selected on visual authoring canvas 122, and the configuration interface is displayed on selection-driven property pane 124.

FIGS. 12A and 12B (collectively referred to herein as FIG. 12) illustrate one example of a JSON string which represents a visual representation on visual authoring canvas 122. A JSON string, such as that shown in FIG. 12, can be processed to generate a language generation template, such as that shown in FIG. 13. A language generation template is a function which author 106 can use to define one or more variations of a text response. When template is called, it returns one of the variations of the text identified in the template, but also resolves other references to the template when made for purposes of composition (by author 106, for instance). When multiple responses are defined, one may be selected, for example, at random. Further, the template may be a conditional template in which expressions are defined to control the bot to select one of a number of different collections of variations, and select the particular variation from the selected collection. Templates can also be parametrized by author 106 so that different callers to the template can pass in different values for use in resolving the call to a particular variation. Thus, using templates, author 106 can add sophisticated response behavior to the bot but still consolidate and share common response logic. FIG. 13 shows multiple branching actions and activities, by way of example only.

Figure 14:
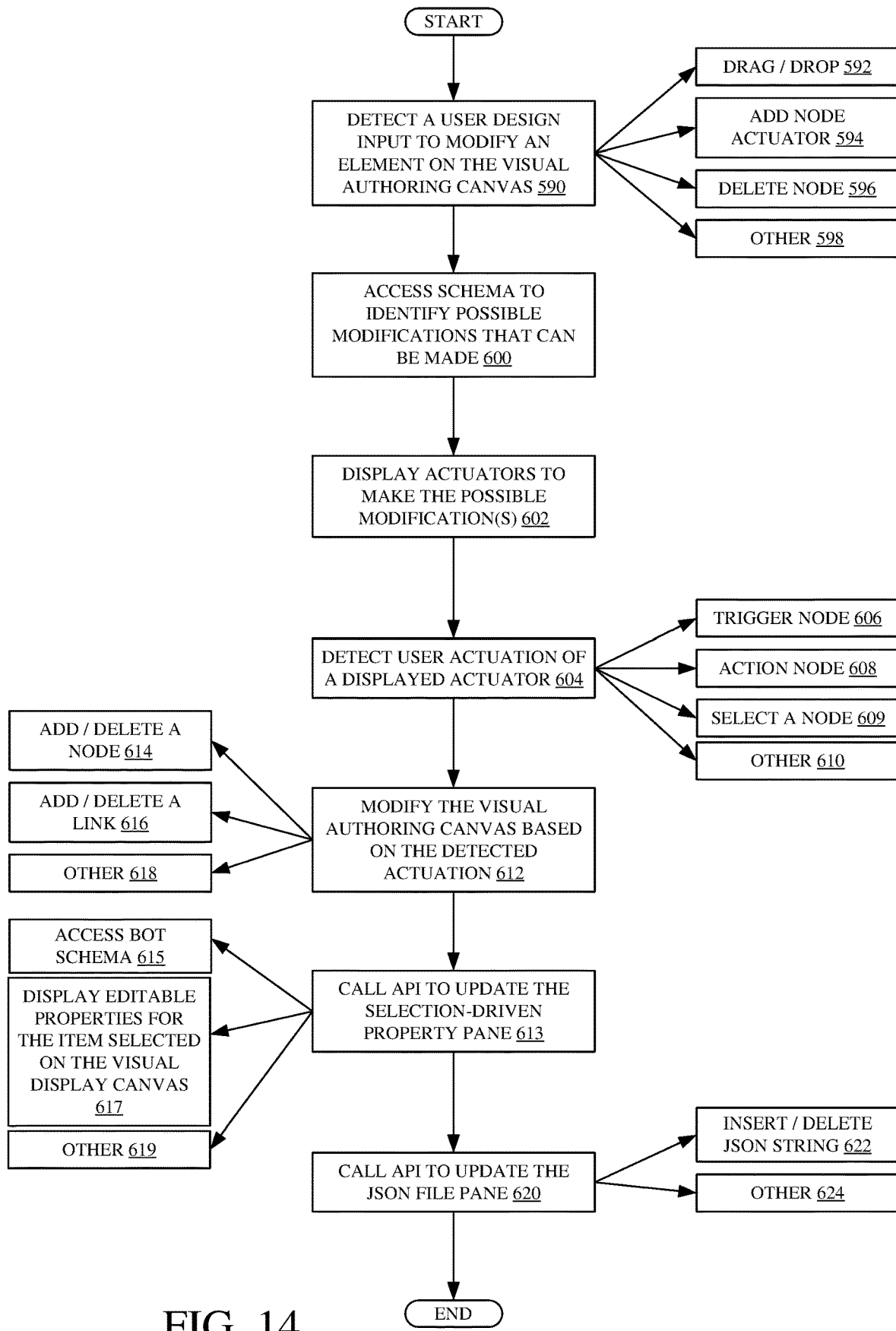
FIG. 14 is a flow diagram illustrating one example of the operation of the visual bot designer computing system in receiving and processing authoring inputs on the visual authoring canvas.

FIG. 14 is a flow diagram illustrating one example of the operation of visual bot designer computing system 102 in receiving authoring inputs through the visual authoring canvas 122 on designer user interfaces 104. To begin, interface control logic 127 detects an author 106 input to modify an element on the visual authoring canvas 122. This is indicated by block 590 in the flow diagram of FIG. 14. The detected input can be a drag/drop input 592 by which author 106 drags a node onto the visual authoring canvas and drops it there. Alternatively or additionally, the detected input can be selection of an actuator that is used to add a node or action to the visual authoring canvas, as indicated by block 594. For example, the author 106 may select the "add" actuator on the visual authoring canvas. Alternatively or additionally, the detected input can be an indication to delete a node from the visual authoring canvas 122, as indicated by block 596. Or it can be a wide variety of other inputs. This is indicated by block 598. Logic 127 then accesses the bot schema (or logic) 144 to identify possible modifications that can be made, based upon the author 106 input. This is indicated by block 600.

Referring again to FIG. 7, assume that the user has selected the add actuator 376. Logic 127 then accesses schema 144 to identify what actions are available and display them in pane 378. Displaying the actuators to make the possible modifications is indicated by block 602 in the flow diagram of FIG. 14.

Interface control logic 127 then detects author 106 selection of a displayed actuator (such as one of the actuators in pane 278 or 394 in FIG. 7). This is indicated by block 604 in the flow diagram of FIG. 14. The actuation can be to insert or delete a trigger node 606, to insert or delete an action node 608. In another example, author 106 selects a node that is already displayed on the visual authoring canvas 122. This is indicated by block 609. The actuation can be any of a wide variety of other items 610.

Interface control logic 104 then interacts with visual authoring canvas 122 to modify the visual authoring canvas 122 based upon the detected actuation. This is indicated by block 612. Again, this can be to add or delete a node from the visual authoring canvas 122, as indicated by block 614. It can be to add or delete a link, as indicated by block 616, or it can be to make a wide variety of other modifications to the visual authoring canvas 122, as indicated by block 618. Logic 127 then calls API 112 to obtain information to update the property pane 124. This is indicated by block 613 in the flow diagram of FIG. 14. For instance, code translator/generator 146 can receive an indication of an identity of the visual elements that were selected or changed on visual authoring canvas 122, and access bot schema 144 to obtain the properties for the visual elements that are selected or changed, and display editable properties (or property actuators) for the items selected on the visual display canvas 122. Accessing the bot schema 144 based on the identity of the visual element is indicated by block 615. Displaying editable property actuators is indicated by block 617. The property pane 124 can be updated in other ways as well, based upon the modification to the visual authoring canvas 122. This is indicated by block 619. Logic 127 also calls API 112 to update the JSON file display pane 126. Again, it can call code translator/generator 146 which accesses bot schema 144 to obtain serialization information to generate a serialized representation of the visual elements that were changed on visual authoring canvas 122. Where a visual element was added, it can insert that serialization in the JSON file, on the JSON file display pane 126. Where a visual element was deleted, it can delete that representation from the JSON file display pane 126. Calling the API access bot schema 144 to to update the JSON file pane 126 is indicated by block 620. Inserting or deleting a JSON string based on the update is indicated by block 622, and updating the JSON file pane in other ways is indicated by block 624.

The updates can be propagated across interfaces 104 automatically. By automatically it is meant that the operations are performed without further human involvement except, perhaps to initiate or approve them.

Figure 15A:
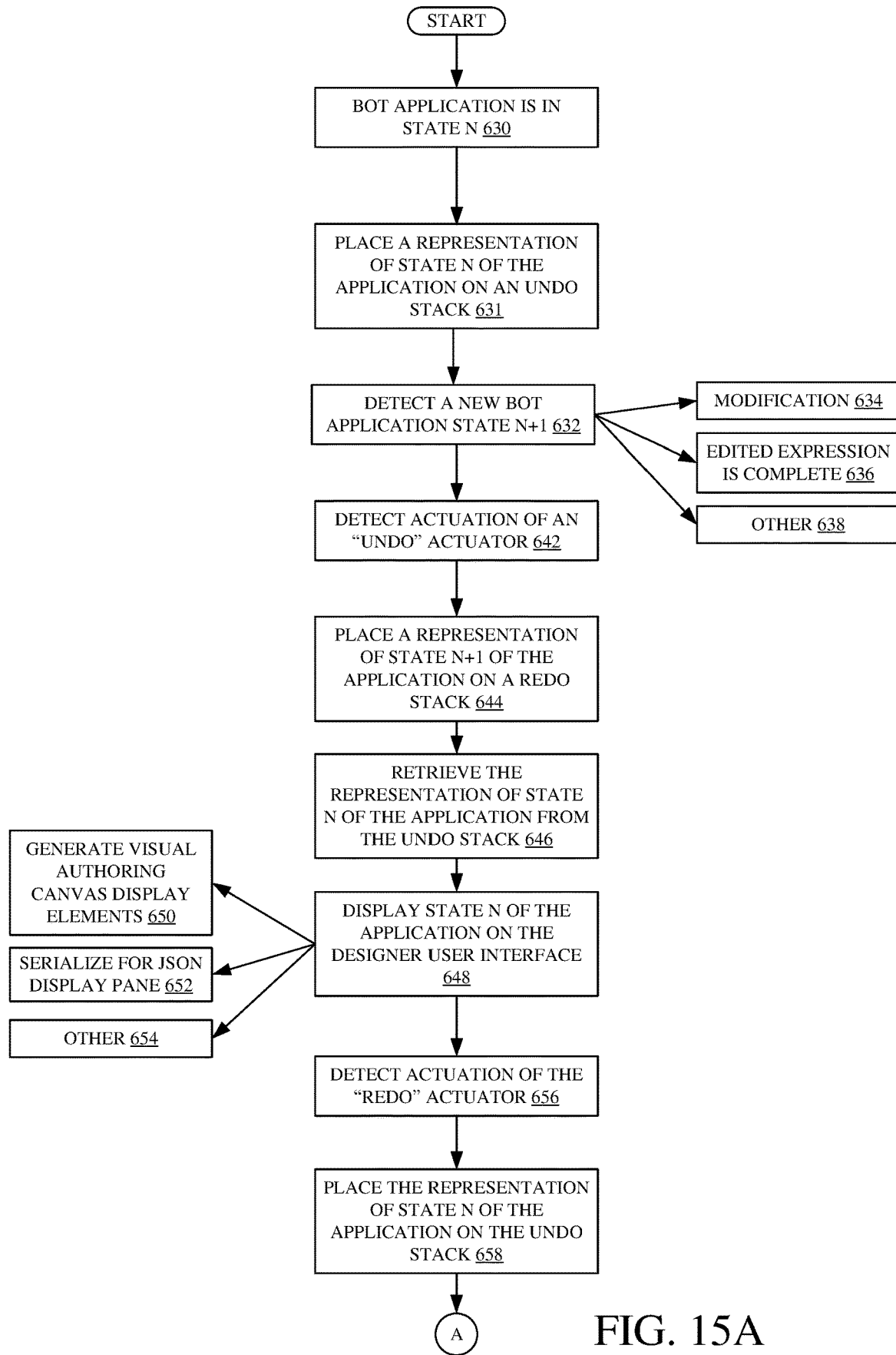
FIGS. 15A and 15B (collectively referred to herein as FIG. 15) show one example of a flow diagram illustrating the operation of the visual bot designer computing system in performing undo/redo operations.
Figure 15B:
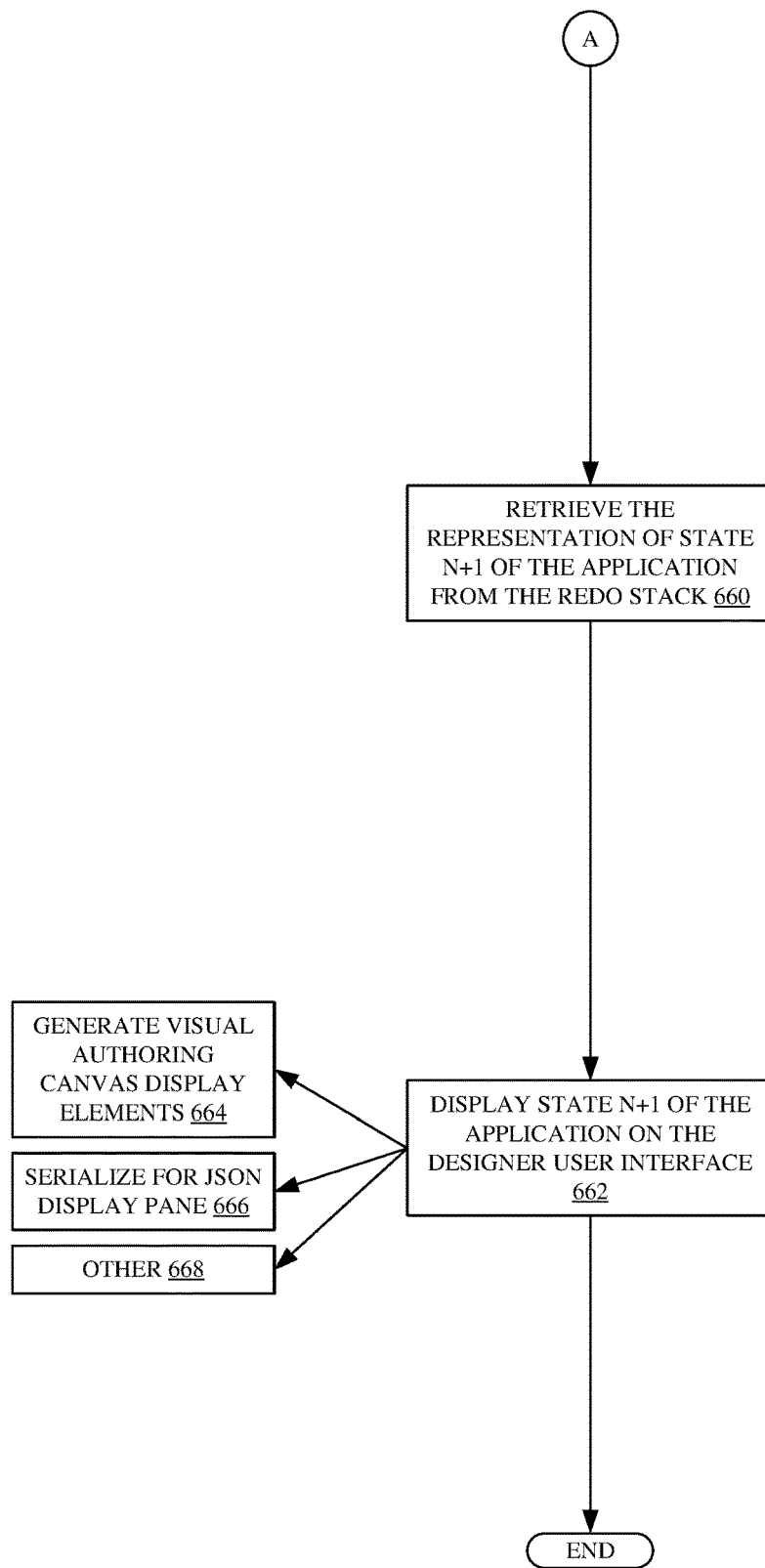

FIGS. 15A and 15B (collectively referred to herein as FIG. 15) show a flow diagram illustrating one example of the operation of system 102 (and specifically undo/redo logic 150) in performing undo/redo operations based on detected author 106 actuation of the undo/redo actuator 252 on designer user interfaces 104. It is first assumed that author 106 is authoring a bot, and the bot application is in a particular state N. This is indicated by block 630 in the flow diagram of FIG. 15. Undo/redo logic 150 then places a representation of the bot application (in state N) on an undo stack 140 in memory 110. This is indicated by block 631 in the flow diagram of FIG. 15. Author 106 then makes a modification to the application to place the bot application in a new state N+1. This is indicated by block 632. The change that places the bot in a new state N+1 can be a modification (such as adding or deleting nodes on the visual authoring canvas 122). This is indicated by block 634. Alternatively or additionally, the change may comprise editing an expression and completing the expression so that the bot application is functional. This is indicated by block 636. It can be any of a wide variety of other changes that place the bot application in state N+1. This is indicated by block 638.

Before the bot application reaches another functional state, interface control logic 127 detects a user actuation of the undo actuator 252 on interfaces 104 and provides an indication to undo/redo logic 150. This is indicated by block 642 in the flow diagram of FIG. 15. Undo/redo logic 150 then places a representation of the bot application (in state N+1) on a redo stack 140 in memory 110. This is indicated by block 644. Undo/redo logic 150 then retrieves the representation of the bot application (in state N) from the undo stack. This is indicated by block 646. It provides that representation to interface control logic 127 so that state N of the bot application is now displayed on interfaces 104. Displaying state N of the bot application on the designer user interface 104 is indicated by block 648 in the flow diagram of FIG. 15. This can include generating the display on the visual authoring canvas 122, as indicated by block 650. It can include generating the serialized representation for the JSON display pane 126. This is indicated by block 652 in the flow diagram of FIG. 15. It can include automatically selecting a node and displaying its properties on the property pane 124, or generating a representation on the designer user interfaces 104 in other ways, and this is indicated by block 654.

It is then assumed that author 106 actuates the redo actuator 252, and this is detected by interface control logic 127 and provided to undo/redo logic 150. The author 106 need not do this, but FIG. 15 is provided to illustrate operation that occurs if author 106 does actuate the redo actuator 252. So, for purposes of the present description, it is assumed that author 106 does actuate the redo actuator 252. Detecting actuation of the redo actuator is indicated by block 656 in the flow diagram of FIG. 15. Because state N of the bot application is currently displayed on interfaces 104, undo/redo logic 150 places the bot application (in state N) back on the undo stack 140 in memory 110. This is indicated by block 658 in the flow diagram of FIG. 15. Undo/redo logic 150 then retrieves the representation of the bot application (in state N+1) from the redo stack. This is indicated by block 660. It provides that representation of the indication (the bot application in state N+1) back to interface control logic 127 on designer user interfaces 104, where it (the bot application in state N+1) is displayed on the designer user interfaces 104. This is indicated by block 662. Logic 127 thus generates the display on the visual authoring canvas 122. This is indicated by block 664. It generates the serialized output for the JSON display pane 126. This is indicated by block 666. It can update the property pane 124 and other items as well, and this is indicated by block 668.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 16:
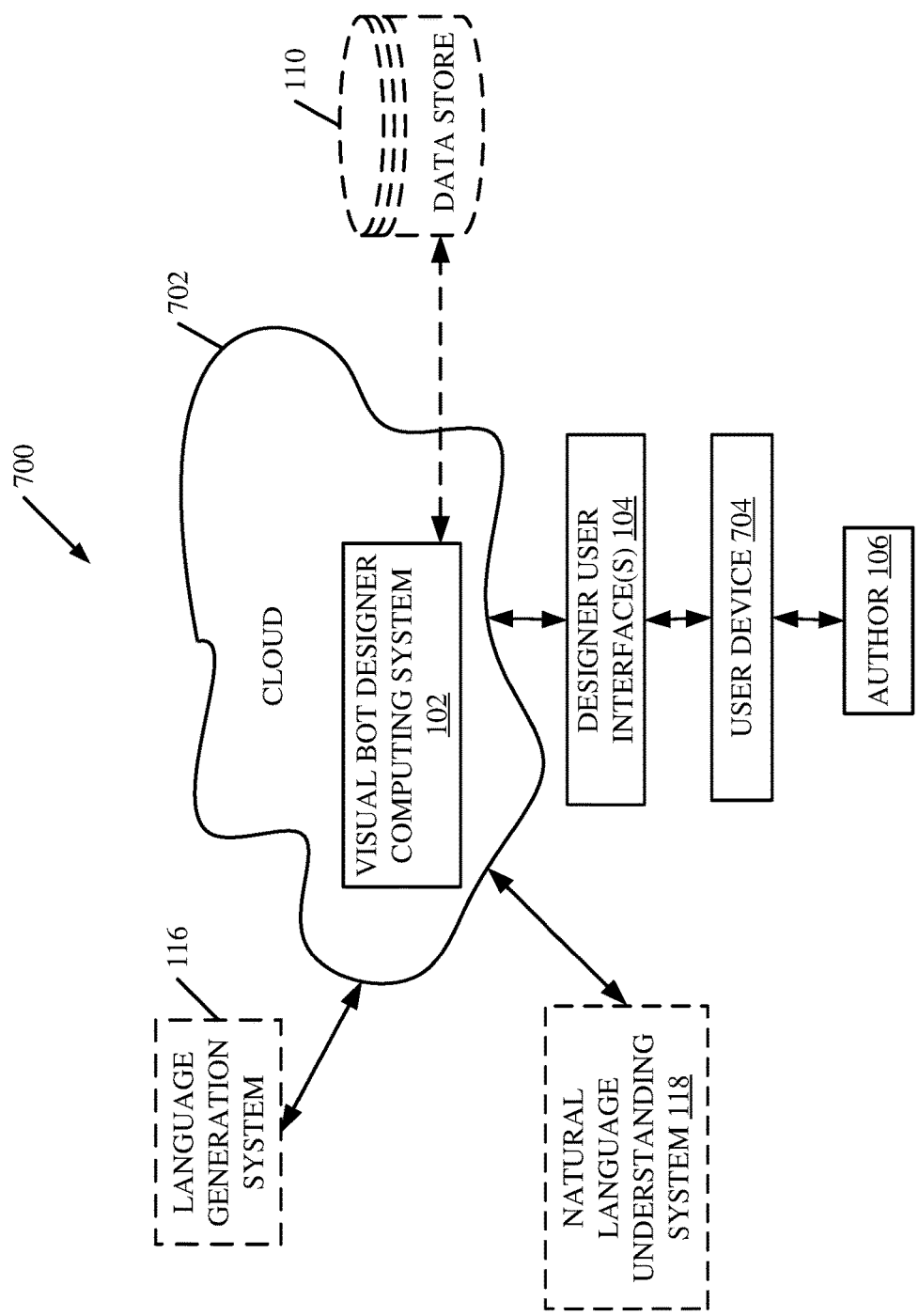
FIG. 16 is a block diagram of the architecture illustrated in FIG. 1, deployed in a cloud computing architecture.

FIG. 16 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 16, some items are similar to those shown in FIG. 1 and they are similarly numbered. FIG. 16 specifically shows that visual bot designer computing system 102 can be located in cloud 502 (which can be public, private, or a combination where portions are public while others are private). Therefore, author 106 uses a user device 704 to access those systems through cloud 702.

FIG. 16 also depicts another example of a cloud architecture. FIG. 16 shows that it is also contemplated that some elements of computing system 102 can be disposed in cloud 702 while others are not. By way of example, data store 110 can be disposed outside of cloud 702, and accessed through cloud 702. In another example, language generation system 116 and natural language understanding system 118 (or other items) can be outside of cloud 702. Regardless of where they are located, they can be accessed directly by device 704, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 17:
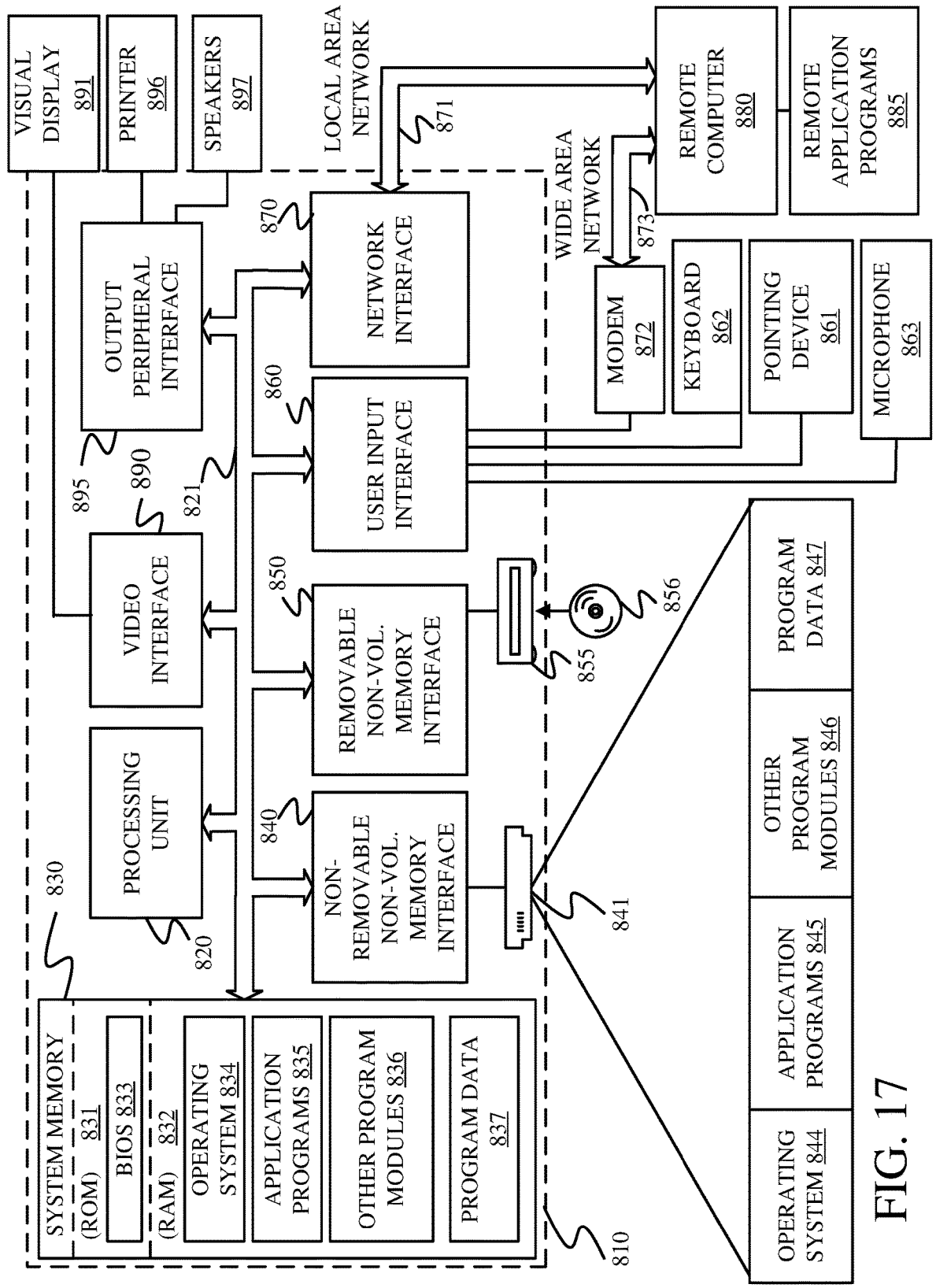
FIG. 17 is a block diagram of one example of a computing environment that can be used in the architectures shown in the previous figures.

FIG. 17 is one example of a computing environment in which architecture 100, or parts of it, (for example) can be deployed. With reference to FIG. 17, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 17.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 17 illustrates operating system 834, application programs 835, other program modules 836, and program data 837.

The computer 810 may also include other removable/non-removable volatile/nonvolatile computer storage media. By way of example only, FIG. 17 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 17, provide storage of computer readable instructions, data structures, program modules and other data for the computer 810. In FIG. 17, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 7 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 17 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computer implemented method of generating a chatbot application, comprising:

generating a designer user interface with a visual authoring canvas that shows visual elements identifying a logical flow of processing in a chatbot application being designed and that shows linguistic elements output by the chatbot application during operation and linguistic elements expected by the chatbot application, from a bot end user, during operation;

detecting an author input, on the designer user interface, identifying a language processing system that is external to the chatbot application and that is to be accessed by the chatbot application during operation; and configuring the chatbot application to access the language processing system during operation.

Example 2 is the computer implemented method of any or all previous examples wherein detecting the author input, on the designer user interface, comprises:

detecting the author input identifying a natural language understanding system the chatbot application is to use during operation of the chatbot application.

Example 3 is the computer implemented method of any or all previous examples wherein the chatbot application is generated to perform actions to run a dialog and wherein detecting the author input identifying a natural language understanding system comprises:

selecting a visual element on the visual authoring canvas identifying an action for which natural language understanding is performed;

displaying a natural language understanding system selection mechanism on a property configuration pane corresponding to the selected visual element; and detecting author actuation of the natural language understanding system selection mechanism indicating a selected natural language understanding system.

Example 4 is the computer implemented method of any or all previous examples wherein detecting the author input, on the designer user interface, comprises:

detecting the author input identifying a regular expression recognition system the chatbot application is to use during operation of the chatbot application.

Example 5 is the computer implemented method of any or all previous examples wherein generating the designer user interface comprises:

displaying an undo actuator and a redo actuator on the designer user interface.

Example 6 is the computer implemented method of any or all previous examples and further comprising:

detecting an authoring input that changes a state of the chatbot application from a previous state to state N; and storing a representation of the chatbot application, in state N, on an undo stack.

Example 7 is the computer implemented method of any or all previous examples and further comprising:

detecting an authoring input that changes the state of the chatbot application from state N to state N+1;

detecting author actuation of the undo actuator; and storing a representation of the chatbot application in state N+1 on a redo stack.

Example 8 is the computer implemented method of any or all previous examples and further comprising:
retrieving the representation of the chatbot application in state N from the undo stack; and
populating the visual authoring canvas on the designer user interface with state N of the chatbot application.

Example 9 is the computer implemented method of any or all previous examples and further comprising:
detecting author actuation of the redo actuator; and
storing the representation of the chatbot application in state N on the undo stack.

Example 10 is the computer implemented method of any or all previous examples and further comprising:
retrieving the representation of the chatbot application in state N+1 from the redo stack; and
populating the visual authoring canvas on the designer user interface with state N+1 of the chatbot application.

Example 11 is the computer implemented method of any or all previous examples wherein generating the designer user interface includes displaying a property pane and displaying a serialization pane, the property pane having author actuatable input mechanisms that are actuatable to configure an action corresponding to a visual element selected on the visual authoring canvas, the serialization pane displaying a serialized representation of the visual element selected on the visual authoring canvas, and further comprising:
populating the property pane and the serialization pane on the designer user interface with state N of the chatbot application.

Example 12 is the computer implemented method of any or all previous examples wherein generating the designer user interface includes displaying a property pane and displaying a serialization pane, the property pane having author actuatable input mechanisms that are actuatable to configure an action corresponding to a visual element selected on the visual authoring canvas, the serialization pane displaying a serialized representation of the visual element selected on the visual authoring canvas, and further comprising:
populating the property pane and the serialization pane on the designer user interface with state N+1 of the chatbot application.

Example 13 is a computer system, comprising:
one or more processors; and
memory including an undo stack and a redo stack and storing instructions which, when executed by the one or more processors, cause the one or more processors to perform steps of:
generating a designer user interface with a visual authoring canvas, that shows visual elements identifying a logical flow of processing in a chatbot application being designed, and a property pane having author actuatable input mechanisms that are actuatable to configure an action corresponding to a visual element selected on the visual authoring canvas, the designer user interface including an undo actuator and a redo actuator;
detecting an authoring input on the designer user interface that changes a state of the chatbot application from a previous state to state N;
storing a representation of the chatbot application, in state N, on the undo stack;
detecting an authoring input on the designer user interface that changes the state of the chatbot application from state N to state N+1;
detecting author actuation of the undo actuator;
storing a representation of the chatbot application in state N+1 on the redo stack;
retrieving the representation of the chatbot application in state N from the undo stack; and
populating the visual authoring canvas and the property pane on the designer user interface with state N of the chatbot application.

Example 14 is the computer system of any or all previous examples and further comprising:
detecting author actuation of the redo actuator;
storing the representation of the chatbot application in state N on the undo stack;
retrieving the representation of the chatbot application in state N+1 from the redo stack; and
populating the visual authoring canvas and the property pane on the designer user interface with state N+1 of the chatbot application.

Example 15 is the computer system of any or all previous examples wherein generating the designer user interface includes displaying a serialization pane that displays a serialized representation of the visual element selected on the visual authoring canvas, and further comprising:
populating the serialization pane on the designer user interface with state N of the chatbot application.

Example 16 is the computer system of any or all previous examples wherein generating the designer user interface includes displaying a serialization pane that displays a serialized representation of the visual element selected on the visual authoring canvas, and further comprising:
populating the serialization pane on the designer user interface with state N+1 of the chatbot application.

Example 17 is the computer system of any or all previous examples wherein the designer user interface shows linguistic elements output by the chatbot application during operation or expected by the chatbot application, from a bot end user, during operation, and further comprising:
detecting an author input, on the designer user interface, identifying a language processing system that is external to the chatbot application and that is to be accessed by the chatbot application during operation; and
configuring the chatbot application to access the language processing system during operation.

Example 18 is a computer system, comprising:
one or more processors; and
memory storing instructions which, when executed by the one or more processors, cause the one or more processors to perform steps of:
generating a designer user interface with a visual authoring canvas that shows visual elements identifying a logical flow of processing in a chatbot application being designed and that shows linguistic elements output by the chatbot application during operation and linguistic elements expected by the chatbot application, from a bot end user, during operation;
detecting an author input, on the designer user interface, identifying a natural language processing system that is external to the chatbot application and that is to be accessed by the chatbot application during operation; and
configuring the chatbot application to access the natural language processing system when the chatbot application is operating.

Example 19 is the computer system of any or all previous examples wherein the chatbot application is generated to perform actions to run a dialog and wherein detecting the author input identifying a natural language processing system comprises:

selecting a visual element on the visual authoring canvas identifying an action for which natural language processing is performed;

displaying a natural language processing system selection mechanism on a property configuration pane corresponding to the selected visual element; and detecting author actuation of the natural language processing system selection mechanism identifying a selected natural language understanding system.

Example 20 is the computer system of any or all previous examples wherein detecting actuation of the natural language processing system selection mechanism, comprises:

detecting the author input identifying a regular expression recognition system the chatbot application is to use during operation of the chatbot application.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method of configuring a chatbot application, the method comprising:
    generating a designer user interface comprising:
        a visual authoring canvas that includes:
            visual elements identifying a logical flow of processing in a chatbot application, and
            linguistic elements output by the chatbot application during operation and linguistic elements expected by the chatbot application, from a bot end user, during operation; and
        a system selection user input mechanism;
    detecting a user input through the system selection user input mechanism on the designer user interface;
    selecting a language processing system based on the user input, the language processing system being external to the chatbot application; and
    configuring the chatbot application to access the language processing system during operation.

2. The computer implemented method of claim 1, wherein selecting a language processing system comprises:
    selecting a particular natural language understanding system the chatbot application is to use during operation of the chatbot application.

3. The computer implemented method of claim 2, and further comprising:
    configuring the chatbot application to run a dialog;
    selecting a visual element on the visual authoring canvas identifying an action corresponding to performance of natural language understanding;
    displaying a natural language understanding system selection mechanism on a property configuration pane on the designer user interface, the property configuration pane corresponding to the selected visual element;
    detecting author actuation of the natural language understanding system selection mechanism that selects the particular natural language understanding system.

4. The computer implemented method of claim 1, and further comprising:
    detecting an author input that identifies a regular expression recognition system the chatbot application is to use during operation of the chatbot application.

5. The computer implemented method of claim 1, wherein generating the designer user interface comprises:
    displaying an undo actuator and a redo actuator on the designer user interface.

6. The computer implemented method of claim 5, and further comprising:
    detecting an authoring input that changes a state of the chatbot application from a previous state to state N; and
    storing a first representation of the chatbot application in state N.

7. The computer implemented method of claim 6, and further comprising:
    detecting an authoring input that changes the state of the chatbot application from state N to state N+1;
    detecting author actuation of the undo actuator; and
    storing a second representation of the chatbot application in state N+1.

8. The computer implemented method of claim 7, and further comprising:
    retrieving the first representation of the chatbot application in state N; and
    populating the visual authoring canvas on the designer user interface with state N of the chatbot application based on the first representation.

9. The computer implemented method of claim 8, and further comprising:
    detecting author actuation of the redo actuator; and
    storing the first representation of the chatbot application in state N.

10. The computer implemented method of claim 9, and further comprising:
    retrieving the second representation of the chatbot application in state N+1; and
    populating the visual authoring canvas on the designer user interface with state N+1 of the chatbot application based on the retrieved second representation.

11. The computer implemented method of claim 8, and further comprising:
    displaying a property pane and a serialization pane on the designer user interface,
        wherein
            the property pane includes an author actuatable input mechanism that is actuatable to configure an action corresponding to a visual element selected on the visual authoring canvas, and
            the serialization pane includes a serialized representation of the visual element selected on the visual authoring canvas;
    populating the property pane and the serialization pane on the designer user interface with state N of the chatbot application.

12. The computer implemented method of claim 10, and further comprising:
    displaying a property pane and a serialization pane on the designer user interface,
        wherein
            the property pane includes an author actuatable input mechanism that is actuatable to configure an action corresponding to a visual element selected on the visual authoring canvas, and
            the serialization pane includes a serialized representation of the visual element selected on the visual authoring canvas; and
    populating the property pane and the serialization pane on the designer user interface with state N+1 of the chatbot application.

13. A computer system comprising:
    one or more processors; and memory storing instructions executable by the one or more processors, wherein the instructions, when executed, cause the computer system to:
generate a designer user interface comprising:
a visual authoring canvas that includes:
visual elements identifying a logical flow of processing in a chatbot application, and
linguistic elements output by the chatbot application during operation and linguistic elements expected by the chatbot application, from a hot end user, during operation; and
a system selection user input mechanism;
detect a user input through the system selection user input mechanism on the designer user interface;
select a language processing system based on the user input, the language processing system being external to the chatbot application; and
configure the chatbot application to access the language processing system during operation.

14. The computer system of claim 13, wherein the instructions, when executed, cause the computer system to
configure the chatbot application to run a dialog;
select a visual element on the visual authoring canvas that identities an action for which natural language processing is performed;
display a natural language processing system selection mechanism on a property configuration pane corresponding to the selected visual element; and
detect author actuation of the natural language processing system selection mechanism identifying a selected natural language understanding system.

15. The computer system of claim 14, wherein the instructions, when executed, cause the computer system to:
detect the author input that identifies a regular expression recognition system the chatbot application is to use during operation of the chatbot application.

16. A computer system comprising:
one or more processors; and
memory storing instructions executable by the one or more processors, wherein the instructions, when executed, cause the computer system to:
generate a designer user interface that represents a chatbot application and comprises:
a visual authoring canvas that includes visual elements identifying a logical flow of processing in the chatbot application, and
a property pane having an author actuatable input mechanism actuatable to configure an action corresponding to a visual element selected on the visual authoring canvas, the designer user interface including an undo actuator and a redo actuator;
detect an authoring input on the designer user interface that changes a state of the chatbot application from a previous state to state N;
store a first representation of the chatbot application in state N;
detect an authoring input on the designer user interface that changes the state of the chatbot application from state N to state N+1;
detect author actuation of the undo actuator;
store a second representation of the chatbot application in state N+1 on the redo stack;
retrieve the first representation of the chatbot application in state N; and
populate the visual authoring canvas and the property pane on the designer user interface with state N of the chatbot application.

17. The computer system of claim 16, wherein the instructions, when executed, cause the computer system to:
detect actuation of the redo actuator;
store the first representation of the chatbot application in state N;
retrieve the second representation of the chatbot application in state N+1; and
populate the visual authoring canvas and the property pane on the designer user interface with state N+1 of the chatbot application based on the retrieved second representation.

18. The computer system of claim 16, wherein the instructions, when executed, cause the computer system to:
generate the designer user interface with a serialization pane that represents a serialized representation of the visual element selected on the visual authoring canvas; and
populate the serialization pane on the designer user interface with state N of the chatbot application.

19. The computer system of claim 17, wherein the instructions, when executed, cause the computer system to:
generate the designer user interface with a serialization pane that represents a serialized representation of the visual element selected on the visual authoring canvas; and
populate the serialization pane on the designer user interface with state N+1 of the chatbot application.

20. The computer system of claim 16 wherein the instructions, when executed, cause the computer system to:
generate the designer user interface with linguistic elements output by the chatbot application during operation or expected by the chatbot application, from a bot end user, during operation;
detect an author input, on the designer user interface, identifying a language processing system that is external to the chatbot application and that is to be accessed by the chatbot application during operation; and
configure the chatbot application to access the language processing system during operation.

* * * * *